United States Patent [19]

Okada et al.

[11] Patent Number: 4,925,782

[45] Date of Patent: May 15, 1990

[54] SILVER HALIDE PHOTOGRAPHIC LIGHT-SENSITIVE ELEMENT CONTAINING WATER SOLUBLE DYE COMPOUNDS

[75] Inventors: Masahiro Okada; Toshinao Ukai; Seiji Suzuki; Keiichi Adachi; Toshiyuki Watanabe; Kunio Ishigaki, all of Minami-ashigara, Japan

[73] Assignee: Fuji Photo Film Co., Ltd., Kanagawa, Japan

[21] Appl. No.: 309,905

[22] Filed: Feb. 13, 1989

Related U.S. Application Data

[63] Continuation of Ser. No. 917,092 filed as PCT JP86/00046 on Feb. 6, 1986, published as WO86/04694 on Aug. 14, 1986, abandoned.

[30] Foreign Application Priority Data

Feb. 6, 1985 [JP] Japan ................. 60-21306
May 30, 1985 [JP] Japan ................. 60-117456
Aug. 13, 1985 [JP] Japan ................. 60-178324

[51] Int. Cl.$^5$ .............................. G03C 1/84
[52] U.S. Cl. .................... 430/510; 430/512; 430/517; 430/518; 430/522
[58] Field of Search ........... 430/510, 512, 517, 518, 430/522

[56] References Cited

U.S. PATENT DOCUMENTS

| | | | |
|---|---|---|---|
| 3,988,154 | 10/1976 | Sturmer | 430/510 |
| 4,420,555 | 12/1983 | Krueger et al. | 430/517 |
| 4,443,534 | 4/1984 | Kojima et al. | 430/512 |
| 4,574,115 | 3/1986 | Adachi et al. | 430/510 |

FOREIGN PATENT DOCUMENTS

A1469691 11/1965 Fed. Rep. of Germany.
3623 1/1976 Japan.

OTHER PUBLICATIONS

Research Disclosure 14977, Sep. 1976, pp. 84–91.
English Abstract Translation of Japanese Patent Publication No. 60-3344 dated 1985.

*Primary Examiner*—Jack P. Brammer
*Attorney, Agent, or Firm*—Birch, Stewart, Kolasch & Birch

[57] ABSTRACT

A silver halide photographic light-sensitive material, in which a highly immobile novel arylidene bis type of dye which selectively dyes a specific layer and does not diffuse into other layers is incorporated in a hydrophilic colloidal layer. The dye used in this light-sensitive material can be easily removed upon photographic processing, and does not adversely affect photographic properties, particularly spectral sensitization, of the photographic emulsions.

15 Claims, No Drawings

SILVER HALIDE PHOTOGRAPHIC LIGHT-SENSITIVE ELEMENT CONTAINING WATER SOLUBLE DYE COMPOUNDS

This application is a continuation, of application Ser. No. 917,092 filed as PCT JP86/00046 on Feb. 6, 1986, published as WO86/04694 on Aug. 14, 1986, now abandoned.

Technical Field

The present invention relates to a silver halide photographic light-sensitive material having a hydrophilic colloid layer colored with a new dye.

BACKGROUND ART

In the field of silver halide photographic light-sensitive material, it is a common practice to color photographic emulsion layers and other hydrophilic colloid layers so as to absorb light of specific wavelengths.

When it is required to control the spectral energy distribution of light entering the photographic emulsion layer, a colored layer is placed at a position further from the base than the photographic emulsion layer. Such a colored layer is referred to as a filter layer. In the case where the photographic material has a plurality of photographic emulsion layers, the filter layer may be interposed between the emulsion layers.

In order to prevent a halo around photographic images, namely halation, which is caused by light being scattered after passing through the photographic emulsion layer, reflected on an interface between the emulsion layer and the base or on the surface of the photographic light-sensitive material opposite to the emulsion layer, and injected into the photographic emulsion layer again, a colored layer is placed between the photographic emulsion layer and the base or on the surface of the base opposite to the photographic emulsion layer. This colored layer is referred to as an antihalation layer. If there are a plurality of the photographic emulsion layers, the antihalation layer may be interposed between every adjacent two layers.

The photographic emulsion layers are sometimes colored so as to prevent the sharpness of images from being lowered, which is caused by light scattering in the photographic emulsion layer (this phenomenon is being referred to as irradiation).

The hydrophilic colloid layers to be colored usually contain a dye. The dye used for this purpose should have the following property.
(1) It should have adequate spectral adsorption in compliance with the intended use.
(2) It should be photochemically inert. In other words, it should not produce chemically adverse effects (e.g., decrease of sensitivity, fading of latent image, and fogging) on the performance of the silver halide photographic emulsion layer.
(3) It should be decolorized or dissolved in processing solution or water during the photographic processing and should not leave undesirable colors on the photographic light-sensitive material after being processed.
(4) It should not diffuse from the colored layer to the other layers.
(5) It should be stable and resistant to discoloration in the solution or photographic material for a long period of time.

Referring to the color diffusion mentioned in the above item (4), it is a practice to color either the filter layer or antihalation layer placed on the same side of the photographic emulsion layer on the base so as not to color the other layers, if the colored layer is the filter layer or antihalation layer. Otherwise, the other layers are not only subjected to an adverse spectral effect, but also the effect of the filter layer or antihalation layer are significantly diminished. In this manner, when the photographic emulsion layer containing a dye is in contact in the wet state with the other hydrophilic colloid layer, the dye is partly diffused from the emulsion layer to the hydrophilic layer. This diffusion depends greatly on the chemical structure of the dye.

A number of dyes suitable for use in the photographic material have been proposed in the art, for example, oxonol dyes as described in British Patent Nos. 506,385 and 1,278,621, and U.S Pat. Nos. 3,247,127, 2,533,472, and 3,379,533; hemioxonol dyes as described in British Patent No. 584,509; styryl dyes as described in U.S Pat. No. 2,298,733; merocyanine dyes such as those described in U.S. Pat. No. 2,493,747; and cyanine dyes as described in U.S. Pat. No. 2,843,486.

The dyes decolorized in the photographic emulsion processing are decolorized by the sulfite (or acid sulfite) contained in the developing solution, or alkaline conditions in combination therewith as described, for example,in British Patent No. 506,385.

U.S. Pat. Nos. 3,002,837 and 3,389,994 disclose bis-type dyes having the pyrazolone ring structure.

The dyes described in the prior art have merits and demerits and do not necessarily satisfy the above-mentioned five properties when used in silver halide photographic light-sensitive materials. Thus, there has been a demand for a high-performance dye that can be used for silver halide photographic light-sensitive materials.

DISCLOSURE OF THE INVENTION

It is a first object of the present invention to provide a silver halide photographic light-sensitive material having a hydrophilic colloid layer containing a new dye which selectively colors a specific layer and does not diffuse into other layers.

It is a second object of the present invention to provide a silver halide photographic light-sensitive material having a hydrophilic colloid layer containing a new dye which is decolorized during photographic processing and does not adversely affect the photographic characteristics, especially spectral sensitization, of the photographic emulsion.

These and other objects are achieved by a silver halide photographic light-sensitive material containing at least one of the compounds represented by the following general formulas (I) to (VI).

In other words, the present invention is to provide a silver halide photographic light-sensitive material containing at least one of the compounds represented by the following general formulas (I) to (VI). General formula (I)

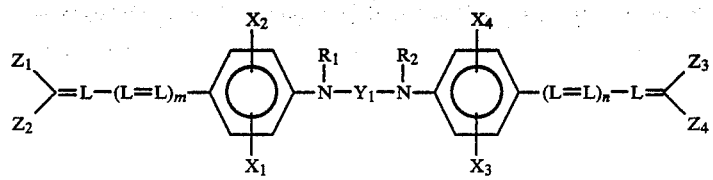

General formula (I)

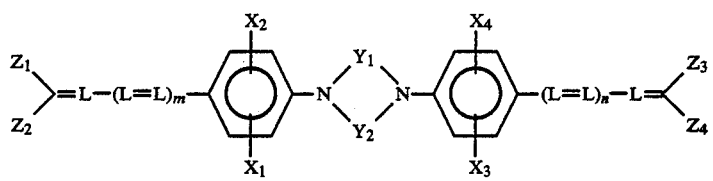

General formula (II)

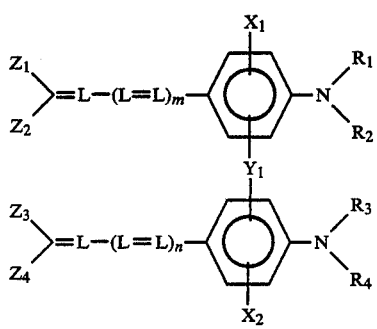

General formula (III)

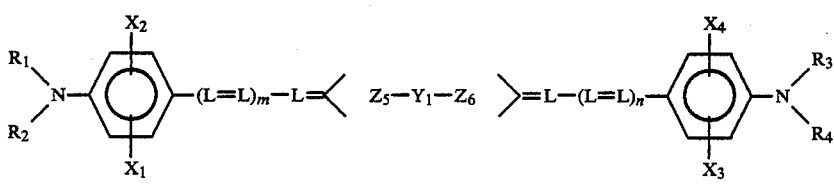

General formula (IV)

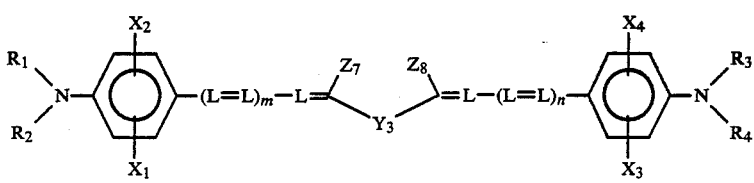

General formula (V)

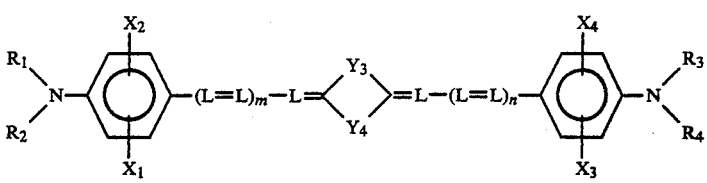

General formula (VI)

wherein $X_1$, $X_2$, $X_3$, and $X_4$, which may be the same or different, each represents a hydrogen atom, halogen atom, alkyl group, alkoxy group, hydroxyl group, carboxyl group, substituted-amino group, carbamoyl group, sulfamoyl group, and alkoxycarbonyl group.

$R_1$, $R_2$, $R_3$, and $R_4$, which may be the same or different, represent a hydrogen atom, unsubstituted or substituted alkyl group, unsubstituted or substituted alkenyl group, unsubstituted or substituted aryl group, acyl group, and sulfonyl group. In general formulas (III) to (VI), R1 and R2, or R3 and R4 may form a 5-membered or 6-membered ring.

$Z_1$, $Z_2$, $Z_3$, and $Z_4$, which may be the same or different, each represent an electron attracting group. $Z_1$ and $Z_2$ or $Z_3$ and $Z_4$ may connect to each other to form a ring. $Z_5$ and $Z_6$, which may be the same or different, represent a group of atoms forming a ring. $Z_7$ and $Z_8$, which may be the same or different, represent electron attracting groups.

$Y_1$ and $Y_2$ represent divalent linking groups; and $Y_3$ and $Y_4$, which may be the same or different, represent divalent linking groups having an electron attracting property.

L represents an unsubstituted or substituted methine group. m and n are 0 or 1.)

The dye compounds represented by the above general formulas (I) to (VI) will be explained in more detail.

In the formulas, $X_1$, $X_2$, $X_3$, and $X_4$, which may be the same or different, each represents a hydrogen atom, halogen atom, alkyl group preferably having 1 to 6 carbon atoms, alkoxy group preferably having 1 to 6 carbon atoms, hydroxyl group, carboxyl group, substituted amino group (e.g., an amino group substituted by an acyl group derived from an aliphatic carboxylic acid preferably having 1 to 6 carbon atoms or sulfonic acid; alkylamino group preferably having 1 to 6 carbon atoms; and dialkylamino group preferably having 1 to 6 carbon atoms in total), carbamoyl group preferably having 2 to 7 carbon atoms, sulfamoyl group preferably having 1 to 6 carbon atoms, and alkoxycarbonyl group preferably having 2 to 6 carbon atoms.

$R_1$, $R_2$, $R_3$, and $R_4$, which may be the same or different, each represents a hydrogen atom, unsubstituted or substituted alkyl group having 1 to 8 carbon atoms in total (the substituent group being a halogen atom, hydroxyl group, cyano group, alkoxy group, acyl group, acyloxy group, acylamino group, carbamoyl group, alkylamino group, dialkylamino group, carboxyl group, alkoxycarbonyl group, sulfonyl group, sulfonylamino group, sulfamoyl group, sulfo group, and aryl group), alkenyl group preferably having 2 to 6 carbon atoms, unsubstituted or substituted aryl group (preferably unsubstituted or substituted phenyl group {the substituent group being a halogen atom, cyano group, sulfo group, hydroxyl group, carboxyl group, alkoxy group, alkyl group, nitro group, or the like}), acyl group preferably having 2 to 7 carbon atoms, alkylsulfonyl group preferably having 1 to 6 carbon atoms, and unsubstituted or substituted arylsulfonyl group (preferably unsubstituted or substituted phenyl group {the substituent group being a halogen atom, cyano group, sulfo group, hydroxyl group, alkoxy group, alkyl group, or the like}).

$Z_1$, $Z_2$, $Z_3$, and $Z_4$, which may be the same or different, each represents electron attracting groups selected from an acyl group preferably having 2 to 13 carbon atoms, carbamoyl group preferably having 2 to 13 carbon atoms, carboxyl group, unsubstituted or substituted alkoxycarbonyl group preferably having 2 to 10 carbon atoms (the substituent group being a halogen atom, hydroxyl group, cyano group, alkoxy group, acyl group, acylamino group, alkylamino group, dialkylamino group, carboxyl group, alkoxycarbonyl group, sulfonyl group, sulfonylamino group, sulfo group, aryl group, or the like), unsubstituted or substituted loxycarbonyl group (the substituent being a halogen atom, alkyl group, alkoxy group, nitro group, unsubstituted or substituted amino group {the substituent group being an alkyl group, acyl group, alkylsulfonyl group, or the like}, alkoxycarbonyl group, or the like), sulfonyl group having 1 to 12 carbon atoms, sulfamoyl group preferably having 1 to 12 carbon atoms, cyano group and the like. In addition, $Z_1$ and $Z_2$ may connect to each other to form a ring (e.g., a pyrazolone ring, pyrazolotriazole ring, pyrazoloimidazole ring, oxyindol ring, oxyimidazopyridine ring, isooxazolone ring, barbituric acid ring, dioxytetrahydropyridine ring, and indandione ring). This may also apply to $Z_3$ and $Z_4$.

$Z_5$ and $Z_6$, which may be the same or different, each represents a group of atoms to form a ring (e.g., pyrazolone ring, pyrazolotriazole ring, pyrazoloimidazole ring, oxyindole ring, oxyimidazopyridine ring, isooxazolone ring, bartituric acid ring, dioxytetrahydropyridine ring, and indandione ring). $Z_7$ and $Z_8$, which may be the same or different, each represents an electron attracting group selected from an acyl group preferably having 2 to 13 carbon atoms, carbamoyl group preferably having 2 to 13 carbon atoms, carboxyl group, unsubstituted or substituted alkoxycarbonyl group preferably having 2 to 10 carbon atoms (the substituent group being a halogen atom, hydroxyl group, cyano group, alkoxy group, acyl group, acylamino group, alkylamino group, dialkylamino group, carboxyl group, alkoxycarbonyl group, sulfonyl group, sulfonylamino group, sulfo group, aryl group, or the like), unsubstituted or substituted aryloxycarbonyl group (the substituent group being a halogen atom, alkyl group, alkoxy group, nitro group, hydroxyl group, carboxyl group, cyano group, unsubstituted or substituted amino group {the substituent group being an alkyl group, acyl group, alkylsulfonyl group, or the like}, alkoxycarbonyl group, or the like), sulfonyl group preferably having 1 to 12 carbon atoms, sulfamoyl group preferably having 1 to 12 carbon atoms, and cyano group.

To be more specific, $X_1$, $X_2$, $X_3$, and $X_4$, which may be the same or different, each represents a hydrogen atom, halogen atom (e.g., chlorine and bromine), alkyl group having 1 to 6 carbon atoms (e.g., methyl, ethyl, propyl, and hexyl), alkoxy group having 1 to 6 carbon atoms (e.g., methoxy, ethoxy, butoxy, and hexyloxy), hydroxyl group, carboxyl group, amino group substituted by an acyl group derived from an aliphatic carboxylic acid having 1 to 6 carbon atoms or sulfonic acid (e.g., acetylamino, hexylcarbonylamino, methanesulfonylamino, ethanesulfonylamino, hexanesulfonylamino, and 3-sulfopropylcarbonylamino), alkylamino group having 1 to 6 carbon atoms (e.g., methylamino, ethylamino, propylamino, and hexylamino), dialkylamino group having 1 to 6 carbon atoms in total (e.g., dimethylamino, diethylamino, and dipropylamino), carbamoyl group having 2 to 7 carbon atoms (e.g., methylcarbamoyl and ethylcarbamoyl), sulfamoyl group having 1 to 6 carbon atoms (e.g., methylsulfamoyl and ethylsulfamoyl), and alkoxycarbonyl group having 2 to 6 carbon atoms (e.g., methoxycarbonyl, ethoxycarbonyl, and pentyloxycarbonyl).

$R_1$, $R_2$, $R_3$, and $R_4$, which may be the same or different, each represents a hydrogen atom, unsubstituted or substituted alkyl group having 1 to 8 carbon atoms in total (e.g., methyl, ethyl, propyl, butyl, pentyl, hexyl, octyl, 2-chloroethyl, 3-chloropropyl, 2-bromoethyl, 2-hydroxyethyl, cyanomethyl, 2-cyanoethyl, 3-cyanopropyl, 2-methoxyethyl, 3-methoxypropyl, 2-ethoxyethyl, 3-ethoxypentyl, 2-isopropoxyethyl, acetylmethyl, 2-acetylethyl, benzoylmethyl, acetyloxymethyl, ethylcarbonyloxymethyl, 2,2,2-trifluoroethylcarbonyloxymethyl, isopropylcarbonyloxymethyl, 2-(acetyloxy)ethyl, 2-(2,2,2-trifluoroethylcarbonyloxy)ethyl, 2-(isopropylcarbonyloxy)ethyl, benzoyloxymethyl, 4-chlorobenzoyloxymethyl, 4-nitrobenzoyloxymethyl, acetylaminoethyl, 2-(ethylcarbonylamino)ethyl, methylcarbamoylmethyl, methylaminoethyl, 2-(ethylamino)ethyl, 2-(dimethylamino)ethyl, 2-(diethylamino)ethyl, carboxymethyl, 2-carboxyethyl, 3-carboxypropyl, 6-carboxyhexyl, methoxycarbonylmethyl, ethoxycarbonylmethyl, 2,2,2-trifluoroethoxycarbonylmethyl, isopropyloxycarbonylmethyl, 3-(isopropyloxycarbonyl)propyl, 2-(methoxycarbonyl)ethyl, 2-(ethoxycarbonyl)ethyl, 2-(2,2,2-trifluoroethoxycarbonyl)ethyl, phenoxycarbonylmethyl, methylsulfonylmethyl, ethylsulfonylmethyl, 2-(methylsulfonyl)ethyl, 2-(butylsulfonyl)ethyl, methylsulfonylaminomethyl, 2-(methanesulfonylamino)ethyl, ethanesulfonylaminomethyl, 3-(ethanesulfonylamino)propyl, methylsulfamoylethyl, methylaminocarbonylaminoethyl, 2-sulfoethyl, 3-sulfopropyl, 4-sulfobutyl, 4-sulfophenylmethyl, and phenylmethyl), alkenyl group having 2 to 6 carbon atoms (e.g., 3-hexenyl), unsubstituted or substituted phenyl (e.g., phenyl, 4-chlorophenyl, 4-cyanophenyl, 4-sulfophenyl, 3-sulfophenyl, 4-hydroxyphenyl, 4-carboxyphenyl, 2-methoxyphenyl, 4-methoxyphenyl, 4-ethoxyphenyl, 4-methylphenyl, and 4-nitrophenyl), acyl group having 2 to 7 carbon atoms (acetylpropionyl, heptanoyl, and benzoyl), alkylsulfonyl group having 1 to 6 carbon atoms (e.g., methylsulfonyl, ethylsulfonyl, and hexylsulfonyl), and unsubstituted or substituted phenylsulfonyl group (e.g., phenylsulfonyl, 4-chlorophenylsulfonyl, 4-cyanophenylsulfonyl, 4-sulfophenylsulfonyl, 2-hydroxyphenylsulfonyl, 4-hydroxyphenylsulfonyl, 4-methoxyphenylsulfonyl, and 4-methylphenylsulfonyl). In Formulas (IV) to (VI), $R_1$ and $R_2$ may form a 5-membered or 6-membered ring. This also applies to $R_3$ and $R_4$.

$Z_1$, $Z_2$, $Z_3$, and $Z^4$, which may be the same or different, each represents an electron attracting group selected from an acyl group having 2 to 13 carbon atoms (e.g., acetyl, propanoyl, hexanoyl, benzoyl, 4-aminobenzoyl, 4-nitrobenzoyl, 4-methylsulfonylaminobenzoyl, 4-ethylsulfonylaminobenzoyl, 4-propylsulfonylaminobenzoyl, and 3-hydroxy-4-methylsulfonylaminobenzoyl), carbamoyl group having 2 to 13 carbon atoms (e.g., methylcarbamoyl group. ethylcarbamoyl, phenylcarbamoyl, 4-chlorophenylcarbamoyl, 4-nitrophenylcarbamoyl, 4-methylsulfonylphenylcarbamoyl, 3-sulfophenylcarbamoyl, 4-propylsulfonylphenylcarbamoyl, 4-propylsulfonylphenylcarbamoyl, and 4-methylsulfonylaminophenylcarbamoyl), carboxyl group, unsubstituted or substituted alkoxycarbonyl group having 2 to 10 carbon atoms (e.g., methoxy carbonyl, ethoxycarbonyl, propoxycarbonyl, isopropoxycarbonyl, butoxycarbonyl, 1-methylpropoxycarbonyl, t-butoxycarbonyl, chloroethoxycarbonyl, 2,2,2-trifluoroethoxycarbonyl, 3-(hydroxy-n-propoxy)carbonyl, cyanoethoxycarbonyl, methoxyethyloxycarbonyl, acetylethyloxycarbonyl, acetylaminoethyloxycarbonyl, methylaminoethyloxycarbonyl, dimethylaminoethyloxycarbonyl, carboxyethyloxycarbonyl, mathoxycarbonylethyloxycarbonyl, methylsulfonylethyloxycarbonyl, methylsulfonylaminoethyloxycarbonyl, sulfoethoxycarbonyl, and phenylethoxycarbonyl), unsubstituted or substituted phenyloxycarbonyl group (e.g., phenyloxycarbonyl, 4-chlorophenyloxycarbonyl, 4-methylphenyloxycarbonyl, 4-methoxyphenyloxycarbonyl, 4-nitrophenyloxycarbonyl, 4-hydroxyphenyloxycarbonyl, 4-carboxyphenyloxycarbonyl, 4-cyanophenyloxycarbonyl, 4-dimethylaminophenyloxycarbonyl, 4-methoxycarbonyl, and phenyloxycarbonyl), sulfonyl group having 1 to 12 carbon atoms (e.g., methylsulfonyl, ethylsulfonyl, decylsulfonyl, and phenylsulfonyl), sulfamoyl group having 1 to 12 carbon atoms (e.g., methylsulfamoyl, ethylsulfamoyl, propylsulfamoyl, phenylsulfamoyl, and 4-chlorophenylsulfamoyl), cyano group and the like. Z and $Z_2$ may connect to each other to form a ring (e.g., pyrazolone ring, pyrazolotriazole ring, pyrazoloimidazole ring, oxyindole ring, oxyindazopyridine ring, isooxazolone ring, barbituric acid ring, dioxytetrahydropyridine ring, and indandione ring). This also applies to $Z_3$ and $Z_4$.

$Z_5$ and $Z_6$, which may be the same or different, each represents a group of atoms forming a ring (e.g., pyrazolone ring, pyrazolotriazole ring, pyrazoloimidazole ring, oxyindole ring, oxyimidazopyridine ring, isooxazolone ring, barbituric acid ring, dioxytetrahydropyridine ring and indandione ring).

$Z_7$ and $Z_8$, which may be the same or different, each represents an electron attracting group selected from an acyl group having 2 to 13 carbon atoms (e.g., acetyl, propionyl, heptanoyl, benzoyl, 4-aminobenzoyl, 4-nitrobenzoyl, 4-methanesulfonylaminobenzoyl, 4-ethanesulfonylaminobenzoyl, 4-propanesulfonylaminobenzoyl, and 3-hydroxy-4-methanesulfonylaminobenzoyl), carbamoyl group having 2 to 13 carbon atoms (e.g., methylcarbamoyl, ethylcarbamoyl, phenylcarbamoyl, 4-chlorophenylcarbamoyl, 4-nitrophenylcarbamoyl, 4-methylsulfonylphenylcarbamoyl, 3-sulfophenylcarbamoyl, 4-propylsulfonylphenylcarbamoyl, and 4-methylsulfonylaminophenylcarbamoyl), carboxyl group, unsubstituted or substituted alkoxycarbonyl group having 2 to 10 carbon atoms (e.g., methoxycarbonyl, ethoxycarbonyl, propoxycarbonyl, isopropoxycarbonyl, butoxycarbonyl, 1-methylpropoxycarbonyl, t-butoxycarbonyl, chloroethoxycarbonyl, 2,2,2-trifluoroethoxycarbonyl, 3-hydroxypropoxycarbonyl, cyanoethoxycarbonyl, methoxyethyloxycarbonyl, acetylethyloxycarbonyl, acetylaminoethyloxycarbonyl, methylaminoethyloxycarbonyl, dimethylaminoethyloxycarbonyl, carboxyethyloxycarbonyl, methoxycarbonylethyloxycarbonyl, methylsulfonylethyloxycarbonyl, methanesulfonylaminoethyloxycarbonyl, sulfoethoxycarbonyl, and phenylethoxycarbonyl), unsubstituted or substituted phenyloxycarbonyl (e.g., phenyloxycarbonyl, 4-chlorophenyloxycarbonyl, 4-methylphenyloxycarbonyl, 4-methoxyphenyloxycarbonyl, 4-nitrophenyloxycarbonyl, 4-hydroxyphenyloxycarbonyl, 4-carboxylphenyloxycarbonyl, 4-cyanophenyloxycarbonyl, 4-dimethylaminophenyloxycarbonyl, and 4-methoxycarbonylphenyloxycarbonyl group). sulfonyl group having 1 to 12 carbon atoms (e.g., methylsulfonyl, ethylsulfonyl, decylsulfonyl, and phenylsulfonyl), sulfamoyl group having 1 to 12 carbon atoms (e.g., methylsulfamoyl, ethylsulfamoyl, propylsulfamoyl, phenylsulfamoyl, and 4-chlorophenylsulfamoyl), cyano group and the like.

$Y_1$ and $Y_2$ represent divalent linking groups each selected from an unsubstituted or substituted alkylene group having 1 to 10 carbon atoms (e.g., methylene, ethylene, propylene, butylene, pentylene, hexylene, heptylene, octylene, xylylene, and bromoethylene), unsubstituted or substituted arylene group (e.g., phenylene group, naphthylene group, chlorophenylene group, sulfophenylene group, hydroxyphenylene group, methoxyphenylene group, carboxyphenylene group, methylphenylene group, nitrophenylene group, and methanesulfonylaminophenylene group), carbonyl group, alkylene group and arylene group having a functional group like an oxygen atom, carbonyl group, amino group, carbonyloxy group, carbonate group, carbonylamino group, ureido group, imide group, sulfonyl group, sulfonyloxy group, sulfonylamino group, and sulfonylaminocarbonyl group (e.g.,
—(CH$_2$)$_2$—O—(CH$_2$)$_2$—CH$_2$COCH$_2$—
—CH$_2$CO—(CH$_2$)$_2$—OCO—(CH$_2$)$_2$—
—(CH$_2$)$_2$—(CH$_2$)$_2$—COO—(CH$_2$)$_2$—
—(CH$_2$)$_2$—OCO—(CH$_2$)$_4$—COO—(CH$_2$)$_2$—

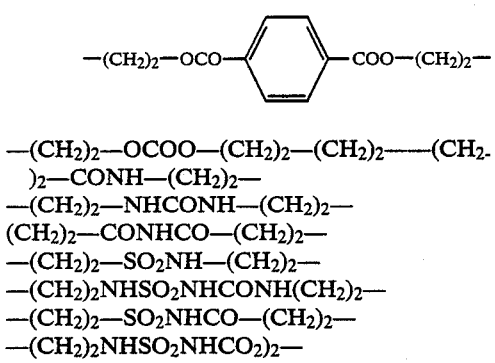

—(CH$_2$)$_2$—OCOO—(CH$_2$)$_2$—(CH$_2$)$_2$——(CH$_2$)$_2$—CONH—(CH$_2$)$_2$—
—(CH$_2$)$_2$—NHCONH—(CH$_2$)$_2$—
(CH$_2$)$_2$—CONHCO—(CH$_2$)$_2$—
—(CH$_2$)$_2$—SO$_2$NH—(CH$_2$)$_2$—
—(CH$_2$)$_2$NHSO$_2$NHCONH(CH$_2$)$_2$—
—(CH$_2$)$_2$—SO$_2$NHCO—(CH$_2$)$_2$—
—(CH$_2$)$_2$NHSO$_2$NHCO$_2$)$_2$—

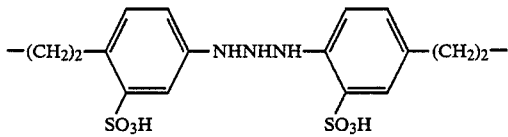

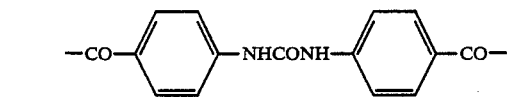

—CO—(CH$_2$)$_2$—CO——SO$_2$—(CH$_2$)$_4$—SO$_2$—

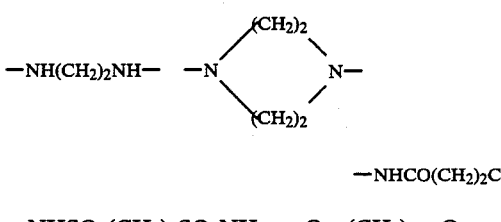

—NHCO(CH$_2$)$_2$CONH—

—NHSO$_2$(CH$_2$)$_2$SO$_2$NH——O—(CH$_2$)$_2$—O—
—CONH(CH$_2$)$_2$NHCO——COO(CH$_2$)$_2$OCO—

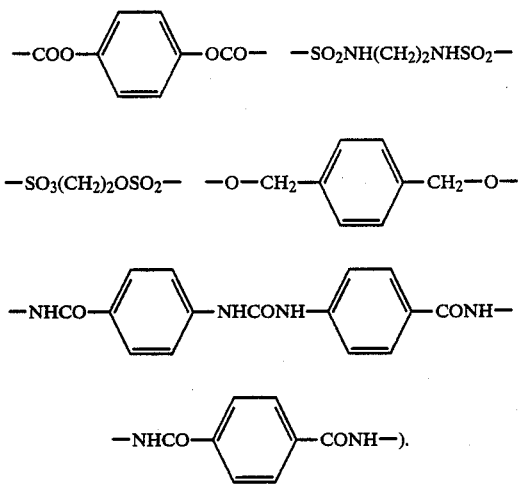

Y$_3$ and Y$_4$, which may be the same or different, each represents an electron attracting divalent linking groups such as —CO—Y$_5$—CO— and —SO$_2$—Y$_5$—SO$_2$— wherein Y$_5$ is a divalent linking group selected from an unsubstituted or substituted alkylene group having 2 to 10 carbon atoms (e.g., ethylene, propylene, butylene, pentylene, hexylene, heptylene, octylene, and xylylene), unsubstituted or substituted arylene group (e.g., phenylene group, naphthylene group, chlorophenylene group, sulfophenylene group, hydroxyphenylene group, methoxyphenylene group, carboxyphenylene group, methylphenylene group, nitrophenylene group, and methanesulfonylaminophenylene group), alkylene group and arylene group having a functional group like an oxygen atom, carbonyl group, amino group, carbonyloxy group, carbonate group, carbonylamino group, ureido group, imido group, sulfonyl group, sulfonyloxy group, sulfonylamino group, and sulfonylaminocarbonyl group (e.g.,
—(CH$_2$)$_2$—O—(CH$_2$)$_2$——(CH$_2$)$_2$—OCO—(CH$_2$)$_2$—
—(CH$_2$)$_2$—OCO—(CH$_2$)$_2$—COO—(CH$_2$)$_2$—
—(CH$_2$)$_2$—OCO—(CH$_2$)$_4$—COO—(CH$_2$)$_{22}$—

—(CH$_2$)$_2$—OCOO—(CH$_2$)$_2$——(CH$_2$)$_2$—CONH—(CH$_2$)$_2$—
—(CH$_2$)$_2$—NHCONH—(CH$_2$)$_2$—
—(CH$_2$)$_2$—CONHCO—(CH$_2$)$_2$—
—(CH$_2$)$_2$—SO$_2$NH—(CH$_2$)$_2$—
—(CH$_2$)$_2$NHSO$_2$NHCONH(CH$_2$)$_2$—
—(CH$_2$)$_2$—SO$_2$NHCO—(CH$_2$)$_2$—
—(CH$_2$)$_2$NHSO$_2$NHCO$_2$(CH$_2$)$_2$—

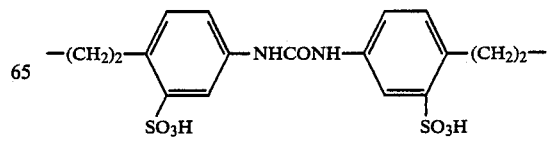

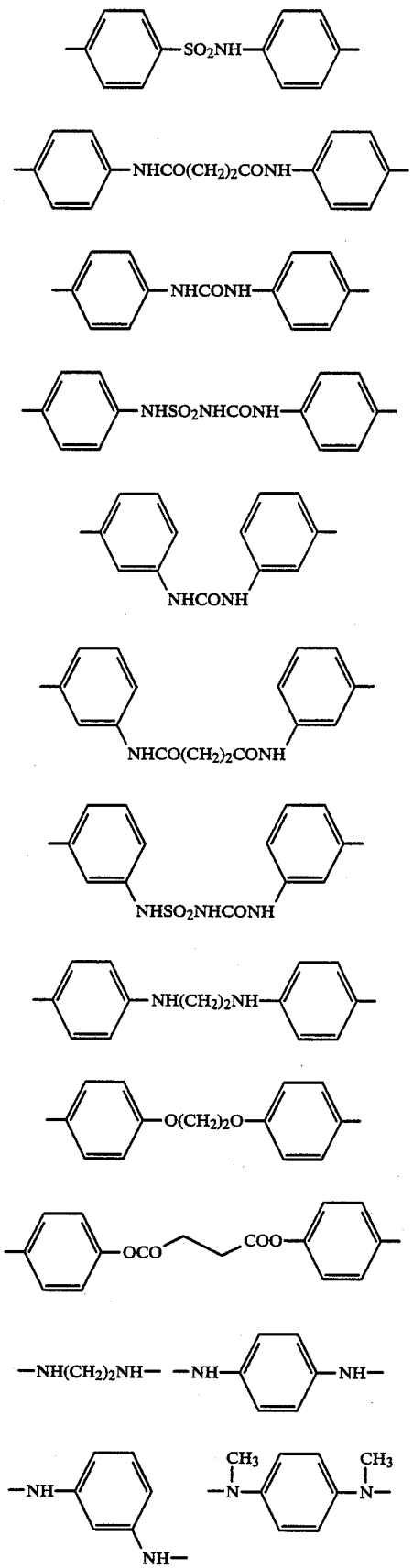

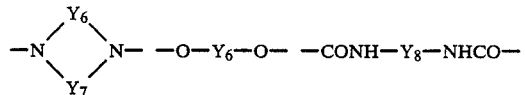

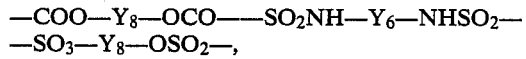

wherein the divalent linking group $Y_1$ in general formula (III) is an unsubstituted or substituted alkylene group preferably having 1 to 10 carbon atoms (e.g., methylene, ethylene, and butylene) and
—NH—$Y_6$—NH—

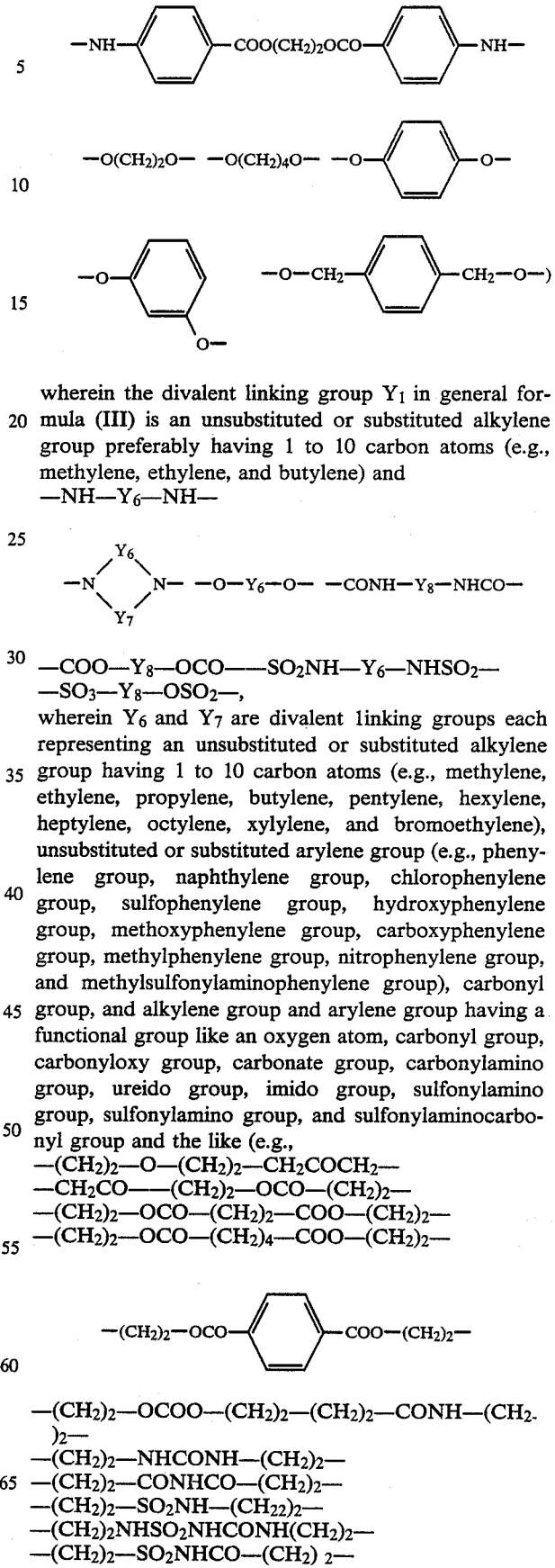

—COO—$Y_8$—OCO—  —SO$_2$NH—$Y_6$—NHSO$_2$—
—SO$_3$—$Y_8$—OSO$_2$—, wherein $Y_6$ and $Y_7$ are divalent linking groups each representing an unsubstituted or substituted alkylene group having 1 to 10 carbon atoms (e.g., methylene, ethylene, propylene, butylene, pentylene, hexylene, heptylene, octylene, xylylene, and bromoethylene), unsubstituted or substituted arylene group (e.g., phenylene group, naphthylene group, chlorophenylene group, sulfophenylene group, hydroxyphenylene group, methoxyphenylene group, carboxyphenylene group, methylphenylene group, nitrophenylene group, and methylsulfonylaminophenylene group), carbonyl group, and alkylene group and arylene group having a functional group like an oxygen atom, carbonyl group, carbonyloxy group, carbonate group, carbonylamino group, ureido group, imido group, sulfonylamino group, sulfonylamino group, and sulfonylaminocarbonyl group and the like (e.g.,
—(CH$_2$)$_2$—O—(CH$_2$)$_2$—CH$_2$COCH$_2$—
—CH$_2$CO——(CH$_2$)$_2$—OCO—(CH$_2$)$_2$—
—(CH$_2$)$_2$—OCO—(CH$_2$)$_2$—COO—(CH$_2$)$_2$—
—(CH$_2$)$_2$—OCO—(CH$_2$)$_4$—COO—(CH$_2$)$_2$—

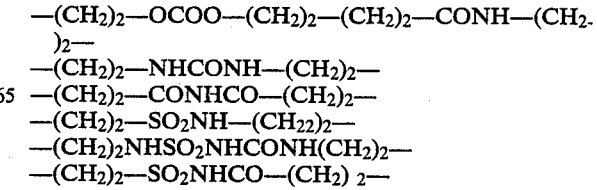

—(CH$_2$)$_2$—OCOO—(CH$_2$)$_2$—(CH$_2$)$_2$—CONH—(CH$_2$)$_2$—
—(CH$_2$)$_2$—NHCONH—(CH$_2$)$_2$—
—(CH$_2$)$_2$—CONHCO—(CH$_2$)$_2$—
—(CH$_2$)$_2$—SO$_2$NH—(CH$_{22}$)$_2$—
—(CH$_2$)$_2$NHSO$_2$NHCONH(CH$_2$)$_2$—
—(CH$_2$)$_2$—SO$_2$NHCO—(CH$_2$)$_2$—

—(CH$_2$)$_2$NHSO$_2$NHCO$_2$(CH$_2$)$_2$—

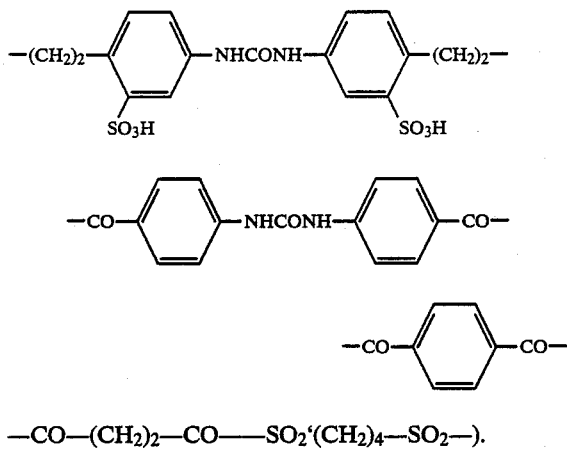

—CO—(CH$_2$)$_2$—CO——SO$_2$'(CH$_2$)$_4$—SO$_2$—).

Y$_8$ is a divalent linking group representing an unsubstituted or substituted alkylene group having 1 to 10 carbon atoms (e.g., methylene, ethylene, and butylene) and unsubstituted or substituted arylene group (e.g., phenylene group and hydroxyphenylene group).

L represents an unsubstituted or substituted methine group (the substituent group being, for example, methyl group), and m and n each represent 0 or 1.

The arylidene bis type dye represented by any one of general formulas (I) to (VI) in the present invention is resistant to diffusion owing to its bis structure. When it is introduced as a filter dye into a gelatin layer of the photosensitive material, it becomes immobilized in the desired layer. In addition, the arylidene bis type dye in the present invention should preferably contain in the molecule two to four sulfo groups or carboxy groups or salts thereof (preferably alkaline metal salts or ammonium salts). The bis type dye containing the sulfo group keeps a hydrophilic property to a certain extent but yet it is hydrophobic. Therefore, it can be made into an aqueous solution and it can also be dispersed into water by the so-called oil-in-water dispersion method. This permits the dye to be incorporated into the photosensitive material according to various methods. In addition, the dye is readily decolorized when the photosensitive material is treated with a developing solution containing a sulfite. The reason for this is considered that the addition of a sulfite cleaves the conjugated bonds to cause the dye to lose its color and that the added sulfite also forms a new sulfo group so as to make the dye more hydrophilic and permit the dye to be leached out from the photographic material. A bis type dye having no sulfo group loses its color once on account of the nucleophilic group contained in the alkaline processing solution, but it does not become hydrophilic enough to be leached out sufficiently, with the result that it restores its color in the neutral dry state. Therefore, such a dye is not desirable.

In the case of the dyes represented by general formulas (I) and (II), used in the present invention, it is preferable that Z$_1$ and Z$_2$ or Z$_3$ and Z$_4$ connect to each other to form a pyrazolone ring. The bis type dye of this structure is superior in decoloration property.

In addition, in the case of the dyes represented by general formulas (I), (II), and (III), it is preferable that Z$_1$ and Z$_2$ or Z$_3$ and Z$_4$ represent a combination of a cyano group and a benzoyl group which may be substituted in view of the decoloration property at the time of photographic processing. A method for introducing a mono-chromophore into a compound is photographic processing disclosed in Japanese Patent Application (OPI) No. 3623/1976 by utilizing the condensation reaction of an aldehyde compound and an active methylene compound as shown below.

The compound represented by general formula (I) or (II) can be obtained by subjecting an aldehyde compound represented by general formula (VII) or (VIII) below to a condensation reaction with an active methylene (methyl) compound represented by general formula (IX) or (X) below.

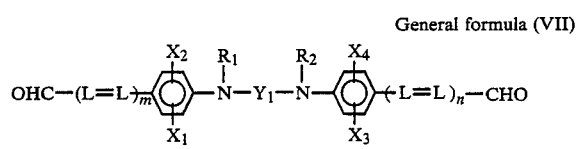

General formula (VII)

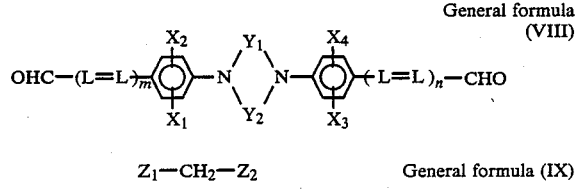

General formula (VIII)

Z$_1$—CH$_2$—Z$_2$    General formula (IX)

Z$_3$—CH$_2$—Z$_4$    General formula (X)

wherein X$_1$, X$_2$, X$_3$, X$_4$, R$_1$, R$_2$, Z$_1$, Z$_3$, Z$_4$, Y$_1$, Y$_2$, L, m and n are those as defined above.

The condensation reaction can be advantageously performed by employing a solvent which dissolves the starting material. However, many reactions proceed even though the starting material is not dissolved. Examples of adequate solvents include alcohols (e.g., methanol, ethanol, and isopropanol), acetonitrile, ethylene glycol monoalkyl ethers (e.g., ethylene glycol monomethyl ether), amides (e.g., acetamide and dimethylformamide), ethers (e.g., dioxane), dimethylsulfoxide, and chloroform. These may be used individually or in combination with one another. The reaction temperature may be from room temperature to the boiling point of the solvent used and preferably 50° to 80° C. The reaction may be advantageously promoted by adding pyridine, piperidine, diethylamine, triethylamine, ammonia gas, potassium acetate, ammonium acetate, acetic acid (or other acids), or a base. The reaction time is usually about 10 minutes to 5 hours.

The compounds represented by general formula (III) may be obtained by subjecting an aldehyde compound represented by general formula (XI) below to a condensation reaction with an active methylene compound represented by general formula (IX) or (X) above. General formula (XI)

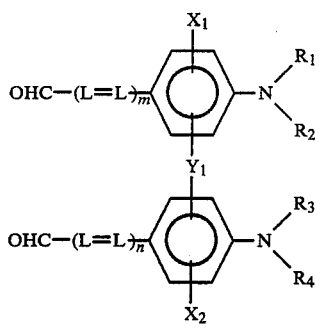

General formula (XI)

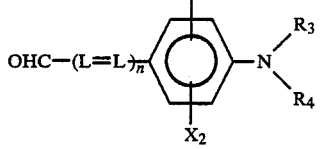

wherein $X_1$, $X_2$, $R_1$, $R_2$, $R_3$, $R_4$, $Y_1$, L, m and n are those defined above.

This condensation reaction can be performed under exactly the same conditions as in the reaction for the compounds represented by general formula (I) or (II).

The compounds represented by general formula (IV) to (VI) can be obtained by condensation reaction of aldehyde compounds represented by general formulas (XII) and (XIII) below and active methine compounds represented by general formulas (XIV) to (XVI) below. This condensation reaction can be performed under exactly the same conditions as in the reaction for the compounds represented by general formula (I) or (II).

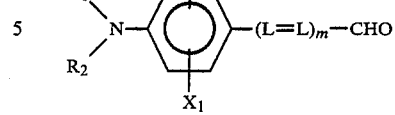

General formula (XII)

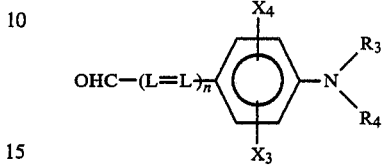

General formula (XIII)

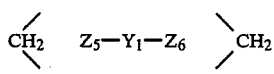

General formula (XIV)

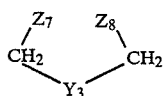

General formula (XV)

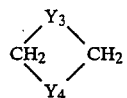

General formula (XVI)

General formula (XVI):
wherein $X_1$, $X_2$, $X_3$, $X_4$, $R_1$, $R_2$, $R_3$, $R_4$, $Z_5$, $Z_6$, $Z_7$, $Z_8$, $Y_1$, $Y_3$, $Y_4$, L, m and n are those defined above.

The following are the examples of the compounds represented by general formulas (I) to (VI) above which are used in the present invention. They are not intended to limit the scope of the invention.

(1) Compounds represented by general formula (I) or (II).

1-1 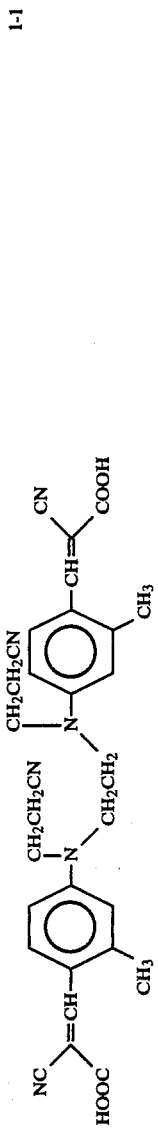
1-2 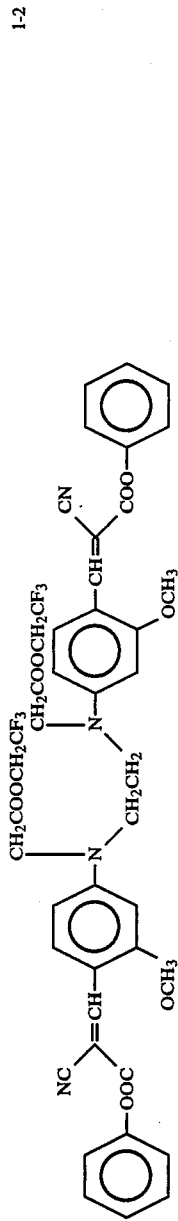
1-3 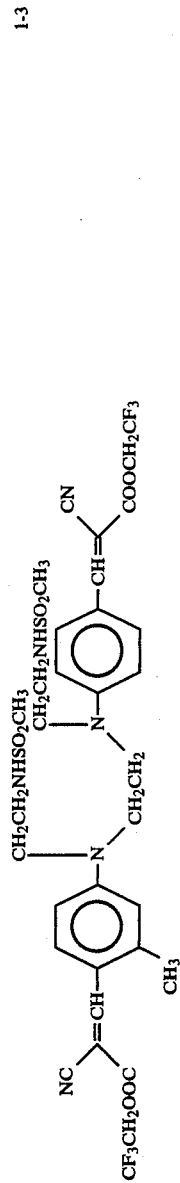
1-4 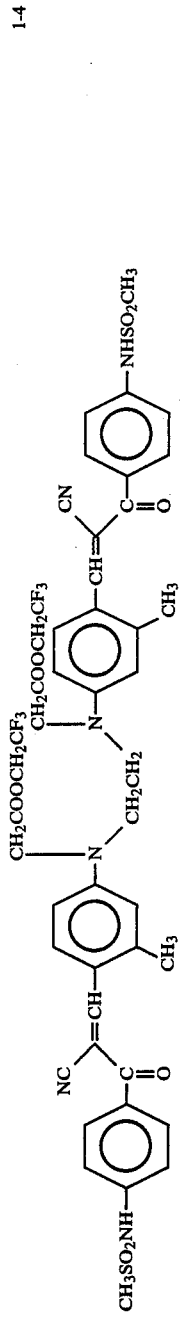
1-5 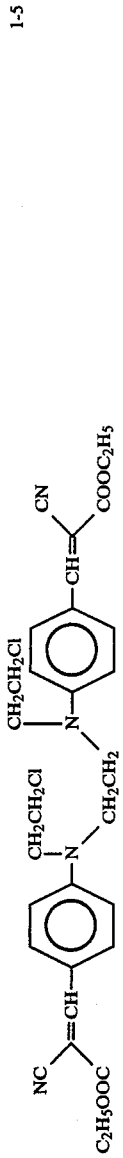
1-6 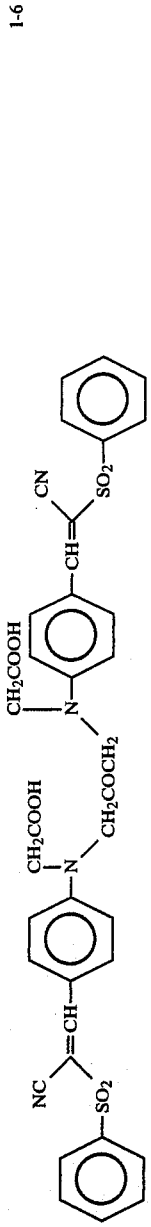

-continued
| 1-7 | 1-8 | 1-9 | 1-10 | 1-11 | 1-12 |
|---|---|---|---|---|---|
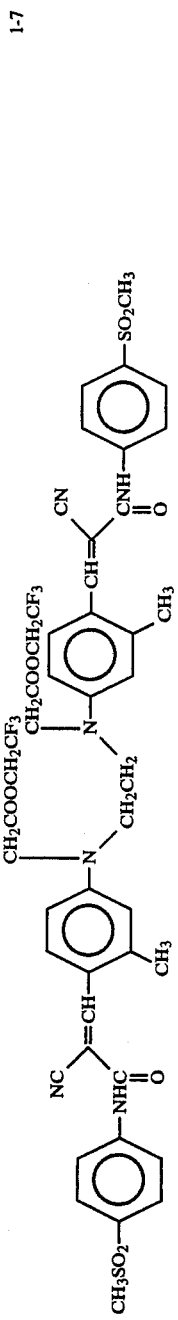
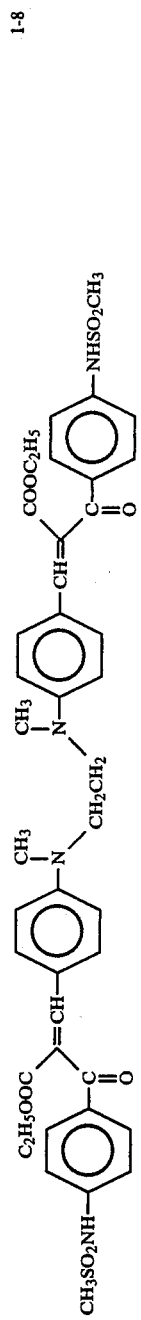
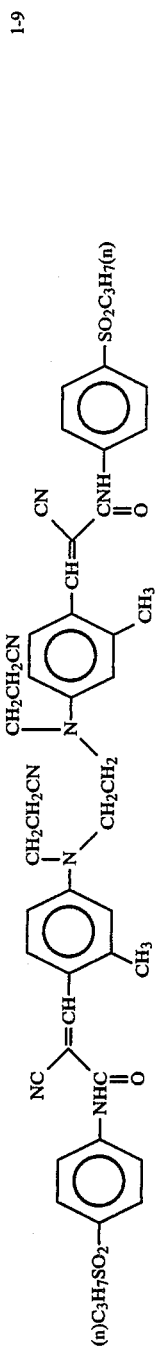
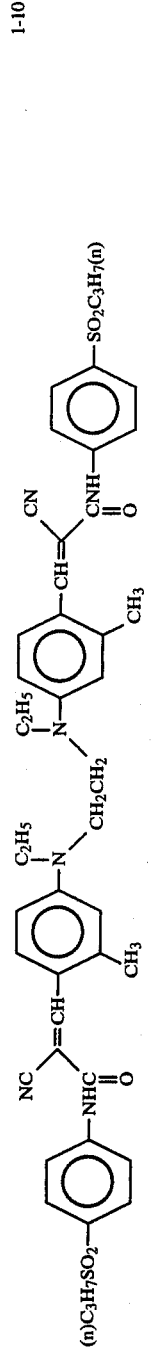
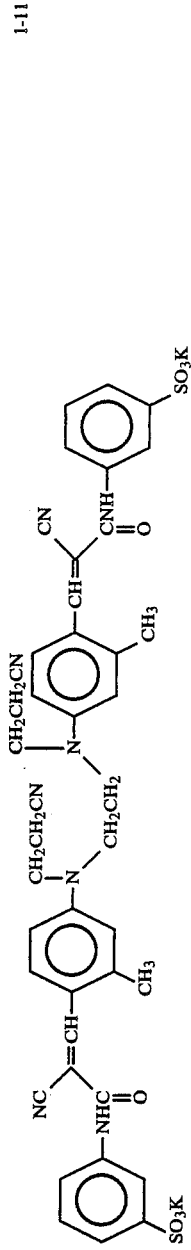
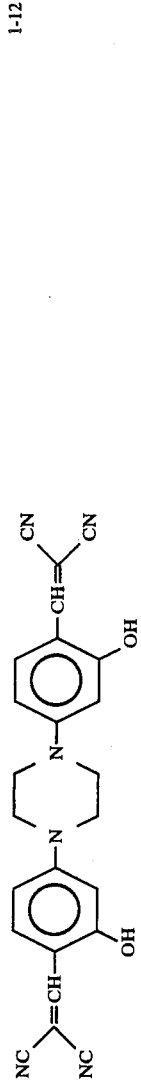

-continued
1-13
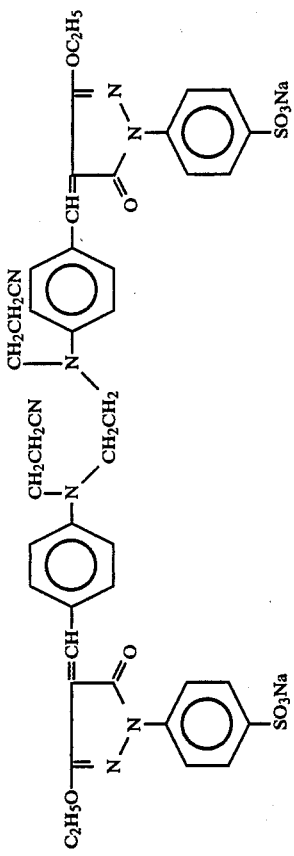
1-14
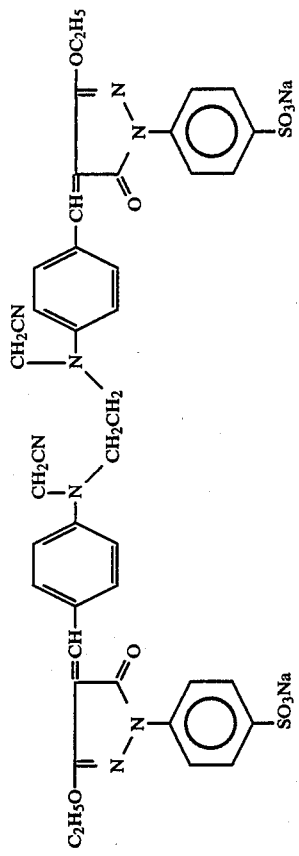
1-15
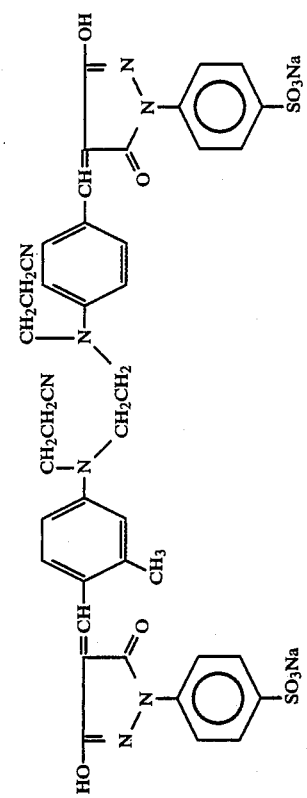

1-16
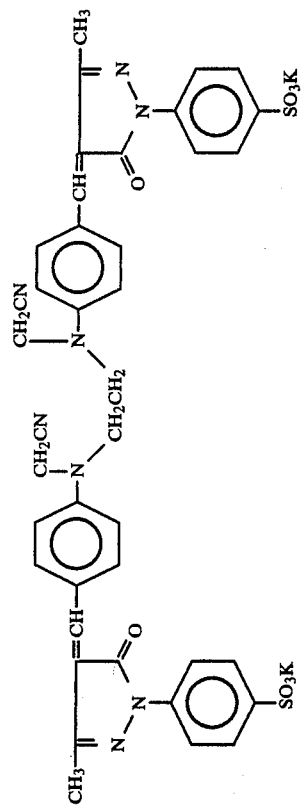
1-17
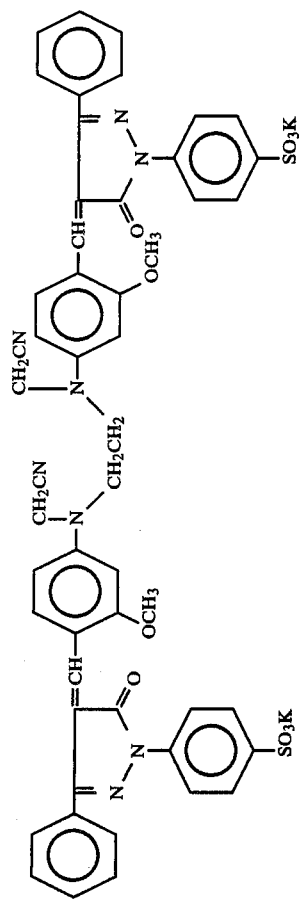
1-18
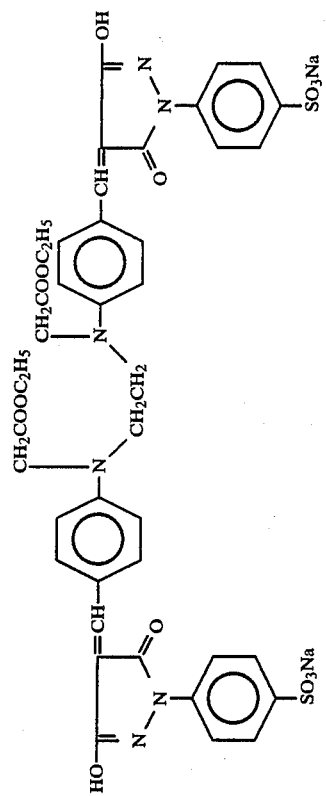

-continued
1-19
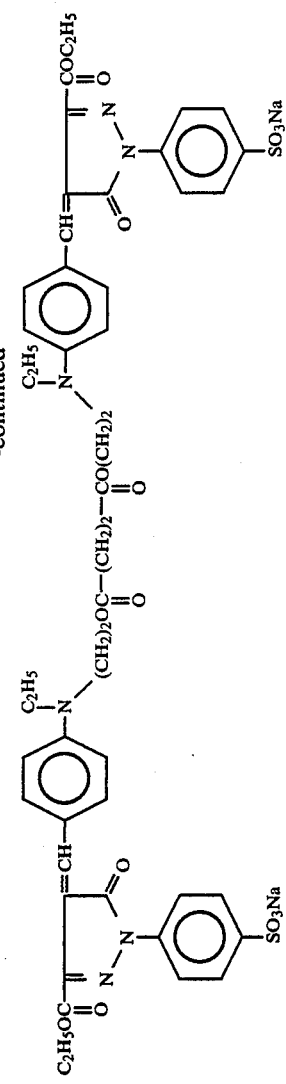
1-20
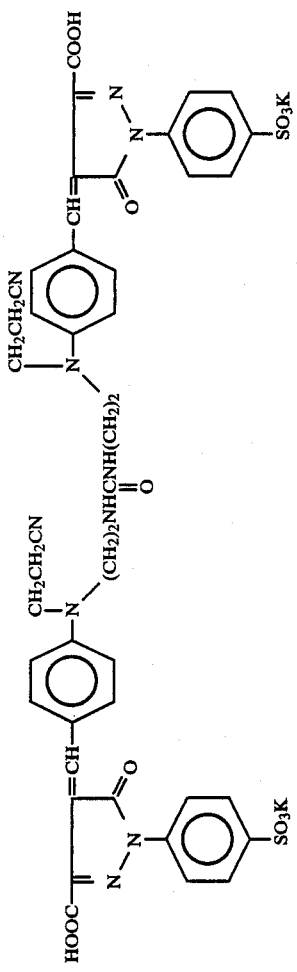
1-21
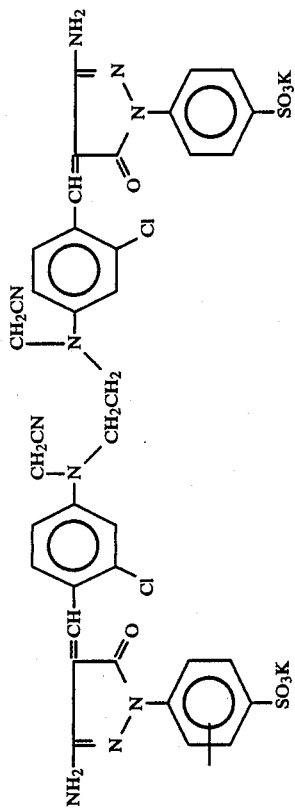

(2) Compounds represented by generla formula (II).
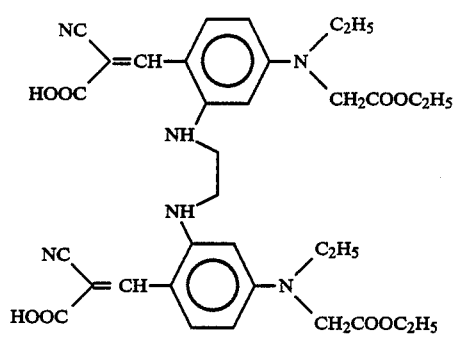
2-1.
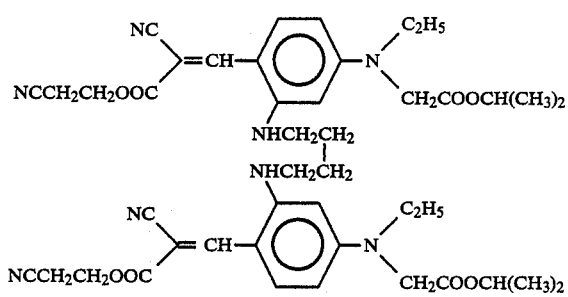
2-2.
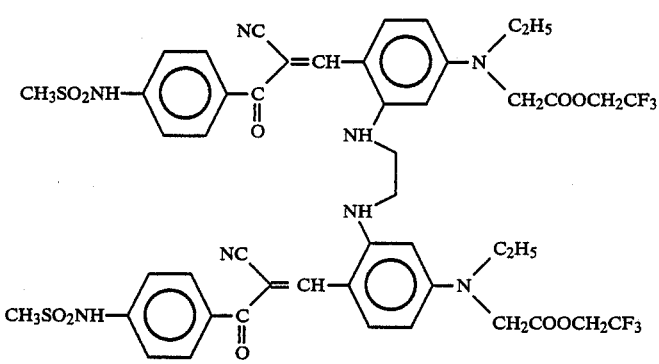
2-3.
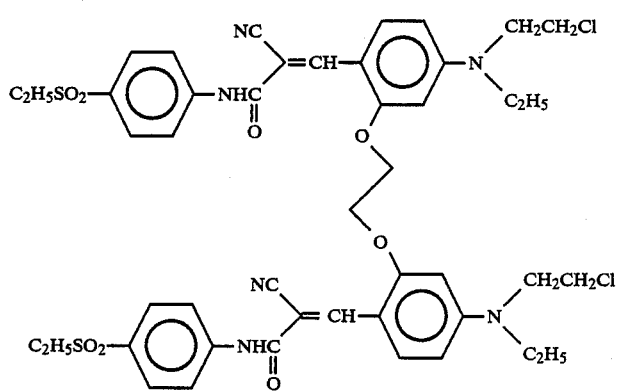
2-4.

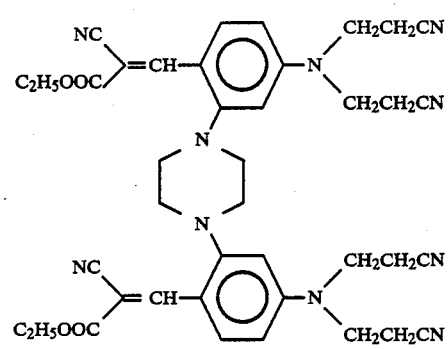
2-5.
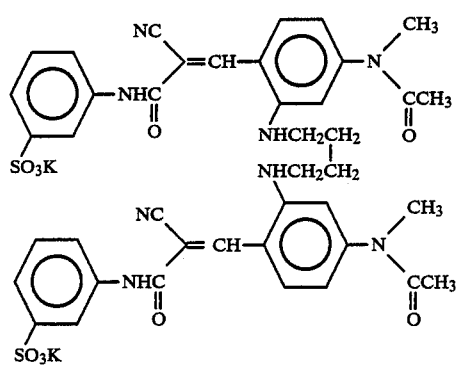
2-6.
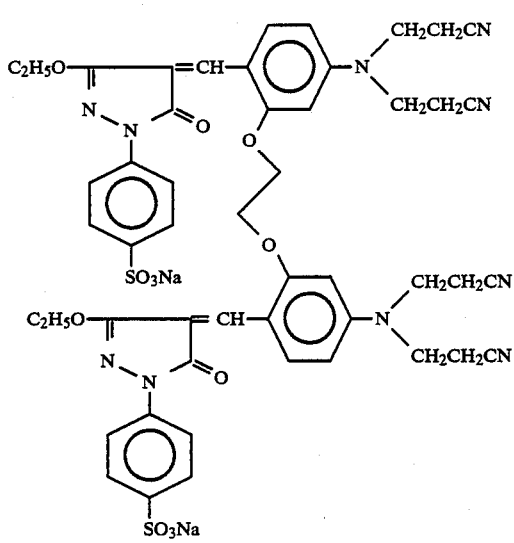
2-7.

2-8.
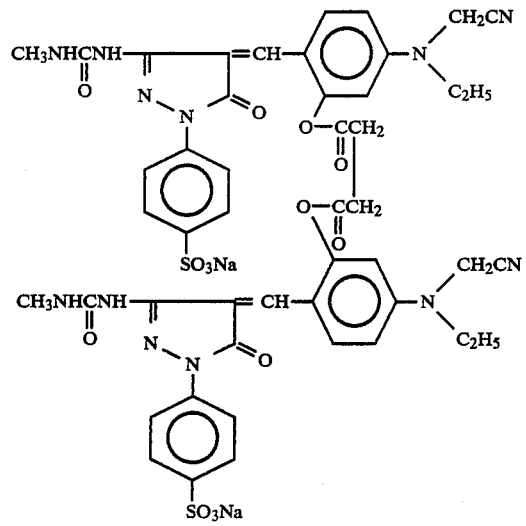
2-9.
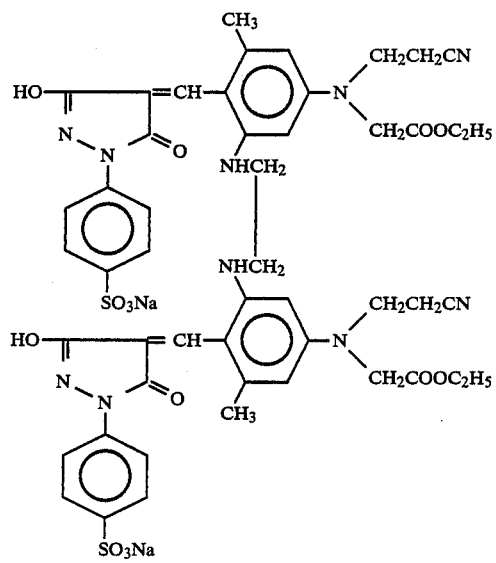
2-10.
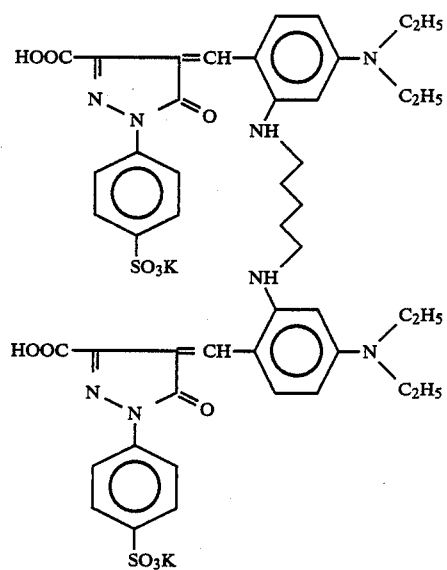

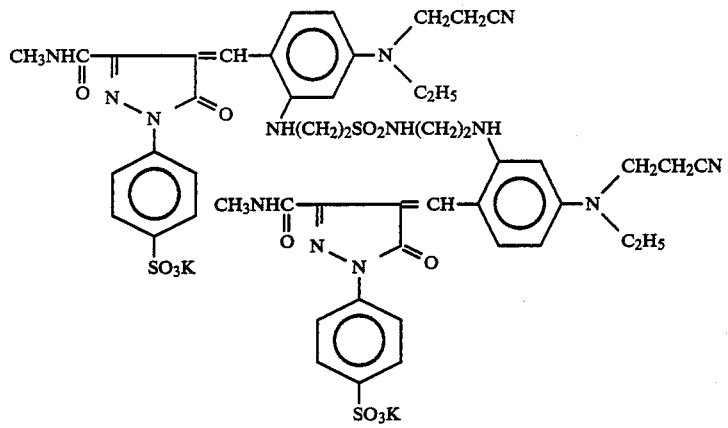
2-11.
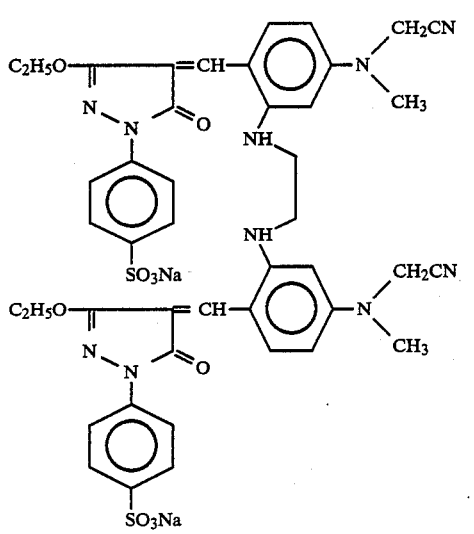
2-12.
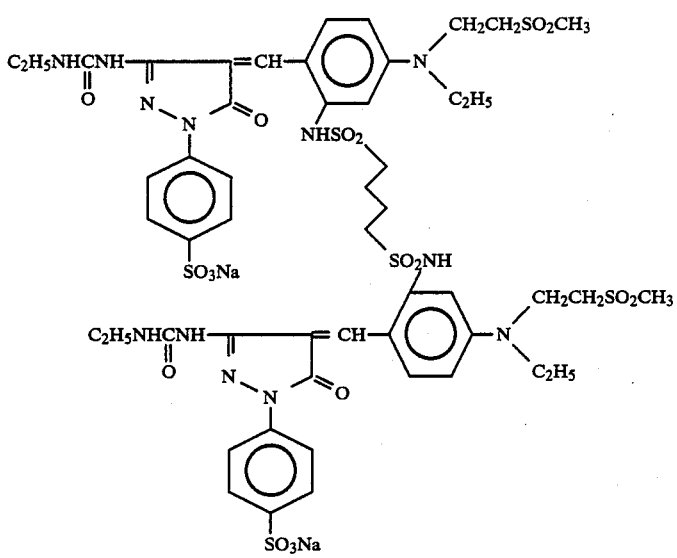
2-13.

-continued
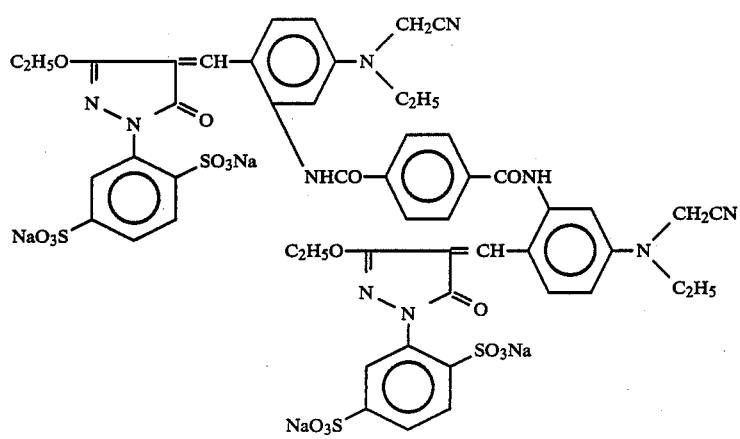
2-14.
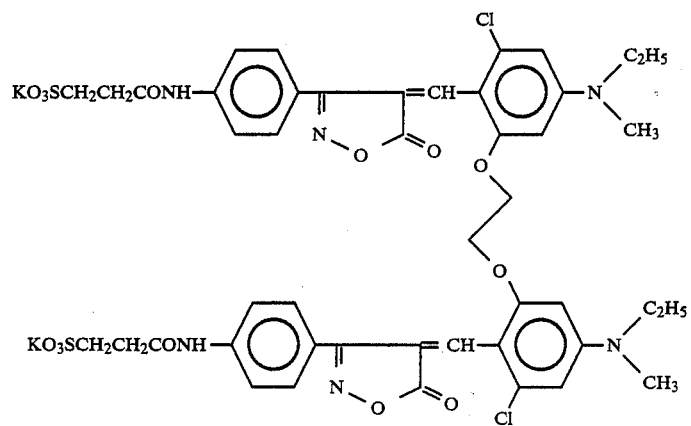
2-15.
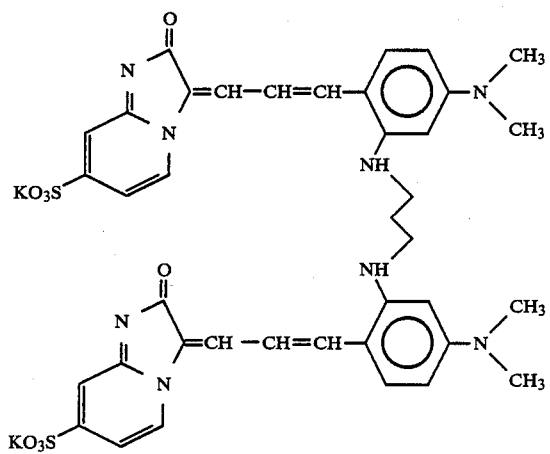
2-16.

-continued
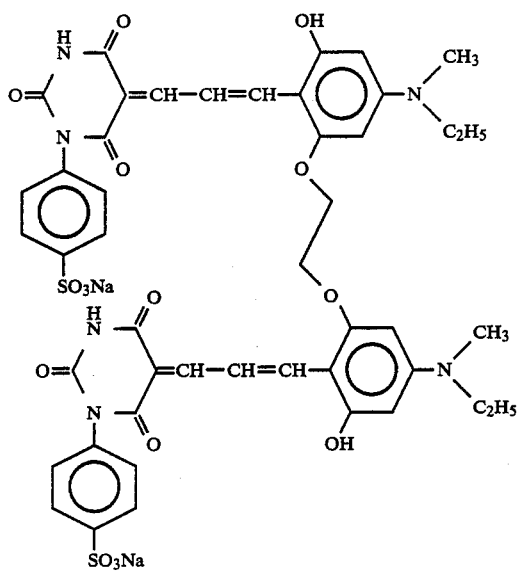
2-17.
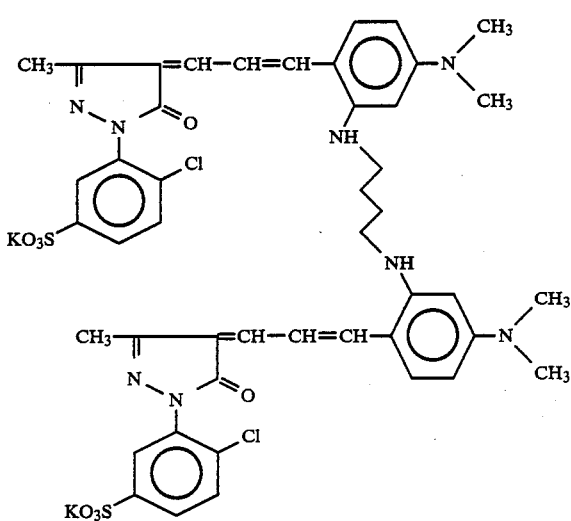
2-18.
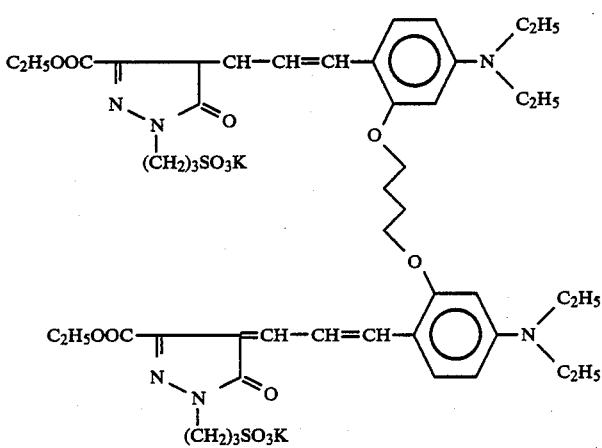
2-19.

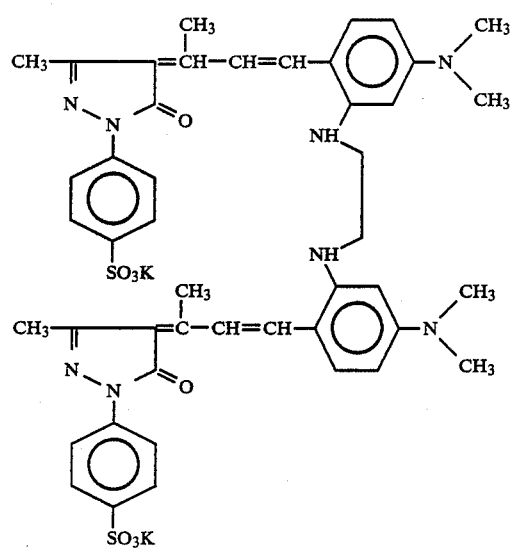
2-20.
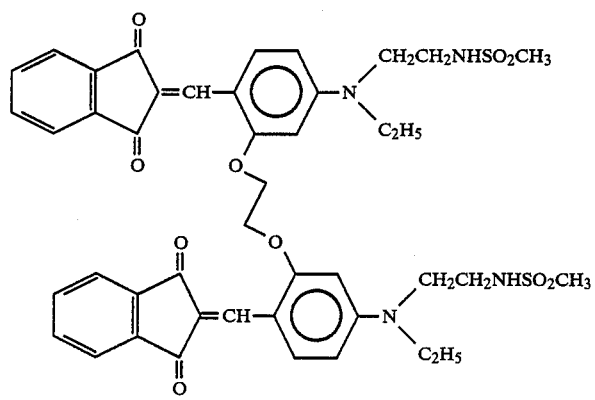
2-21.
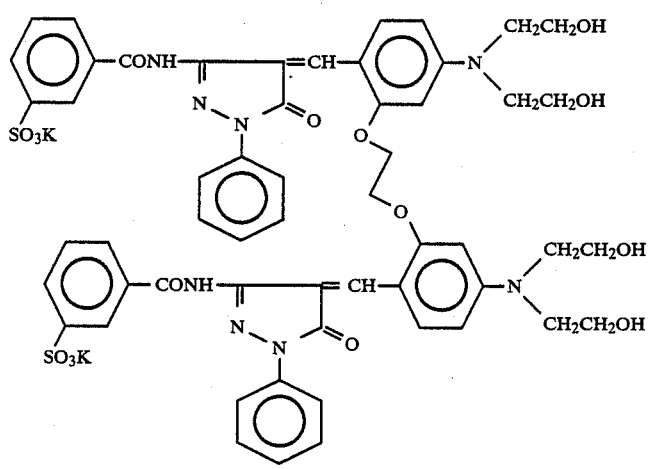
2-22.

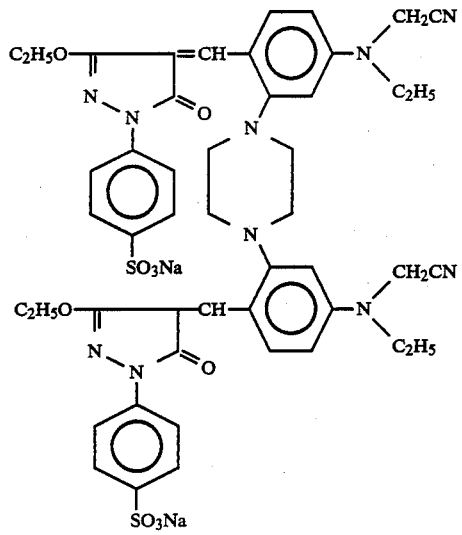
2-23.
(3) Compounds represented by general formulas (IV) to (VI).
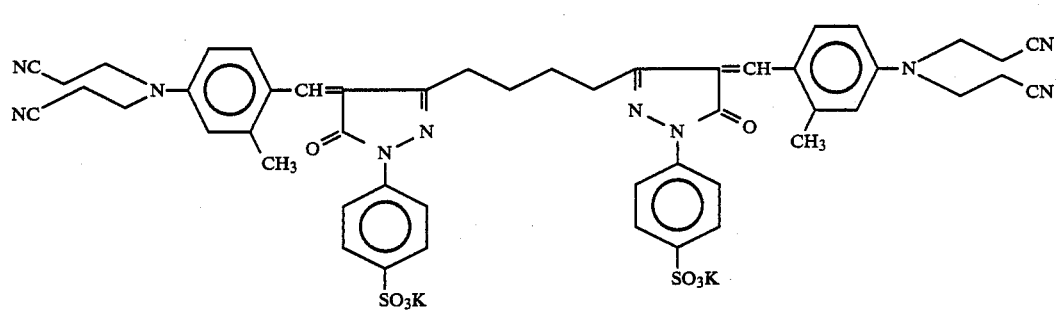
3-1.
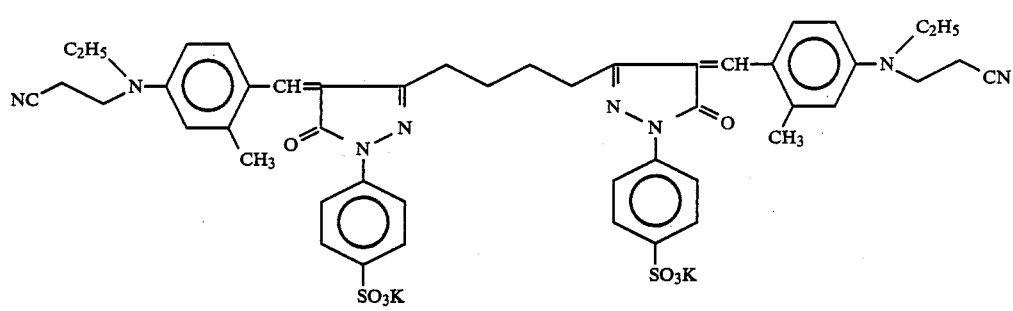
3-2.
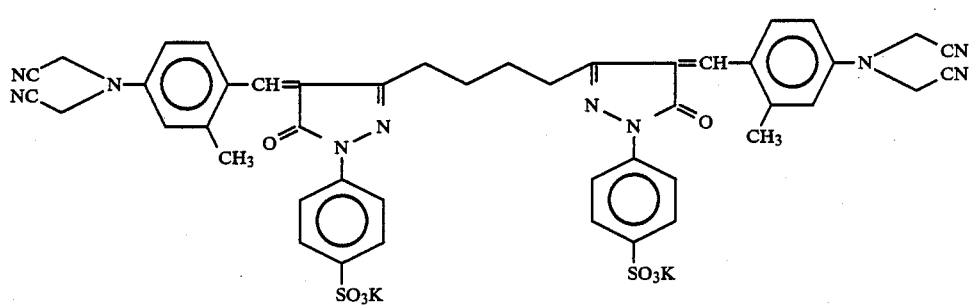
3-3.

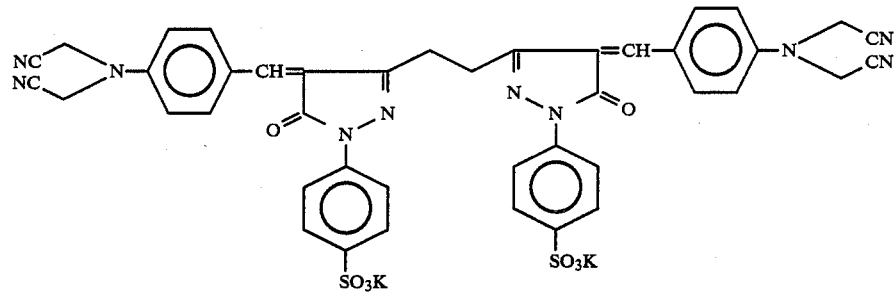
3-4.
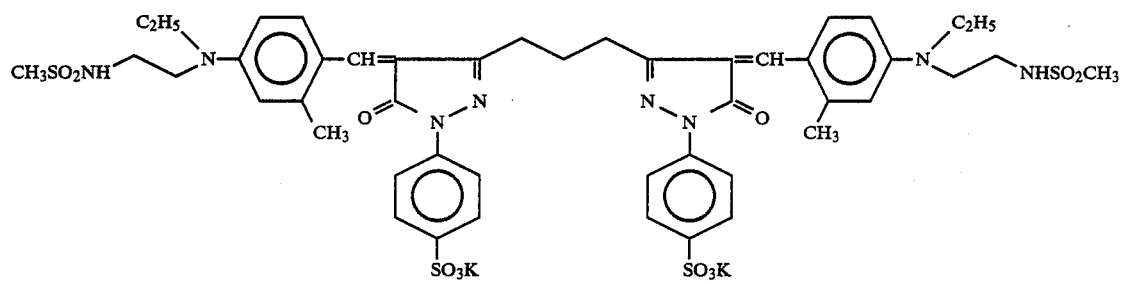
3-5.
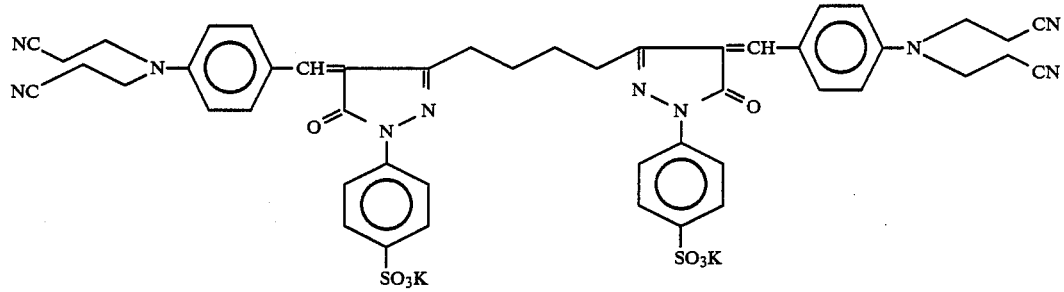
3-6.
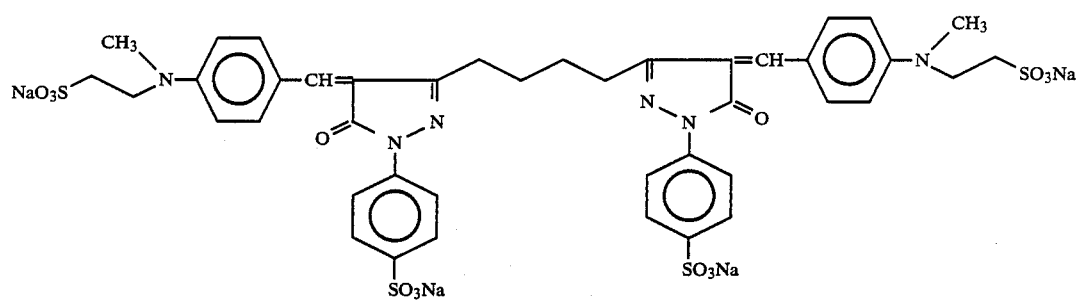
3-7.
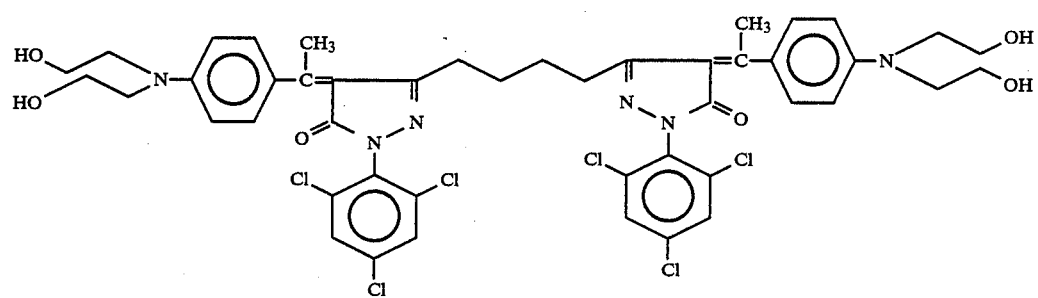
3-8.

-continued
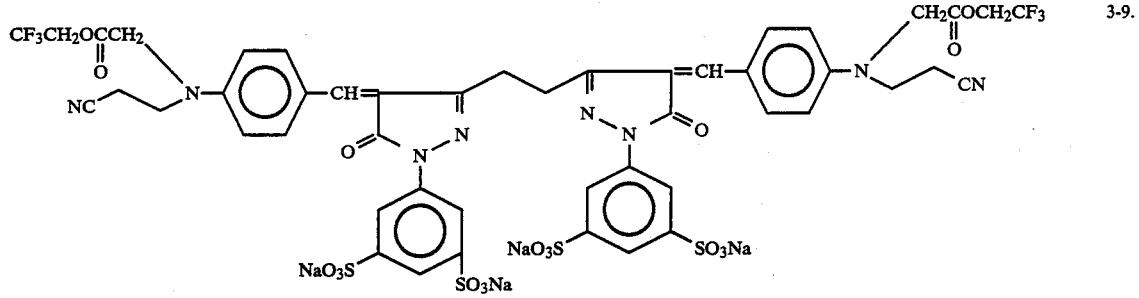
3-9.
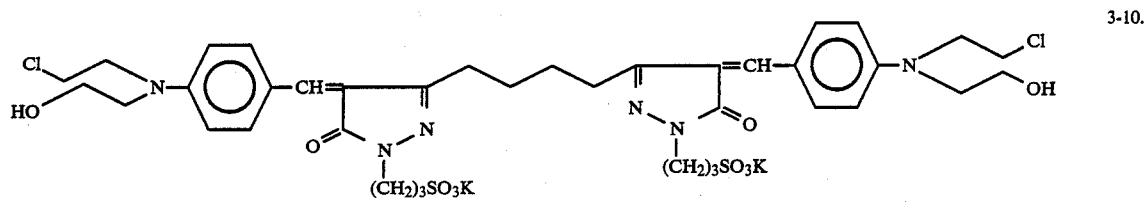
3-10.
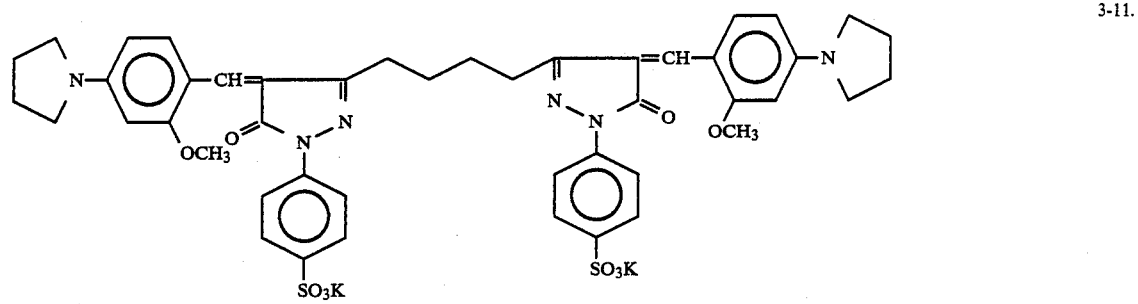
3-11.
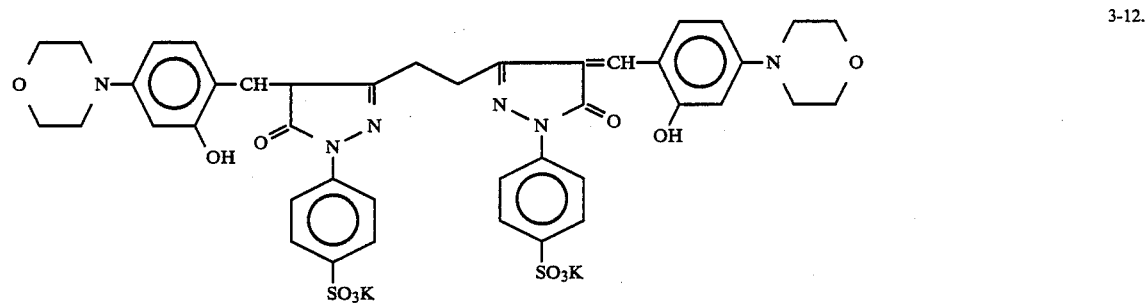
3-12.
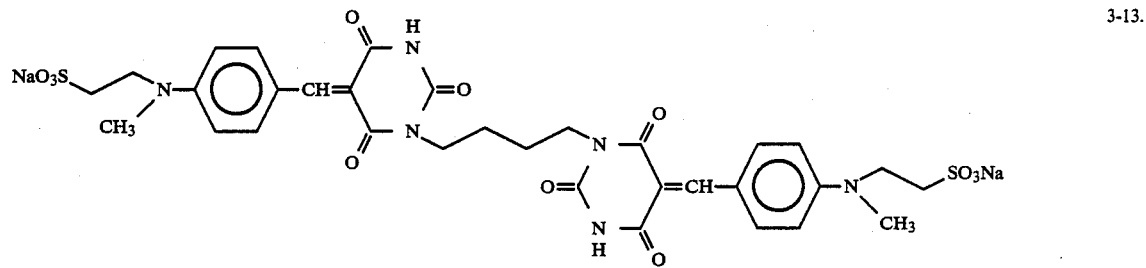
3-13.
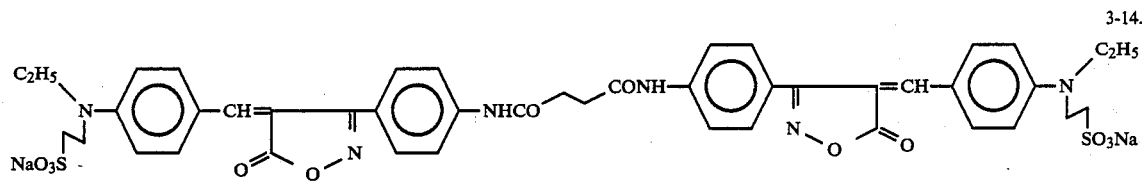
3-14.

-continued
3-15.
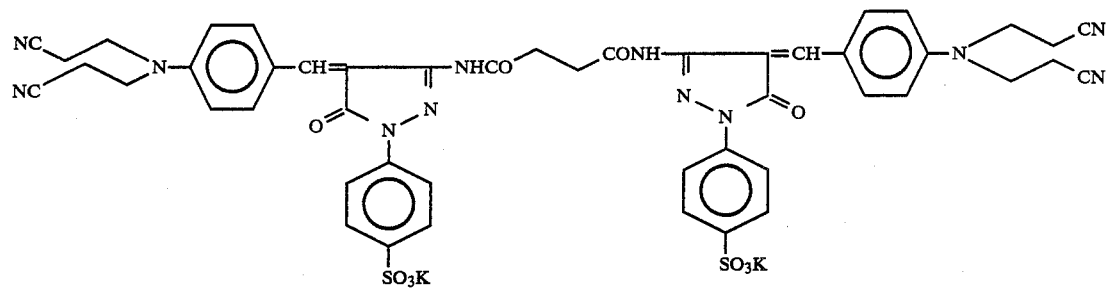
3-16.
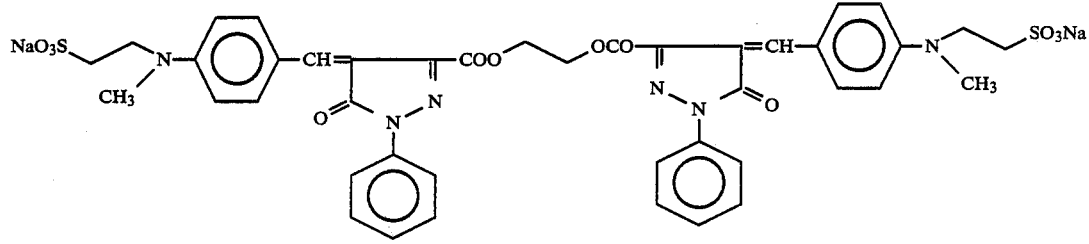
3-17.
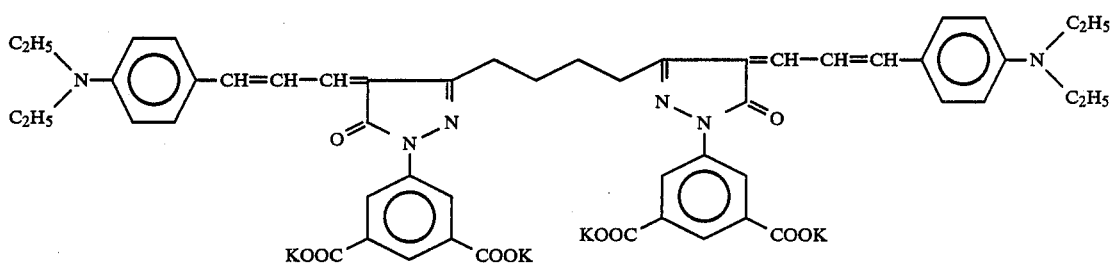
3-18.
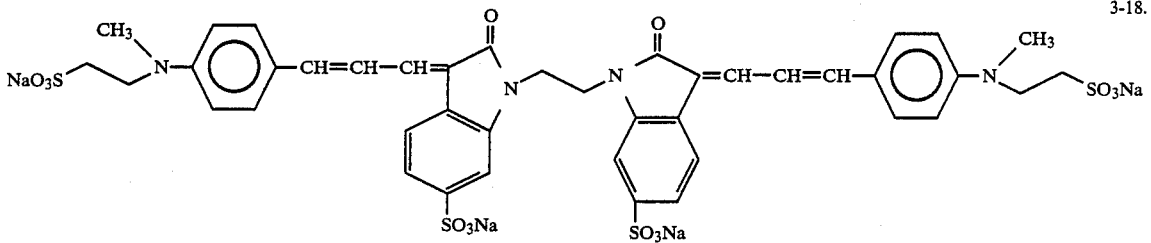
3-19.
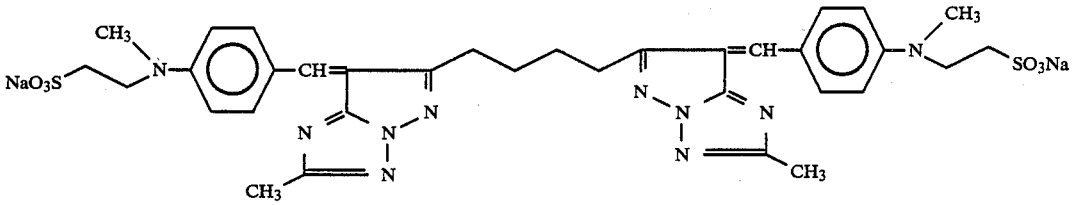
3-20.
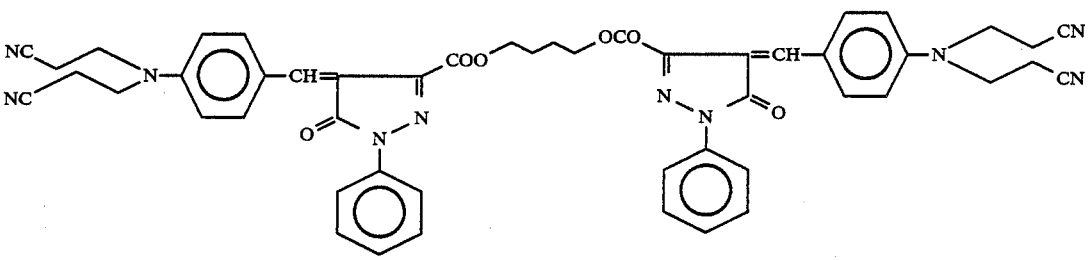

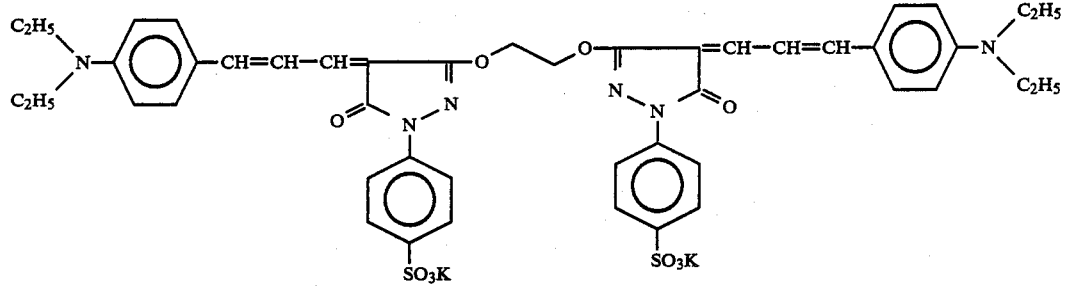
3-21.
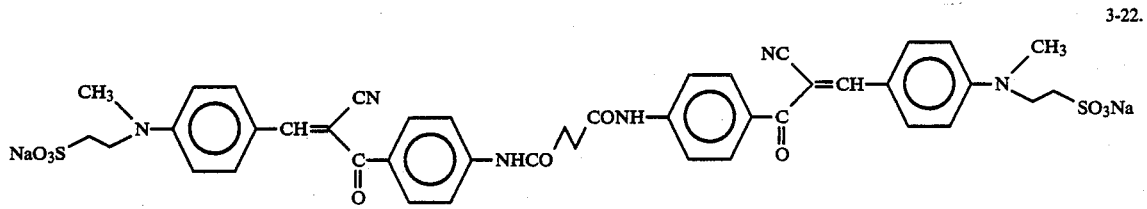
3-22.
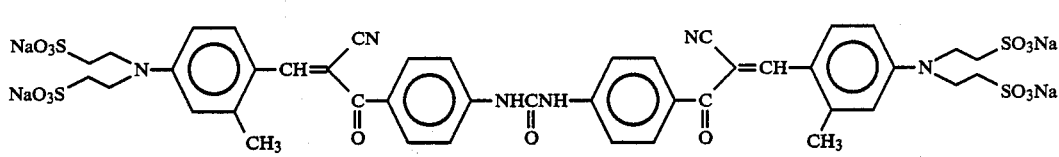
3-23.
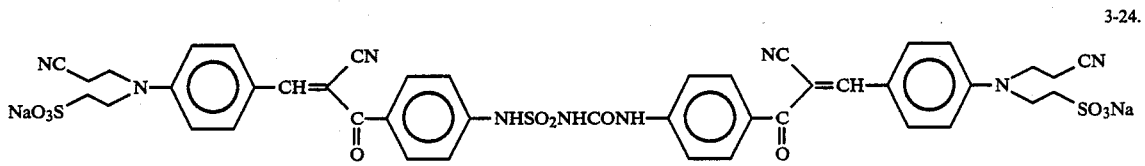
3-24.
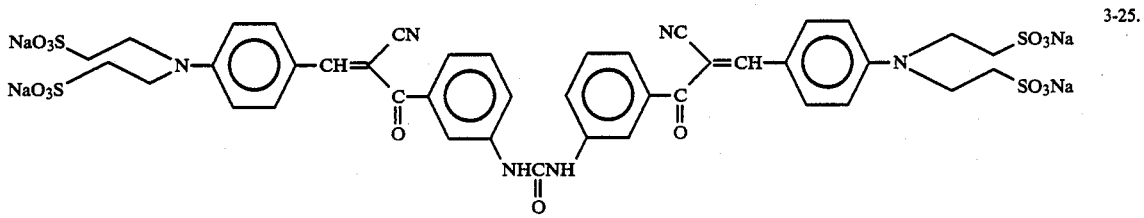
3-25.
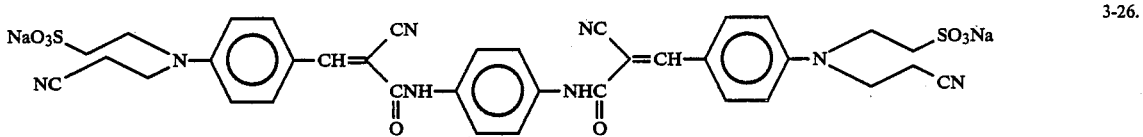
3-26.
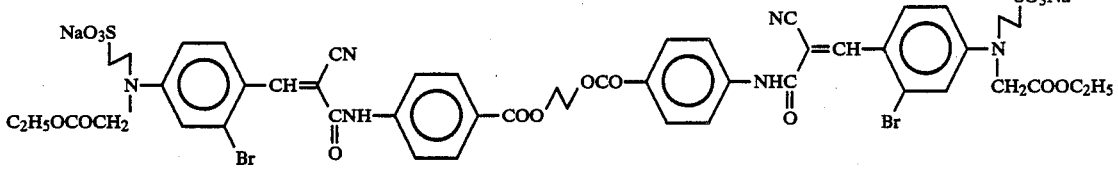
3-27.
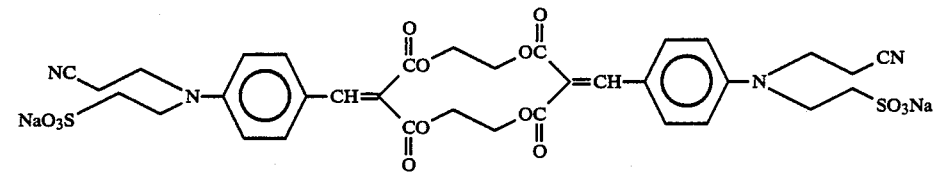
3-28.

-continued
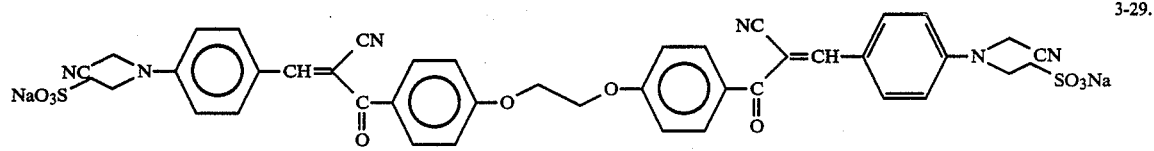
3-29.
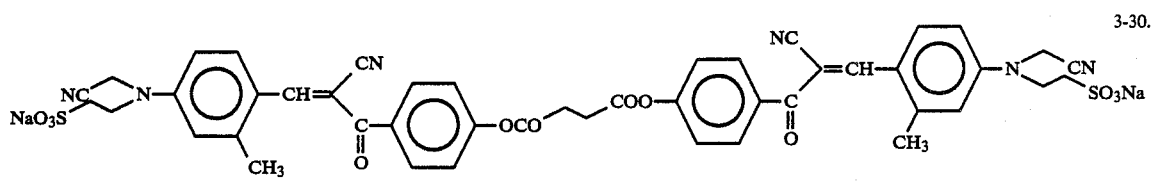
3-30.
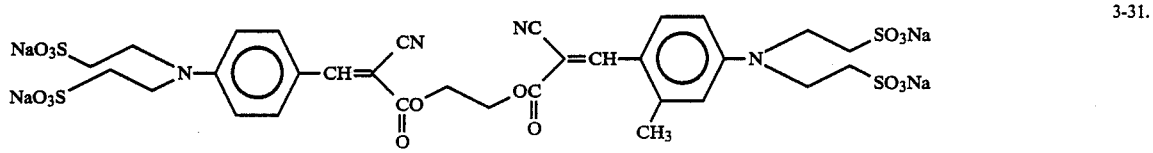
3-31.
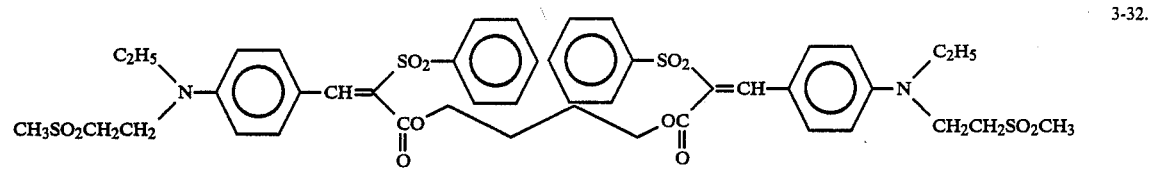
3-32.
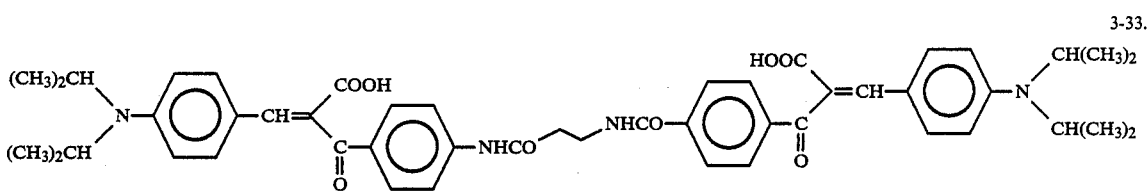
3-33.
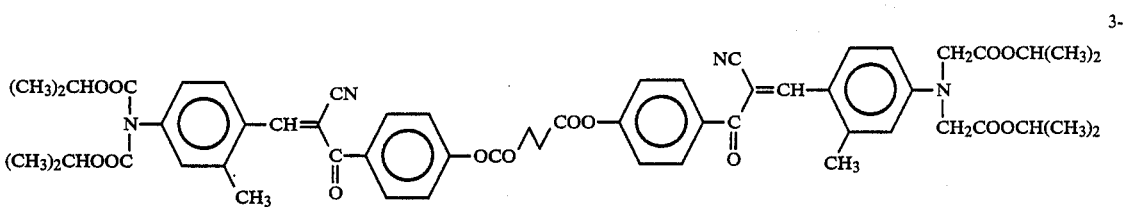
3-34.
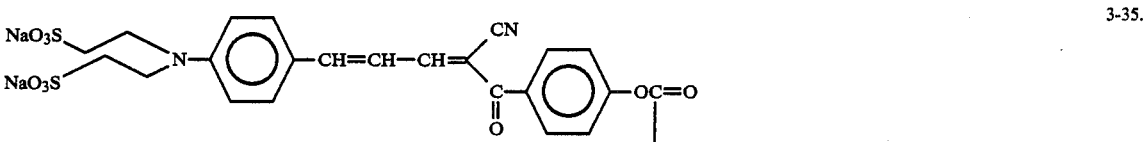
3-35.
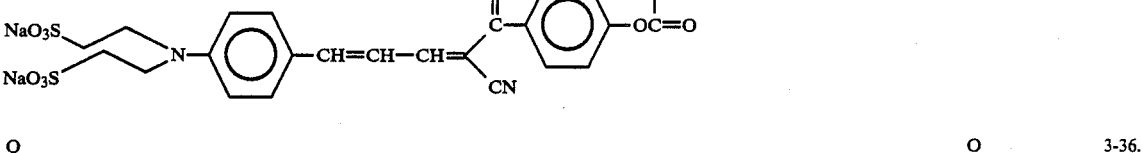
3-36.

3-37.

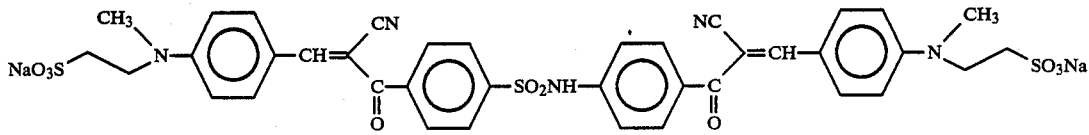

The following are the examples of the processes for synthesizing the typical compounds represented by general formulas (I) to (VI) which are used in this invention. The following processes can also be applied to the synthesis of other compounds.

Synthesis Example 1 (for Exemplified Compound 1-1)

7.0 g of N,N'-biscyanoethyl-N,N'-bis-(4-formyl-3-methylphenyl)-1,2-diaminoethane and 3.0 g of cyanoacetic acid were stirred in 200 ml of acetonitrile. Into the solution 3.0 g of ammonium acetate was added, and the reaction mixture was refluxed with heating for 3 hours. The resulting crystals were filtered out, washed with acetonitrile, and dried. There was obtained 7.2 g of Exemplified Compound 1-1 in crystal form. This compound has a melting point of 274° to 275° C., and the aqueous solution of this compound has the absorption maximum at a wavelength of 392 nm.

Synthesis Example 2 (for Exemplified Compound 1-13)

16.0 g of N,N'-biscyanoethyl-N,N'-bis-(4-formylphenyl)-1,2-diaminoethane and 26.0 g of 3-ethoxy-1-(4-sulfophenyl)pyrazolone sodium salt were stirred in 230 ml of methanol. Into the mixture, 30 ml of acetic acid was added, and the reaction mixture was refluxed with heating. After about 1 hour, the reaction system became uniform. The reaction was continued for about 1 hour. The reaction liquid was cooled to room temperature for crystallization. The crystals were filtered out, washed with methanol, and dried. There was obtained 32.1 g of Exemplified Compound 1-13 in crystal form. This compound has a melting point higher than 300° C., and the aqueous solution of this compound has the absorption maximum at a wavelength of 422 nm.

Synthesis Example 3 (for Exemplified Compound 1-35)

8.1 g of N,N'-biscyanoethyl-N,N'-bis-(4-formyl-3-methylphenyl)-1,2-diaminoethane and 9.9 g of 3-ethoxy- carbonyl-1-(3-sulfopropyl)pyrazolone were stirred in 150 ml of methanol. Into the mixture, 5.6 ml of triethylamine and 15 ml of acetic acid were added, and the reaction mixture was refluxed with heating. After about 2.5 hours, 150 ml of dimethylformamide was added to make the reaction liquid uniform. 20 ml of methanol solution containing 4.0 g of potassium acetate was added for crystallization. The crystals were filtered out, washed with ethanol, and dried. There was obtained 12.2 g of Exemplified Compound 1-35 in crystal form. This compound has a melting point of 187° C. (with decomposition), and the aqueous solution of this compound has the absorption maximum at a wavelength of 486 nm.

Synthesis Example 4 (for Exemplified Compound 2-7)

8.0 g of 1,2-bis-{5-(N,N-dicyanoethylamino)-2-formylphenoxy}ethane and 9.6 g of 3-ethoxy-1-(4sulfophenyl)pyrazolone sodium salt were stirred in 200 ml of methanol. Into the mixture, 12 ml of acetic acid was added, and the reaction mixture was refluxed with heating for about 2.5 hours. The reaction liquid was cooled to room temperature for crystallization. The crystals were filtered out, washed with methanol, and dried. There was obtained 12.1 g of Exemplified Compound 2-7 in the form of orange crystals. This compound has a melting point higher than 270° C., and the aqueous solution of this compound has the absorption maximum at a wavelength of 412 nm.

Synthesis Example 5 (for Exemplified Compound 2-12)

12.0 g of 1,2-bis-{5-(N-dicyanomethyl-N-methylamino)2-formylanilino}ethane and 18.2 g of 3-ethoxy-1-(4sulfophenyl)pyrazolone sodium salt were stirred in 300 ml of methanol. Into the mixture, 17 ml of acetic acid and 1 ml of triethylamine were added, and the reaction mixture was refluxed with heating for about 2 hours. The reaction liquid was cooled to room temperature for crystallization. The crystals were filtered out, washed with methanol, and dried. There was obtained 22.3 g of Exemplified Compound 2-12 in the form of red-orange crystals. This compound has a melting point higher than 270° C., and the aqueous solution of this compound has the absorption maximum at a wavelength of 452 nm.

Synthesis Example 6 (for Exemplified Compound 3-7)

7.9 g of 4-formyl-N-methyl-N-(2-sulfoethyl)aniline sodium salt and 8.0 g of 1,4-bis-{1-(4-sulfophenyl)-5-pyrazolon-3-yl}butane were stirred in 180 ml of methanol. Into the mixture, 15 ml of acetic acid and 5 ml of triethylamine were added, and the reaction mixture was refluxed with heating for about 3 hours. 150 ml of water was added to the reaction liquid. Foreign matters were filtered off. To the filtrate were rapidly added a methanol solution containing 3.7 g of sodium acetate and then 500 ml of ethanol. The reaction liquid was allowed to stand for crystallization. The crystals were filtered out and washed with ethanol, followed by recrystallization from ethanol and water. There was obtained 10.1 g of Exemplified Compound 3-7 in the form of orange-yellow crystals. This compound has a melting point higher than 300° C., and the aqueous solution of this compound has the absorption maximum at a wavelength of 490 nm.

Synthesis Example 7 (for Exemplified Compound 3-22)

6.6 g of 4-formyl-N-methyl-N-(2-sulfoethyl)aniline sodium salt and 5.0 g of 1,2-bis[{4-cyanoacetyl)phenyl}aminocarbonyl]ethane were stirred in 300 ml of methanol. Into the mixture, 10 drops of piperidine were added as a catalyst. The reaction mixture was refluxed with heating for about 5 hours. The reaction liquid was allowed to cool to room temperature for crystallization. The crystals were filtered out, followed by recrystallization from methanol and water. There was obtained 6.8 g of Exemplified Compound 3-22 in the form of orange-yellow crystals. This compound has a melting point higher than 300° C., and the aqueous solution of this compound has the absorption maximum at a wavelength of 452 nm.

Where one of the dyes represented by general formulas (I) to (VI) above is used as a filter dye, irradiation preventing dye, or antihalation dye, it can be used in any effective amount, but the dye in the amount that gives an optical density of 0.05 to 3.0 is preferable. It may be added at any time before application. The coating amount of the dye is usually 0.001 to 1 g/m$^2$, preferably 0.001 to 0.5 g/m$^{b\,2}$.

The dye of this invention can be dispersed into emulsion layers and hydrophilic colloid layers (such as intermediate layers, protective layers, antihalation layers, and filter layers) according to any known methods as follows:

(1) A method of dissolving or dispersing the dye of this invention directly into an emulsion layer and hydrophilic colloid layer, or method of dissolving or dispersing the dye of this invention in aqueous solution or solvent and adding the resulting solution to an emulsion layer and hydrophilic colloid layer.

The dye can be dissolved into an adequate solvent such as methyl alcohol, ethyl alcohol, propyl alcohol, methyl cellosolve, halogenated alcohol (as disclosed in Japanese Patent Application (OPI) No. 9715/1973 and U.S. Pat. No. 3,756,830), acetone, water, pyridine, and mixtures thereof, or can be added into an emulsion as a solution.

(2) A method of dissolving the dye of this invention in an oil i.e., a substantially water-insoluble, high-boiling solvent (having a boiling point higher than about 160° C). and adding the resulting solution to a hydrophilic colloid solution for dispersion.

The high-boiling solvent includes, for example, alkyl ester of phthalic acid such as dibutyl phthalate and dioctyl phthalate (as disclosed in U.S. Pat. No. 2,322,027); phosphate esters such as diphenyl phosphate, triphenyl phosphate, tricresyl phosphate, and dioctylbutyl phosphate; citrate esters such as tributyl acetylcitrate; benzoate esters such as octyl benzoate; alkylamide such as diethyl lauryamide; fatty acid esters such as dibutoxyethyl succinate and diethyl azelate; and trimesate esters such as tributyl trimesate. Other solvents that can be used are organic solvents having a boiling point from about 30° C. to about 150° C. They include lower alkyl acetate such as ethyl acetate and butyl acetate, ethyl propionate, sec-butyl alcohol, methyl isobutyl ketone, 8-ethoxyethyl acetate, methyl cellosolve acetate, water-soluble solvent such as methanol and ethanol. The dye and high-boiling solvent should preferably be used in a ratio of 10/10 to 1/10 (by weight ratio).

(3) A method of adding the dye of this invention and other additives in the form of filling polymer latex to a photographic emulsion layer and other hydrophilic colloid layer.

The polymer latex is a polyurethane polymer or a polymer synthesized from a vinyl monomer. Proper vinyl monomers include acrylate esters (e.g., methyl acrylate, ethyl acrylate, butyl acrylate, hexyl acrylate, octyl acrylate, dodecyl acrylate, and glycidyl acrylate), α-substituted acrylate esters (e.g., methyl methacrylate, butyl methacrylate, octyl methacrylate, and glycidyl methacrylate), acrylamide (e.g., butyl acrylamide and hexyl acrylamide), α-substituted acrylamide (e.g., butyl methacrylamide and dibutyl methacrylamide), vinyl ester (e.g., vinyl acetate and vinyl butyrate), vinyl halide (e.g., vinyl chloride), vinylidene halide (e.g., vinylidene chloride), vinyl ether (e.g., vinyl methyl ether and vinyl octyl ether), styrene, x-substituted styrene (e.g., β-methylstyrene), nucleus-substituted styrene (e.g., hydroxystyrene, chlorostyrene, and methylstyrene), ethylene, propylene, butylene, butadiene, and acrylonitrile. These monomers may be used individually or in combination with one another or with a small amount of other vinyl monomers. Such other vinyl monomers include itaconic acid, acrylic acid, methacrylic acid, hydroxyalkyl acrylate, hydroxyalkyl methacrylate, sulfoalkyl acrylate, sulfoalkyl methacrylate, and styrenesulfonic acid.

The filling polymer latex can be produced according to the processes disclosed in Japanese Patent Publication No. 39853/1976 and Japanese Patent Application (OPI) Nos. 59943/1976, 137131/1978, 32552/1979, 107941/1979, 133465/1980, 19043/1981, 19047/1981, 126830/1981, and 149038/1983.

The dye and polymer latex may preferably be used in a ratio of 10/10 to 1/10 (by weight ratio).

(4) A method of causing the dye to exist locally in a specific layer through the mutual reaction between the dye xolecule and a hydrophilic polymer as a mordant, having a charge opposite to dye ion and coexistent in the layer.

The polymer xordant includes a polymer containing a secondary and tertiary amino group, a polymer having a nitrogen-containing heterocyclic portion, and a polymer containing a quaternary cation group. It has a molecular weight higher than 5000, preferably higher than 10000.

Examples of the xordant polymer include vinylpyridine polymer and vinylpyridinium cation polymer as disclosed in U.S. Pat. No. 2,548,564; vinylimidazolium cation polymer as disclosed in U.S. Pat. No. 4,124,386; polymer mordant crosslinkable with gelatin as disclosed in U.S. Pat. No. 3,625,694; aqueous sol type mordant as disclosed in U.S. Pat. No. 3,958,995 and Japanese Patent Application (OPI) No. 115228/1979; water-insoluble xordant as disclosed in U.S. Pat. No. 3,898,088; reactive mordant capable of forming covalent bond with the dye as disclosed in U.S. Pat. No. 4,168,976; polymer derived from an ethylenically unsaturated compound having a dialkylamino alkyl ester residue as disclosed in British Patent No 685,475; product obtained by the reaction of polyvinyl alkyl ketone and aminoguanidine as disclosed in British Patent No. 850,281; and polymer derived from 2-methyl-1-vinylimidazole as disclosed in U.S. Patent No. 3,445,231.

(5) A method of dissolving the dye by using a surface active agent.

The surface active agent utilizable may be an oligomer or polymer. The polymeric surface active agent is described in detail on pages 19 to 27 of the specification of Japanese Patent Application No. 12766/1984 (filed on Jan. 26, 1984 by Fuji Photo Film Co., Ltd.). (6) The same method as (2) except that a hydrophilic polymer is used solely or in combination with a high-boiling solvent instead of the high-boiling solvent.

This method is disclosed in U.S. Pat. No. 3,619,195 and West Germany Patent No. 1,957,467.

(7) A method of microencapsulation with a polymer having the carboxyl group or sulfonic acid group on the side chain as disclosed in Japanese Patent Application (OPI)
No. 113434/1984.

The hydrophilic colloid dispersion obtained as mentioned above may be incorporated with hydrosol of lipophilic polymer as described in Japanese Patent Publication No. 39835/1976.

The hydrophilic colloid is typically a gelatin, and any other known ones for photographic use can be used.

The silver halide that can be used in this invention may be any of silver bromide, silver iodobromide, silver iodochlorobromide, silver chlorobromide, and silver chloride. Preferred ones are silver bromide, silver chlorobromide, silver iodobromide, and silver iodochlorobromide.

The silver halide in the photographic emulsion may be of grains of regular crystal form such as cube and octahedron or grains of irregular crystal form such as sphere and plate, or grains of composite crystal form thereof. It may be a mixture of grains of different crystal forms.

The silver halide grains may be of the uniform phase type or of such a different-phase type as the phase inside differs from the phase in the surface layer. In addition, the silver halide particles may be of surface latent image type or internal latent image type, in the former the latent image being formed on the surface of grains and in the latter, being formed inside grains. The former type is used for negative-type emulsions and the latter type is used for internal latent image type emulsions and prefogged direct reversal type emulsions.

The silver halide emulsion used in this invention may contain plate grains having a thickness of 0.5 μm or less, preferably of 0.3 μm or less, a diameter of 0.6 μm or more, said plate grains being characterized by that those having an average aspect ratio of 5 or more account for more than 50% of their total projected area. Moreover, the emulsion may be a xonodisperse emulsion in which particles having a diameter within the average diameter ±40% account for 95% or more of the total number of particles.

The photographic emulsion used in this invention can be prepared according to the processes described, for example, in Chimie et Physique Photographique by P. Glafkides (Paul Montel, 1967), Photographic Emulsion Chemistry by G. F. Duffin (Focal Press, 1966), and Making and Coating Photographic Emulsion by V. L. Zelikman (Focal Press, 1964).

When the silver halide grains used in this invention are formed, the growth of grains may be controlled by adding a silver halide solvent such as ammonia, potassium thiocyanate, ammonium thiocyanate, thioether compound (as disclosed in U.S Pat. Nos. 3,271,157, 3,574,628, 3,704,130, 4,297,439, and 4,276,374), thion compound (as disclosed in Japanese Patent Application (OPI) Nos. 144319/1978, 82408/1978 and 77737/1980), or amine compound (as disclosed in Japanese Patent Application (OPI) No. 100717/1979).

The formation or physical ripening of the silver halide crystals may be carried out in the presence of a cadmium salt, zinc salt, thallium salt, iridium salt or complex salt thereof, rhodium salt or complex salt thereof, or iron salt or complex salt thereof.

The silver halide emulsion is usually chemically sensitized according to a method, for example as described in pages 675 to 734 in Die Grundlagen der Photographischen Prozesse mit Silberhalogeniden, compiled by H. Frieser (Akademische Verlagsgesellschaft, 1968).

The chemical sensitization may be accomplished by the sulfur sensitization that employs a sulfur-containing compound reactive to active gelatin and silver (e.g., thiosulfates, thiourea, mercapto compounds, and rhodanine), the reduction sensitization that employs a reducing substance (e.g., stannous salts, amines, hydrazine derivatives, formamidinesulfinic acid, and silane compounds), the noble metal sensitization that employs a noble metal compound (e.g., a gold complex, and complex salts of Group VIII metals such as Pt, Ir, and Pd). The sensitization methods may be applied individually or in combination with one another.

The photographic emulsion used in this invention may contain a variety of compounds for the prevention of fog that would otherwise occur during the manufacturing process, preservation, or photographic processing, and for the stabilization of photographic performance. Examples of such antifoggants and stabilizers include azoles (e.g., benzothiazolium salts, nitroindazoles, triazoles, benzotriazoles, benzimidazoles (particularly the nitro- or halogen-substituted); heterocyclic mercapto compounds such as mercaptothiazoles, mercaptobenzothiazoles, mercaptobenzimidazoles, mercaptothiadiazoles, mercaptotetrazoles (particularly 1-phenyl-5-mercaptotetrazole), and mercaptopyrimidines; the above-stated heterocyclic mercapto compounds having a water-soluble group such as carboxyl group and sulfone group; thioketo compounds such as oxazolinethione; azaindenes such as tetraazaindenes (particularly 4-hydroxy-substituted (1,3,3a,7)-tetraazaindene); benzenethiosulfonic acids; and benzenethiosulfinic acids.

The silver halide photographic emulsion of this invention may contain a color coupler such as cyan coupler, magenta coupler, and yellow coupler, and a compound to disperse the coupler.

Namely, it may contain a compound that forms a color upon oxidation coupling with an aromatic primary amine developing agent (such as phenylenediamine derivative and aminophenol derivative). Examples of magenta coupler include 5-pyrazolone coupler, pyrazolobenzimidazole coupler, cyanoacetylcoumarone coupler, and open chain acylacetonitrile coupler. Examples of yellow coupler include acylacetamide coupler such as benzoyl acetanilide and pivaloyl acetanilide. Examples of cyan coupler include naphthol coupler and phenol coupler. Preferably these couplers are non-diffusion couplers having in the molecule a hydrophobic group called ballast group. The coupler may be of four-equivalent type or two-equivalent type for silver ions. The coupler may be a colored coupler which has the color correcting effect or the so-called DIR coupler which releases a development inhibitor as development proceeds.

The silver halide photographic emulsion of this invention may contain, in addition to DIR coupler, a non-coloring DIR coupling compound which form a colorless product upon coupling reaction and releases a development inhibitor.

For the purpose of elevating sensitivity and contrast and of acceleration of development, the photographic emulsion of this invention may contain polyalkylene oxide or ether-, ester-, or amine-derivative thereof, thioether compound, thioxorpholines, quaternary ammonium salt compound, urethane derivative, urea derivative, imidazole derivative, or 3-pyrazolidone.

The silver halide photographic emulsion of this invention may contain, in addition to the dyes disclosed herein, any known water-soluble dyes (such as oxonol dyes, hemioxonol dyes, and merocyanine dyes) as the filler dye or for the prevention of irradiation and for other purposes. It may also contain any known cyanine dye, merocyanine dye, and hemicyanine dye as a spectral sensitizer.

The photographic emulsion of this invention may contain a variety of surface active agent for coating aid, antistatic, improvement in slip properties, emulsification and dispersion, blocking prevention, and improvement in photographic properties (such as accelerated development, high contrast, and sensitization).

The photosensitive material of this invention may contain a discoloration prevention agent, hardening agent, color-fogging preventing agent, UV light absorber, protective colloid such as gelatin, and other additives. Detailed description of these additives will be found in Research Disclosure Vol. 176 (1978, XII) RD-17643.

The finished emulsion is applied to a proper base such as baryta paper, resin-coated paper, synthetic paper, triacetate film, polyethylene terephthalate film, or other plastic base, or glass plate.

The silver halide photographic material of this invention may be practiced in the form of color positive film, color paper, color negative film, color reversal film (with or without couplers), light-sensitive material for printing-plate (e.g., lith film and lithoduplicate film), CRT display light-sensitive material (X-ray recording emulsion light-sensitive material, direct- or indirect photographic taking material using a screen), light-sensitive material for silver salt diffusion transfer process, light-sensitive material for color diffusion transfer process, light-sensitive material for dye transfer process (inhibition transfer process), emulsion for silver dye bleach process, light-sensitive material to record print-out images, direct print image light-sensitive material, light-sensitive material for thermal development, and light-sensitive material for physical development.

Exposure to form photographic images can be accomplished according to the usual manner. Namely, a known light source such as natural light (sunlight), tungsten lamp, fluorescent lamp, mercury lamp, xenon arc lamp, carbon arc lamp, xenon flash lamp, and CRT flying spot can be used. The exposure time is not limited to that for ordinary cameras (1/1000 sec to 1 sec). Exposure as short as $1/10^4$ to $1/10^1$ by a xenon flash lamp or CRT is possible and exposure longer than 1 second is also possible. If necessary, it is possible to control the spectral energy distribution of the light for exposure by means of a proper color filter. The light-sensitive material of this invention may be exposed with laser light or light emitted by the fluorescent material excited by electron ray, X-ray, $\gamma$-ray, or $\alpha$-ray.

The light-sensitive material of this invention may be processed by any known method with any known processing solution as disclosed in Research Disclosure No. 176, pp. 28–30 (RD-17643). It may undergo the black and white photographic processing to form silver images or the color photographic processing to form color images. The processing temperature is usually 18° to 50° C., but it is not limitative.

According to the present invention there can be provided a silver halide light-sensitive material having hydrophilic colloid layers containing a new dye which exhibits adequate spectral absorption, which dyes specific layers selectively, and which does not diffuse to other layers.

According to the present invention there can be provided a silver halide light-sensitive material having hydrophilic colloid layers containing a new dye which is decolorized during the photographic processing and which does not produce any adverse effect on the photographic properties, especially spectral sensitization, of photographic emulsions.

According to the present invention there is provided a silver halide light-sensitive material which is stable for a long period of time.

BEST MODE FOR CARRYING OUT THE INVENTION

The present invention is described in more detail with reference to the Examples that follow.

Incidentally, the test methods used in the examples are as follows:
(1) Relative sensitivity:

A reciprocal of the exposure that gives a density of 1.5. The sensitivity in the case where no dye is added is 100 (as is in Samples 1, 19, and 60).

(2) Gradation $\gamma = \dfrac{3.0 - 0.3}{-(\log EX_1 - \log EX_2)}$ where $EX_1$ exposure to give a density of 0.3
$EX_2$ exposure to give a density of 3.0
(3) Fogging after safelight irradiation:

Fogging that takes place when the light-sensitive material is developed after irradiation (about 200 lux)

for 1 hour under a discoloration preventing fluorescent lamp (FLR 40 SW-DL-X Nu/M, made by Toshiba).

(4) Residual color:

Absorption maximum ($\lambda_{max}$) measured after development.

(5) Dye coloring = $\frac{\text{Dmax of film after water washing}}{\text{Dmax of film before water washing}} \times 100$

EXAMPLE 1 a silver halide emulsion including silver chlorobromide (silver bromide is 5 mol %, average particle diameter of silver bromide is 0.25 μm) containing $1 \times 10^{-5}$ mole of Rh per mole of silver was prepared.

This emulsion was divided into nine portions. Each portion was incorporated with 2-hydroxy-4. 6-dichloro-1,3,5-triazine sodium as a hardening agent and potassium polystyrenesulfonate as a thickening agent. The emulsion was applied to polyethylene terephthalate film at a coating amount of 4 g/m² in terms of silver. Each emulsion layer was coated with a gelatin solution so as to form a protective layer, containing or not containing the dye shown in Table 1 at a coating amount of 1.0 g/m² in terms of gelatin. The gelatin solution contained sodium p-dodecyl-benzenesulfonate as a coating aid and potassium polystyrenesulfonate as a thickening agent.

Each sample film thus obtained was exposed through an optical wedge by using a printer (Model P-607, made by DaiNippon Screen Mfg. Co., Ltd.) and the exposed film was developed with a developing solution (LD-835, made by Fuji Photo Film Co., Ltd.) The results are shown in Table 1.

TABLE 1

| Sample | Dye (Exemplified Compound No.) | λ max (H₂O) | Coating amount (g/m²) In protective layer | (1) Relative sensitivity | (2) γ | (3) Fog after exposure to safelight | (4) Residual color |
|---|---|---|---|---|---|---|---|
| 1 | | | | 100 | 6.5 | 2.00 | 0.00 |
| 2 (This invention) | 1-63 | 434 nm | 0.20 | 65 | 5.9 | 0.22 | 0.01 |
| 3 (This invention) | 1-27 | 428 nm | 0.21 | 63 | 6.0 | 0.21 | 0.01 |
| 4 (This invention) | 1-40 | 475 nm | 0.12 | 68 | 5.7 | 0.28 | 0.01 |
| 5 (This invention) | 1-36 | 432 nm | 0.24 | 65 | 5.8 | 0.22 | 0.01 |
| 6 (This invention) | 1-14 | 420 nm | 0.24 | 63 | 5.5 | 0.23 | 0.01 |
| 7 | Comparative Compound D | 430 nm | 0.15 | 71 | 4.5 | 0.21 | 0.01 |
| 8 | B | 456 nm | 0.13 | 68 | 4.6 | 0.22 | 0.01 |
| 9 | A | 444 nm | 0.41 | 74 | 5.2 | 0.23 | 0.05 |

Note:
Test methods for (1), (2), (3), and (4) are as mentioned above.
Comparative Compounds A, B, and C have the following structures.

Comparative Compound A (described in U.S. Pat. No. 3,002,837)

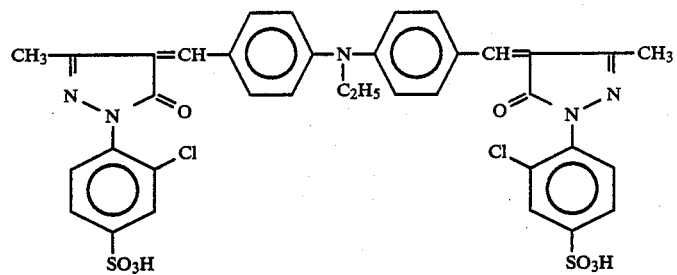

Comparative Compound B

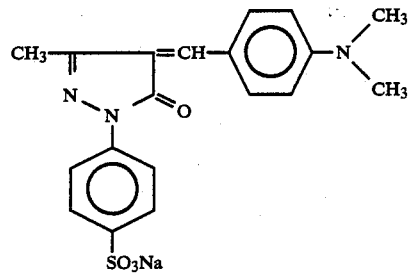

Comparative Compound C

-continued

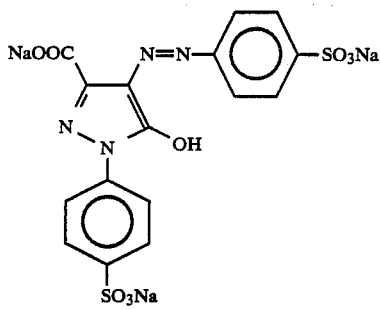

As is evident from the results in Table 1, in Samples 7 and 8 the dye added to the protective layer diffused almost entirely to the emulsion layer and the γ value greatly decreased although the safety to safelight was achieved. In the case of Sample 9, the dye scarcely diffused to the emulsion layer but the residual color was extremely high. In contrast, in the cases of Samples 2 to 6 according to this invention, the dye added to the protective layer did not diffuse to the emulsion layer, the safety to safelight increased with a very little decrease in the γ value, and there was almost no residual color.

EXAMPLE 2

5 g of exemplified compound 1-13 was dispersed and dissolved in 100 ml of water, and the resulting solution was mixed with 250 g of 14% gelatin solution, followed by stirring by using a colloid mill. The resulting composition was applied to a cellulose triacetate film base at a coating amount of 8 g/m². The resulting product was designated as Sample 10.

The same procedure as the above was repeated except that instead of exemplified compound 1-13 exemplified compounds 1-40, 1-14, 1-15 and 1-77 were used, to give Samples 11 to 14, respectively. Further, Samples 15 to 17 were prepared in the same manner as the above using Comparative Compounds A, B, D, and E. Sample 19 was prepared from exemplified compound 1-13 in such a manner that the mixing of the aqueous solution and gelatin solution was accomplished by adding tricresyl phosphate (dye/oil ratio=1), ethyl acetate, and sodium p-dodecyl benzenesulfonate as an emulsifier. Sample 20 was prepared in the same manner as used for Sample 19 except that polyethyl acrylate (dye/polymer ratio =1) was used in place of tricresyl phosphate.

Each of the samples thus prepared was cut to 5 cm², and the cut sample was examined for absorption spectrum of visible light. Then, the sample was washed with water (20 ml) at 38° C. for 3 minutes. After drying, the sample was examined again for absorption spectrum. The dyeing power of the dye was evaluated according to the following formula.

$$\text{Dyeing power} = \frac{\text{Dmax of film after water washing}}{\text{Dmax of film before water washing}} \times 100$$

The decolorized ability (the ability to be decolorized) was evaluated by measuring the absorption spectrum of the sample (5 cm²), which had been dipped in the following solution at 38° C. for 3 minutes, followed by water washing and drying.

| Water | 1000 cc |
|---|---|
| Metol (Tradename) | 2 g |
| Hydroquinone | 5 g |
| Sodium sulfite | 70 g |
| Calcium carbonate | 40 g |
| Potassium bromide | 2 g |

$$\text{Decolorized ability} = \left(1 - \frac{\text{Dmax of film after decolorization}}{\text{Dmax of film before decolorization}}\right) \times 100$$

The results are shown in Table 2.

TABLE 2

| Sample | Dye (Exemplified Compound No.) | Dyeing power | Decolorized ability | Remarks |
|---|---|---|---|---|
| 10 | 1-13 | 100 | 100 | This invention |
| 11 | 1-40 | 100 | 99 | This invention |
| 12 | 1-14 | 100 | 97 | This invention |
| 13 | 1-15 | 99 | 100 | This invention |
| 14 | 1-77 | 100 | 100 | This invention |
| 19 | 1-13 | 100 | 98 | This invention |
| 20 | 1-13 | 100 | 98 | This invention |
| 15 | Comparative compound A | 98 | 91 | Comparative Example |
| 16 | Comparative compound B | 7 | 100 | Comparative Example |
| 17 | Comparative compound D | 88 | 23 | Comparative Example |
| 18 | Comparative | 95 | 90 | Comparative |

TABLE 2-continued

| Sample | Dye (Exemplified Compound No.) | Dyeing power | Decolorized ability | Remarks |
|---|---|---|---|---|
| | compound E | | | Example |

Note:
Comparative Compounds D and E are as follows:
Comparative Compound D

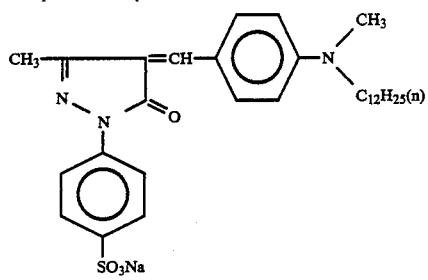

Comparative Compound E (described in U.S. Pat. No. 3,389,994)

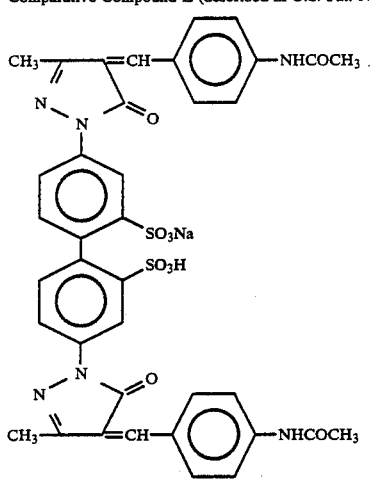

As is apparent from the results in Table 2 Samples used in this invention are all stable to water washing and have sufficient dyeing power, and they are substantially completely decolorized after treatment.

The result obtained with Sample 19 indicates that the dye of this invention exhibits good dyeing power and ability to be decolorized even when it is dispersed by the aid of an emulsifier.

EXAMPLE 3

A silver halide emulsion including silver chlorobromide (silver bromide is 5 mol%, average particle diameter of silver bromide is 0.23 μm) containing $0.8 \times 10^{-5}$ mole of Rh per mole of silver was prepared.

This emulsion was divided into eleven portions. Each portion was incorporated with the same hardening agent and thickening agent as used in Example 1. The emulsion was applied to polyethylene terephthalate film at a coating amount of 3.8 g/m² in terms of silver. Each emulsion layer was coated with a solution to form a protective layer containing gelatin (in an amount of 1 g/m²), mordant (in an amount of 0.05 g/m²), and the dye shown in Table 3. The same coating aid as used in Example 1 was used.

Mordant

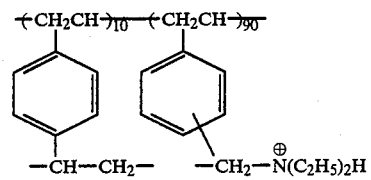

Each sample film thus obtained was treated in the same manner as in Example 1 and examined for relative sensitivity, γ, fog after exposure to safelight, and residual color in the same manner as in Example 1. The results are shown in Table 3.

TABLE 3

| Sample | Dye Exemplified Compound No. | λ max (H₂O) | Dye coated amount | Mordant | (1) Relative sensitivity | (2) γ | (3) Fog after exposure to safelight | (4) Residual color |
|---|---|---|---|---|---|---|---|---|
| 21 | — | — | — | — | 100 | 6.5 | 1.98 | 0.00 |
| 22 (This invention) | 1-16 | 408 nm | 0.18 g/m² | — | 64 | 5.2 | 0.25 | 0.01 |
| 23 (This invention) | 1-28 | 460 nm | 0.20 g/m² | — | 68 | 5.3 | 0.31 | 0.01 |
| 24 (This invention) | 1-25 | 439 nm | 0.19 g/m² | — | 70 | 5.7 | 0.33 | 0.01 |
| 25 (This invention) | 1-64 | 458 nm | 0.18 g/m² | — | 66 | 5.4 | 0.28 | 0.01 |
| 26 (This invention) | 1-65 | 422 nm | 0.18 g/m² | — | 65 | 5.4 | 0.27 | 0.01 |
| 27 (This invention) | 1-16 | 408 nm | 0.18 g/m² | Containing | 65 | 5.6 | 0.23 | 0.01 |
| 28 (This invention) | 1-28 | 460 nm | 0.20 g/m² | Containing | 67 | 5.5 | 0.30 | 0.01 |
| 29 (This invention) | 1-25 | 439 nm | 0.19 g/m² | Containing | 69 | 5.9 | 0.31 | 0.01 |
| 30 (This invention) | 1-64 | 458 nm | 0.18 g/m² | Containing | 65 | 5.7 | 0.27 | 0.01 |
| 31 (This invention) | 1-65 | 422 nm | 0.18 g/m² | Containing | 66 | 5.6 | 0.25 | |

Note:
Test methods for (1), (2), (3), and (4) are as mentioned above.

As is evident from the results in Table 3, the combination of the dye and mordant in this invention reduces the diffusion of the dye to an emulsion layer, prevents the γ value from lowering, and improves the safety to safelight.

The samples thus obtained underwent bathing with water at 40° C. for 5 minutes to evaluate the dyeing power of the dye. The samples were also developed in the same manner as in Example 1 to examine the dye for residual color. The results are shown in Table 4.

TABLE 4

| Sample | Dye (Exemplified Compound No.) | λ max (H₂O) | 5 Dyeing power | 4 Residual color |
|---|---|---|---|---|
| 32 | 1-18 | 442 nm | 94 | 0.00 |
| 33 | 1-66 | 438 nm | 95 | 0.00 |
| 34 | 1-71 | 434 nm | 93 | 0.02 |
| 35 | 1-70 | 420 nm | 100 | 0.00 |
| 36 | 1-72 | 438 nm | 100 | 0.00 |
| 37 | 1-20 | 498 nm | 100 | 0.01 |
| 38 | 1-68 | 463 nm | 100 | 0.02 |
| 39 | 1-45 | 460 nm | 93 | 0.00 |
| 40 | 1-47 | 471 nm | 98 | 0.02 |
| 41 | 1-23 | 436 nm | 100 | 0.01 |
| 42 | 1-24 | 470 nm | 97 | 0.02 |
| 43 | 1-69 | 494 nm | 96 | 0.01 |
| 44 | 1-33 | 482 nm | 93 | 0.01 |
| 45 | 1-34 | 488 nm | 95 | 0.02 |
| 46 | 1-36 | 432 nm | 97 | 0.00 |
| 47 | 1-40 | 475 nm | 100 | 0.01 |
| 48 | 1-11 | 413 nm | 100 | 0.01 |
| 49 | 1-49 | 563 nm | 100 | 0.01 |
| 50 | 1-51 | 497 nm | 100 | 0.01 |
| 51 | 1-52 | 575 nm | 100 | 0.01 |
| 52 | 1-53 | 493 nm | 100 | 0.01 |
| 53 | 1-55 | 573 nm | 100 | 0.00 |
| 54 | 1-56 | 597 nm | 100 | 0.01 |
| 55 | 1-58 | 598 nm | 100 | 0.01 |
| 56 | 1-59 | 496 nm | 100 | 0.01 |
| 57 | 1-61 | 489 nm | 100 | 0.01 |
| 58 | Comparative compound F | 450 nm | 0 | 0.00 |
| 59 | Comparative compound G | 508 nm | 0 | 0.00 |
| 60 | Comparative compound H | 436 nm | 0 | 0.00 |
| 61 | Comparative compound I | 468 nm | 0 | 0.00 |

Note:
Test methods for 4 and 5 are as mentioned above.
Comparative Compounds F to I are as follows:
Comparative compounds F, G, H and I

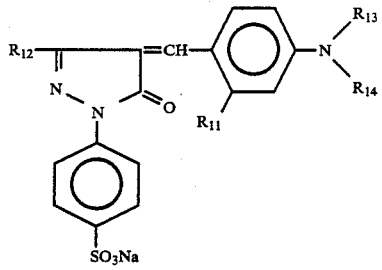

Substituents on F to I

| Comparative compound | $R_{11}$ | $R_{12}$ | $R_{13}$ | $R_{14}$ |
|---|---|---|---|---|
| F | —CH₃ | —OC₂H₅ | —CH₂CH₂CN | —CH₂CH₂CN |
| G | —CH₃ | —COOC₂H₅ | —CH₂CH₂CN | —CH₂CH₂CN |
| H | —H | —NHCONHCH₃ | —CH₂CN | —CH₃ |
| I | —CH₃ | —OH | —CH₂CH₂CN | —CH₂CH₂CN |

EXAMPLE 4

To a 5% gelatin solution were added each of the dyes shown in Table 4 and the same hardening agent, thickening agent, and coating aid as used in Example 1. The resulting solution was applied to polyethylene terephthalate film at a coating amount of 3 g/m² for gelatin and 0.25 mmol/m² for dye.

As is evident from the results in Table 4, in the cases of Samples 32 to 57 there was almost no residual color after development and the dyeing power on gelatin was superior.

EXAMPLE 5

A silver halide emulsion including silver chlorobromide (silver bromide is 4 mol%, average particle diameter is 0.25 pm) containing $0.9 \times 10^{-2}$ mole of Rh per mole of silver was prepared.

This emulsion was divided into six portions. Each portion was incorporated with the same hardening agent and thickening agent as used in Example 1. The emulsion was applied to polyethylene terephthalate film at an amount of coating of 4 g/mhu 2 in terms of silver.

Each emulsion layer was coated with a gelatin solution containing the dye shown in Table 5 to form a protective layer containing 1.0 g/m² of gelatin. In the protective layer, the same coating aid and thickening agent as in Example 1 were used.

The samples were subjected to the development processing in the same manner as in Example 1. The results are shown in Table 5.

TABLE 5

| Sample | Dye (Exemplified Compound No.) | Coating amount | (1) Relative sensitivity | (2) γ | (3) Fog after exposure to safelight | (4) Residual color |
|---|---|---|---|---|---|---|
| 62 | — | — | 100 | 6.5 | 2.00 | 0.00 |
| 63 (This invention) | 1-63<br>1-66 | 0.15 g/m²<br>0.05 g/m² | 68 | 5.8 | 0.22 | 0.02 |
| 64 (This invention) | 1-40<br>1-69 | 0.10 g/m²<br>0.10 g/m² | 72 | 5.6 | 0.23 | 0.01 |
| 65 (This invention) | 1-14<br>1-67 | 0.18 g/m²<br>0.06 g/m² | 65 | 5.4 | 0.21 | 0.01 |
| 66 | Comparative Compound C | 0.15 g/m² | 71 | 4.4 | 0.22 | 0.01 |
| 67 | Comparative Compound B | 0.13 g/m² | 69 | 4.5 | 0.22 | 0.01 |

Note:
Test methods for (1), (2), (3), and (4) are as mentioned above.
Comparative Compounds B and C are as shown in Example 1.

As is evident from the results in Table 5, in Samples 63 to 65 of this invention in which two dyes were added to the protective layer, the diffusion to the emulsion layer is few, the decrease of γ is low, the residual color is only a little. and the safety to safelight is improved.

EXAMPLE 6

A multi-layer color light-sensitive material composed of the following layers formed on a polyethylene terephthalate film base was prepared.

1st layer: Antihalation layer
  A gelatin layer containing black colloid silver
2nd layer: Intermediate layer
  A gelatin layer containing an emulsified dispersion of 2,5-di-t-octylhydroquinone.
3rd layer: First red-sensitive emulsion layer

| Silver iodobromide emulsion (silver iodide: 5 mol %) | |
|---|---|
| Coating amount of silver: | 1.6 g/m² |
| Sensitizing dye I | $4.5 \times 10^{-4}$ mole per mole of silver |
| Sensitizing dye II | $1.5 \times 10^{-4}$ mole per mole of silver |
| Coupler C-1 | 0.4 g/m² |
| Coupler C-2 | 0.03 g/m² |
| Coupler C-3 | 0.02 g/m² |

4th layer: Second red-sensitive emulsion layer

| Silver iodobromide emulsion (silver iodide: 6 mol %) | |
|---|---|
| Coating amount of silver: | 1.0 g/m² |
| Sensitizing dye I | $3 \times 10^{-4}$ mole per mole of silver |
| Sensitizing dye II | $1 \times 10^{-4}$ mole per mole of silver |
| Coupler C-1 | 0.03 g/m² |
| Coupler C-4 | 0.03 g/m² |
| Coupler C-2 | 0.01 g/m² |

5th layer: Intermediate layer
  Same as the second layer
6th layer: First green-sensitive emulsion layer

| Silver iodobromide emulsion (silver iodide: 4 mol %) | |
|---|---|
| Coating amount of silver: | 0.9 g/m² |
| Sensitizing dye III | $5 \times 10^{-4}$ mole per mole of silver |
| Sensitizing dye IV | $2 \times 10^{-4}$ mole per mole of silver |
| Coupler C-5 | 0.4 g/m² |
| Coupler C-6 | 0.15 g/m² |
| Coupler C-3 | 0.05 g/m² |

7th layer: Second green-sensitive emulsion layer

| Silver iodobromide emulsion (silver iodide: 6 mol %) | |
|---|---|
| Coating amount of silver: | 1.1 g/m² |
| Sensitizing dye III | $3 \times 10^{-4}$ mole per mole of silver |
| Sensitizing dye IV | $1.2 \times 10^{-4}$ mole per mole of silver |
| Coupler C-7 | 0.01 g/m² |
| Coupler C-8 | 0.07 g/m² |
| Coupler C-6 | 0.02 g/m² |

8th layer: Yellow filter layer
  A gelatin layer formed from an aqueous gelatin solution containing an emulsified dispersion of yellow colloid silver and 2,5-di-t-octylhydroquinone.
  Silver coating weight: 0.08 g/m²
9th layer: First blue-sensitive emulsion layer

| Silver iodobromide emulsion (silver iodide: 4 mol %) | |
|---|---|
| Coating amount of silver: | 0.4 g/m² |
| Sensitizing dye V | $2 \times 10^{-4}$ mole per mole of silver |
| Coupler C-9 | 0.9 g/m² |
| Coupler C-3 | 0.05 g/m² |

10th layer: Second blue-sensitive emulsion layer

| Silver iodobromide emulsion (silver iodide: 6 mol %) | |
|---|---|
| Coating amount of silver: | 0.6 g/m² |
| Sensitizing dye V | $1 \times 10^{-4}$ mole per mole of silver |
| Coupler C-9 | 0.25 g/m² |

11th layer: First protective layer
A gelatin layer containing an emulsified dispersion of ultraviolet light absorbent(UV-1)
12th layer: Second protective layer
A gelatin layer containing polymethyl methacrylate particles (about 1.5 μm in diameter).

Each of the above-mentioned layers was incorporated with a gelatin hardening agent (H-1) and a surface active agent.

The sample prepared as mentioned above is designated as sample 68. Sample 69 was prepared in the same manner as the above except that in the 8th layer, in place of yellow colloid silver smulsion of exemplified compound 1-13 prepared as in Example 1 was coated so that the coating amount of exemplified compound 1-13 is 0 2 g/m . Sample 70 was prepared in the same manner as the above except that Comparative Compound C was used. Sample 71 is the same as Sample 68 except that the yellow colloid silver in the 8th layer is excluded.

The compounds used for the preparation of the samples are as follows:

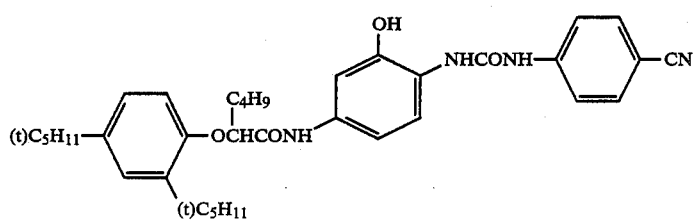

C-1

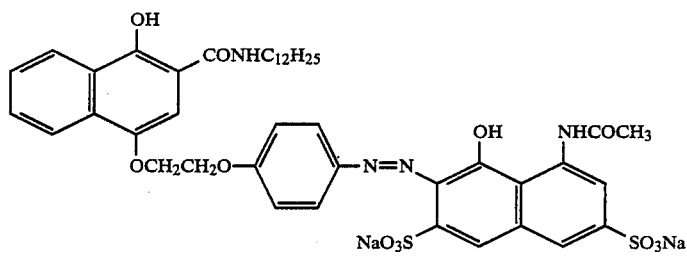

C-2

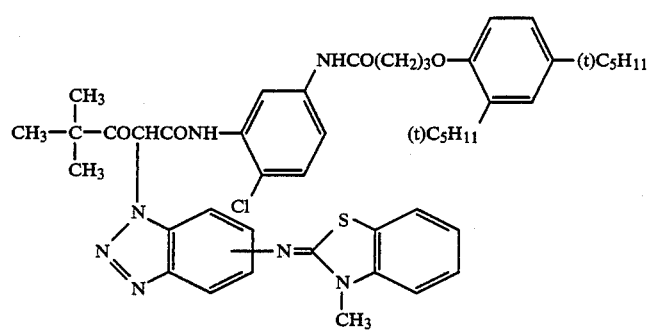

C-3

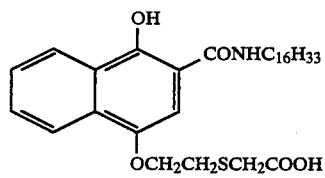

C-4

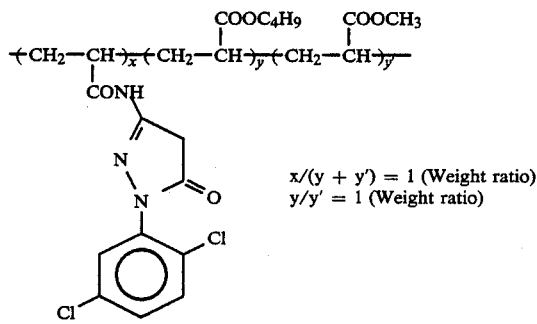

C-5 x/(y + y') = 1 (Weight ratio)
y/y' = 1 (Weight ratio)

-continued
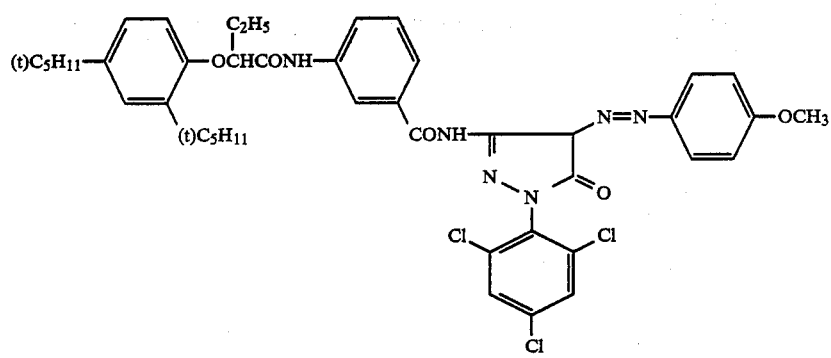
C-6
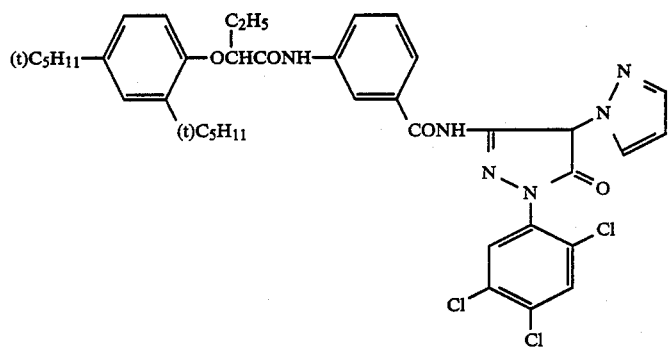
C-7
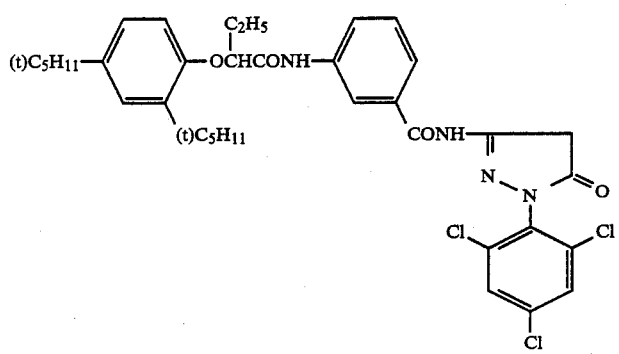
C-8
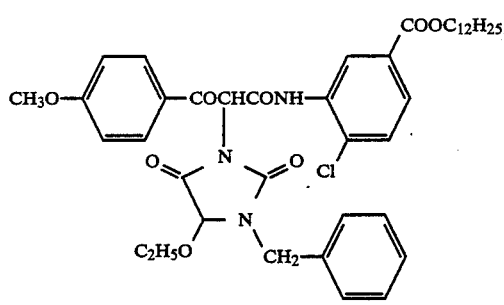
C-9
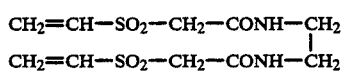
H-1
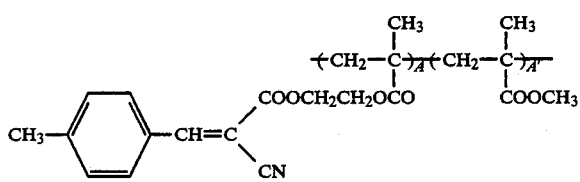
UV-1
A/A' = 7/3 (Weight ratio)

-continued

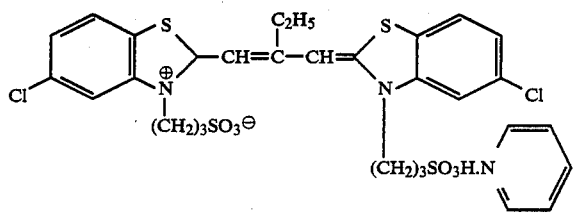
Sensitizing dye I

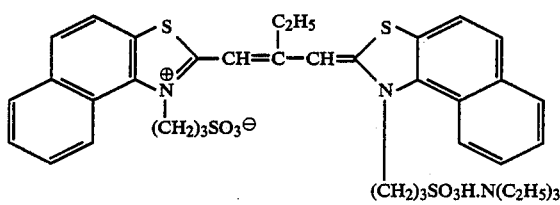
Sensitizing dye II

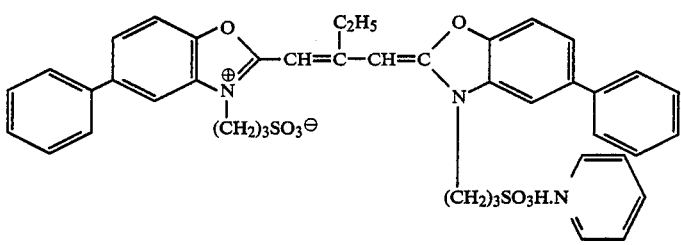
Sensitizing dye III

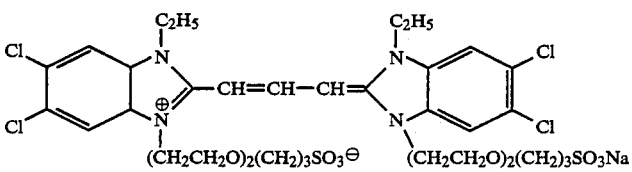
Sensitizing dye IV

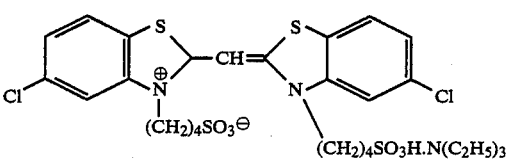
Sensitizing dye V

Samples 68, 69 and 70 thus obtained were exposed through an optical wedge and subjected to the development below.

The decolorized ability of the dye was evaluated by processing Samples 68 to 71 with a color developing solution in which 4-(N-ethyl-$\beta$-hydroxyethylamino)-2-methylaniline sulfate is excluded from the color developing solution below, followed by processing of steps 2 to 6 shown below.

The yellow density of Samples 68 to 70 was compared with that of Sample 71, and the difference is designated as $\Delta D^B$min. The results are shown in Table 6.

| The processing was performed as follows at 38° C. | | |
|---|---|---|
| 1. | Color development | 3 min 15 sec |
| 2. | Bleaching | 6 min 30 sec |
| 3. | Washing | 3 min 15 sec |
| 4. | Fixing | 6 min 30 sec |
| 5. | Washing | 3 min 15 sec |
| 6. | Stabilizing | 3 min 15 sec |

Composition of the processing solutions used in the respective steps are as follows:

| Color developing solution: | |
|---|---|
| Sodium nitrilotriacetic acid | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N-Ethyl-N-$\beta$-hydroxyethylamino)-2-methylaniline sulfate | 4.5 g |
| Water to make | 1 liter |
| Bleaching solution: | |
| Ammonium bromide | 160.0 g |
| Aqueous ammonia (28%) | 25.0 cc |
| Na-Fe salt of EDTA | 130.0 g |
| Glacial acetic acid | 14.0 cc |
| Water to make | 1 liter |
| Fixer | |
| Sodium tetrapolyphosphate | 2.0 g |
| Sodium sulfite | 4.0 g |
| Ammonium thiosulfate (70%) | 175.0 cc |
| Sodium bisulfite | 4.6 g |
| Water to make | 1 liter |
| Stabilizer | |
| Formalin | 8.0 cc |

| -continued | |
|---|---|
| Water to make | 1 liter |

TABLE 6

| | | | Green-sensitive emulsion layer | |
|---|---|---|---|---|
| | | 8th layer | $\Delta D^B$min | Relative sensitivity | Fog |
| Sample 68 | Comparative Example | Yellow colloid silver | 0 | 100 | 0.08 |
| Sample 69 | This invention | Exemplified compound 1-13 | 0 | 107 | 0.06 |
| Sample 70 | Comparative Example | Comparative compound D | 0 | Extremely desensitized | |

Note
Comparative Compound is as described in Example 2.

In the case of Sample 69 of this invention, the value of $\Delta D^B$ min is 0 and the dye is completely decolorized after processing. The degree of fog in Sample 69 is lower than in the case where yellow colloid silver is used and the desensitization caused by yellow colloid silver is low. In Comparative Sample 70, extreme desensitization takes place because the dye does not have enough dyeing power and diffuses to other layers.

When Samples 68 and 69 were allowed to stand at 35.C, 70% RH to evaluate storage stability, Sample 69 changed less in the fog and sensitivity of the blue-sensitive layer and green-sensitive layer than Sample 68.

EXAMPLE 7

A color reversal light-sensitive material (Sample 72) was prepared by applying the following 12 layers in the order listed on a cellullose triacetate film base.

1st layer: Antihalation layer
  A gelatin layer containing black colloid silver
2nd layer: Intermediate layer
  A gelatin layer containing an emulsified dispersion of 2,5-di-t-octylhydroquinone.
3rd layer: First red-sensitive emulsion layer

| Silver iodobromide emulsion (silver iodide: 6 mol %) | |
|---|---|
| Silver coated amount: | 0.5 g/m² |
| Coupler C-10 | 0.4 g/m² |

4th layer: Second red-sensitive emulsion layer

| Silver iodobromide emulsion (silver iodide: 6 mol %) | |
|---|---|
| Silver coated amount: | 0.8 g/m² |
| Coupler C-10 | 0.9 g/m² |

5th layer: Intermediate layer
  A gelatin layer containing an emulsified dispersion of 2,5-di-octylhydroquinone.
6th layer: First green-sensitive emulsion layer

| Silver iodobromide | 1 g/m² |
|---|---|
| Coupler C-11 | 0.4 g/m² |

7th layer: Second green-sensitive emulsion layer

| Silver iodobromide | 1.1 g/m² |
|---|---|
| Coupler C-11 | 0.9 g/m² |

8th layer: Yellow filter layer
  A gelatin layer formed from an aqueous gelatin solution containing an emulsified dispersion of yellow colloid silver and 2,5-di-t-octylhydroquinone.

| Silver coated amount: | 0.08 g/m² |
|---|---|

9th layer: First blue-sensitive emulsion layer

| Silver iodobromide emulsion | |
|---|---|
| Silver coated amount: | 0.4 g/m² |
| Coupler C-12 | 0.5 g/m² |

10th layer: Second blue-sensitive emulsion layer

| Silver iodobromide emulsion | |
|---|---|
| Silver coated amount: | 0.8 g/m² |
| Coupler C-12 | 0.95 g/m² |

11th layer: First protective layer
  A gelatin layer containing an emulsified dispersion of ultraviolet light absorbent (UV-1)
12th layer: Second protective layer
  A gelatin layer containing polymethyl methacrylate particles (about 1.5 μm in diameter) and microfine particles of silver iodobromide(1 mol%, 0.6 μm in particle size) fogged on the surfaces.

Sample 73 was prepared in the same manner as above except that in the 8th layer the emulsion of exemplified compound 1-14 prepared as in Example 1 was used (coating amount: 0.2 g/m² of exemplified compound 1-14) in place of the yellow colloid silver emulsion.

The compounds used for the preparation of the samples are as follows:

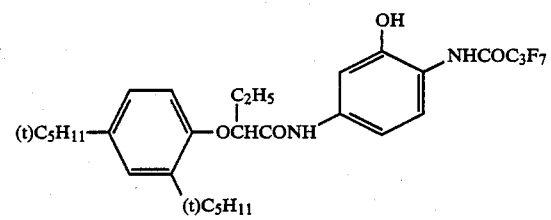

C-10

-continued

C-11

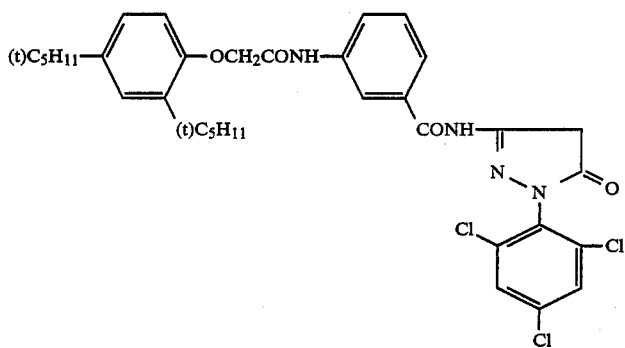

C-12

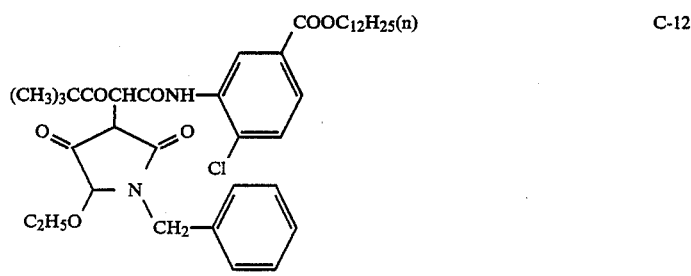

The samples thus obtained were exposed to white light through an optical wedge and subjected to the reversal processing as mentioned below.

| 1. First development | 6 min |
|---|---|
| 2. Washing | 2 min |
| 3. Reversing | 2 min |
| 4. Color development | 6 min |
| 5. Adjustment | 2 min |
| 6. Bleaching | 6 min |
| 7. Fixing | 4 min |
| 8. Washing | 4 min |
| 9. Stabilizing | 1 min |

The composition of each processing solution is as follows:

| First developing solution: | |
|---|---|
| Water | 700 ml |
| Sodium tetrapolyphosphate | 2 g |
| Sodium sulfite | 20 g |
| Hydroquinone monosulfonate | 30 g |
| Sodium carbonate (monohydrate) | 30 g |
| 1-Phenyl-4-methyl-4-hydroxymethyl-pyrazolidone | 2 g |
| Potassium bromide | 2.5 g |
| Potassium thiocyanate | 1.2 g |
| Potassium iodide (0.1% solution) | 2 ml |
| Water to make | 1000 ml (pH 10.1) |
| Reversing solution: | |
| Water | 700 ml |
| Nitro-N,N,N-trimethylene oskinic(phosphonic)acid 6Na salt | 3 g |
| Stannous chloride (dihydrate) | 1 g |
| p-Aminophenol | 0.1 g |
| Sodium hydroxide | 8 g |
| Glacial acetic acid | 15 ml |
| Water to make | 1000 ml |
| Color developing solution: | |
| Water | 700 ml |
| Sodium tetrapolyphosphate | 2 g |
| Sodium sulfite | 7 g |
| Sodium tertiary phosphate (12 hydrate) | 36 g |

| -continued | |
|---|---|
| Potassium bromide | 1 g |
| Potassium iodide (0.1% solution) | 90 ml |
| Sodium hydroxide | 3 g |
| Citrazinic acid | 1.5 g |
| N-Ethyl-N-($\beta$-methanesulfoneamidoethyl)-3-methyl-4-aminoaniline sulfate | 11 g |
| Ethylenediamine | 3 g |
| Water to make | 1000 ml |
| Adjusting solution: | |
| Water | 700 ml |
| Sodium sulfite | 12 g |
| Sodium ethylenediamine tetraacetate (dihydrate) | 8 g |
| Thioglycerin | 0.4 ml |
| Glacial acetic acid | 3 ml |
| Water to make | 1000 ml |
| Bleaching solution: | |
| Water | 800 g |
| Sodium ethylenediamine-tetraacetate (dihydrate) | 2.0 g |
| Iron (III) ammonium ethylenediamine tetraacetate (dihydrate) | 120.0 g |
| Potassium bromide | 100.0 g |
| Water to make | 1000 ml |
| Fixer: | |
| Water | 800 ml |
| Ammonium thiosulfate | 80.0 g |
| Sodium sulfite | 5.0 g |
| Sodium bisulfite | 5.0 g |
| Water to make | 1000 ml |
| Stabilizer: | |
| Water | 800 ml |
| Formalin (37 wt %) | 5.0 ml |
| Fuji Driwel | 5.0 ml |
| Water to make | 1000 ml |

In the case of Sample 73 of this invention, the dye was decolorized well by the processing. Sample 73 was comparable to Sample 72 with regard to stain in the highlight. In Sample 73, the maximum density of yellow and magenta in the reversal image increased by 22% and 11%, respectively. as compared with that in Sample 72, because of the low fog of the adjacent emulsion layer resulting from the first development.

This suggests that is is possible to reduce the thickness of the emulsion layer if the dye of this invention is used.

EXAMPLE 8

A silver halide emulsion including silver chlorobromide (silver bromide: 5 mol%, average particle diameter of silver bromide: 0.25 μm) containing $1 \times 10^{-5}$ mole of Rh per mole of silver was prepared.

This emulsion was divided into nine portions. Each portion was incorporated with 2-hydroxy-4,6-dichloro-1,3,5triazine sodium as a hardening agent and potassium polystyrenesulfonate as a thickening agent. The emulsion was applied to polyethylene terephthalate film at a coating amount of 4 g/m² in terms of silver. Each emulsion layer thus formed was coated with a gelatin solution to form a protective layer containing 1 g/m² of gelatin. As a coating aid for the protective layer. sodium p-dodecylbenzenesulfonate was used, and the same thickening agent as in the emulsion layer was used for the protective layer.

Each sample film thus obtained was exposed though an optical wedge by using a printer (Model P-607, made by Dai-Nippon Screen Mfg. Co., Ltd.) and the exposed film was developed with a developing solution (LD-835, made by Fuji Photo Film Co.,Ltd.) The results are shown in Table 7.

TABLE 7

| Sample | Dye (Exemplified Compound No.) | λ max (H₂O) | Coating amount (g/m²) In protective layer | (1) Relative sensitivity | (2) γ | (3) Fog after exposure to safe-light | (4) Residual color |
|---|---|---|---|---|---|---|---|
| 1 | — | — | — | 100 | 6.3 | 1.95 | 0.00 |
| 2 (This invention) | 2-6 | 427 nm | 0.21 | 66 | 5.8 | 0.21 | 0.01 |
| 3 (This invention) | 2-7 | 412 nm | 0.20 | 63 | 5.6 | 0.19 | 0.01 |
| 4 (This invention) | 2-8 | 486 nm | 0.24 | 60 | 5.3 | 0.19 | 0.01 |
| 5 (This invention) | 2-13 | 422 nm | 0.21 | 65 | 5.5 | 0.21 | 0.01 |
| 6 (This invention) | 2-14 | 401 nm | 0.25 | 63 | 5.4 | 0.20 | 0.01 |
| 7 | Comparative Compound B | 430 nm | 0.18 | 78 | 4.3 | 0.21 | 0.01 |
| 8 | Comparative Compound C | 456 nm | 0.19 | 68 | 4.2 | 0.20 | 0.01 |
| 9 | Comparative Compound A | 444 nm | 0.41 | 74 | 5.3 | 0.23 | 0.05 |

Note: Comparative Compounds A, B, and C have the following structures.

Comparative compound A

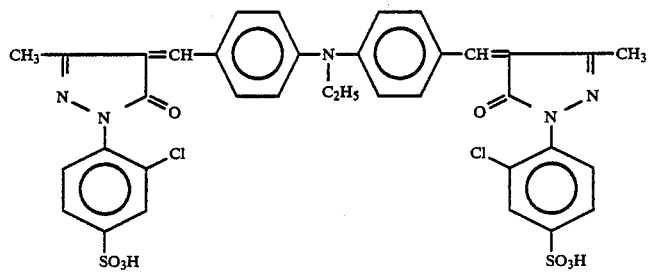

Comparative compound B

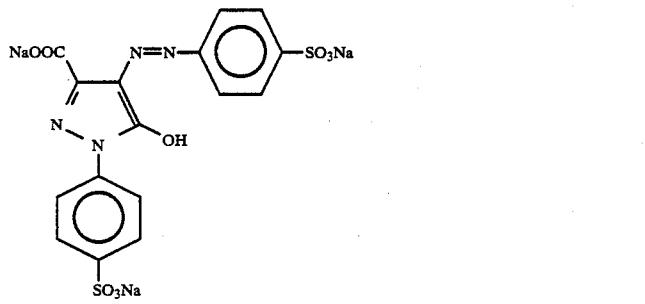

Comparative compound C

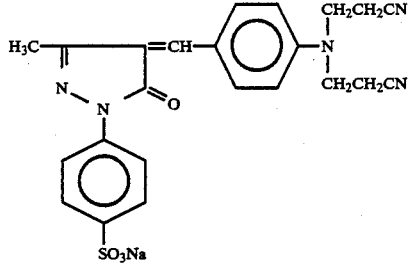

As is apparent from the result in Table 7, in Samples 7 and 8, the dye added to the protective layer diffused almost entirely to the emulsion layer and the Y value greatly decreased although the safety to safelight was achieved. In Sample 9, the dye barely diffused to the emulsion layer but the residual color was extremely high. Contrary to the above, in the cases of Samples 2 to 6 according to this invention, the dye added to the protective layer did not diffuse to the emulsion layer, the safety to safelight increased with a very little decrease in the γ value, and there was almost no residual color.

EXAMPLE 9

A silver halide emulsion including silver chlorobromide (silver bromides: 5 mol%, average particle diameter of silver bromide: 0.22 μm) containing $0.9 \times 10^{-5}$ mole of Rh per mole of silver was prepared.

This emulsion was divided into seven portions. Each portion was incorporated with the same hardening agent and thickening agent as used in Example 8. The emulsion was applied to polyethylene terephthalate film at a coating amount of 3.8 g/m² in terms of silver. Each emulsion layer was coated with an aqueous solution to form a protective layer containing gelatin (in a coating amount of 1 g/m²), mordant (in the coating amount of 0.5 g/m²), and the dye as shown in Table 8. The same coating aid as used in Example 8 was employed.

Mordant

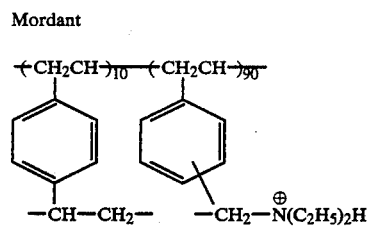

Each sample film thus obtained was treated in the same manner as in Example 1 and examined for relative sensitivity, γ, fog after exposure to safelight, and residual color in the same manner as in Example 1. The results are shown in Table 8.

TABLE 8

| Sample | Dye Exemplified Compound No. | λ max (H₂O) | Mordant | (1) Relative sensitivity | (2) γ | (3) Fog after exposure to safelight | (4) Residual color |
|---|---|---|---|---|---|---|---|
| 10 | — | — | — | 100 | 6.2 | 0.00 | 0.00 |
| 11 (This invention) | 2-6 | 427 nm | — | 65 | 5.7 | 0.20 | 0.01 |
| 12 (This invention) | 2-14 | 401 nm | — | 63 | 5.3 | 0.19 | 0.01 |
| 13 (This invention) | 2-9 | 449 nm | — | 70 | 5.8 | 0.26 | 0.01 |
| 14 (This invention) | 2-6 | 427 nm | Containing | 63 | 5.8 | 0.20 | 0.01 |
| 15 (This invention) | 2-14 | 401 nm | Containing | 62 | 5.5 | 0.18 | 0.01 |
| 16 (This invention) | 2-9 | 449 nm | Containing | 70 | 5.8 | 0.26 | 0.01 |

It is apparent from the results in Table 8 that the dye used in combination with the mordant in this invention reduces the diffusion of the dye to the emulsion layers, prevents the γ value from lowering, and improves the safety to safelight, compared with the sole use of the dye.

EXAMPLE 10

To a 5% gelatin solution were added each of the dyes shown in Table 9 and the same hardening agent, thickening agent, and coating aid as used in Example 8. The resulting solution was applied to polyethylene terephthalate film at a coating amount of 3 g/m² for gelatin and 0.25 mmol/m² for dye.

The samples thus obtained underwent bathing with water at 40° C. for 5 minutes to evaluate the dyeing power of the dye. The samples were also developed in the same manner as in Example 8 to examine the dye for residual color. The results are shown in Table 9.

TABLE 9

| Sample | Dye (Exemplified Compound No.) | λ max (H₂O) | (5) Dyeing power | (4) Residual color |
|---|---|---|---|---|
| 17 | 2-11 | 481 nm | 100 | 0.02 |
| 18 | 2-12 | 452 nm | 100 | 0.01 |
| 19 | 2-22 | 497 nm | 99 | 0.00 |
| 20 | 2-23 | 449 nm | 100 | 0.02 |
| 21 | 2-10 | 528 nm | 98 | 0.00 |
| 22 | 2-15 | 517 nm | 100 | 0.01 |
| 23 | 2-17 | 595 nm | 100 | 0.01 |
| 24 | 2-20 | 486 nm | 100 | 0.02 |
| 25 | 2-16 | 604 nm | 100 | 0.02 |
| 26 | 2-18 | 632 nm | 100 | 0.02 |
| 27 | 2-19 | 431 nm | 100 | 0.02 |
| 28 | Comparative Compound D | 424 nm | 6 | 0.00 |
| 29 | Comparative Compound E | 450 nm | 3 | 0.00 |
| 30 | Comparative Compound F | 508 nm | 5 | 0.00 |
| 31 | Comparative Compound G | 436 nm | 7 | 0.00 |
| 32 | Comparative Compound H | 468 nm | 0 | 0.00 |

TABLE 9-continued

Note: Comparative Compound D has the following structure.

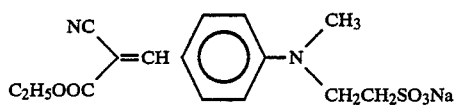

Comparative compounds E, F, G and H have the following structures.

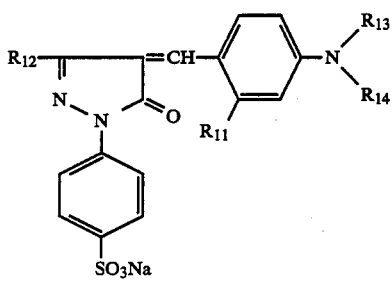

Substituents on E to H

| Comparative Compound | $R_{11}$ | $R_{12}$ | $R_{13}$ | $R_{14}$ |
|---|---|---|---|---|
| E | —$CH_3$ | —$OC_2H_5$ | —$CH_2CH_2CN$ | —$CH_2CH_2CN$ |
| F | —$CH_3$ | —$COOC_2H_5$ | —$CH_2CH_2CN$ | —$CH_2CH_2CN$ |
| G | —H | —$NHCONHCH_3$ | —$CH_2CN$ | —$CH_3$ |
| H | —$CH_3$ | —OH | —$CH_2CH_2CN$ | —$CH_2CH_2CN$ |

It is apparent from the results in Table 9 that in the cases of Samples 17 to 27 there was almost no residual color after development and the dyeing power on gelatin is superior.

EXAMPLE 11

5 g of exemplified compound 2-7 was dispersed and dissolved in 100 ml of water, and the resulting solution was mixed with 250 g of 14% gelatin solution, followed by stirring with a colloid mill. The resulting composition was applied to a cellulose triacetate film base at a coating amount of 8 g/m². The resulting sample film was designated as Sample 100.

The same procedure as above was repeated except that in place of exemplified compound 2-7, exemplified compounds 2-9, 2-10, 1-12, 2-14, 2-18, and 2-20 were used to give Samples 101 to 106, respectively. Also, Samples 107 to 110 were prepared in the same manner as above from Comparative Compounds (A),(B), (C), and (D). Sample 111 was prepared from exemplified compound 2-7 in such a manner that the mixing of the aqueous solution and gelatin solution was accomplished by adding tricresyl phosphate (dye/oil ratio = 1), ethyl acetate, and sodium p-dodecylbenzene-sulfonate as an emulsifier. Sample 112 was prepared in the same manner as for Sample 111 except that, in place of tricresyl phosphate, polyethyl acrylate (dye/polymer ratio - 1) was used.

Each of the samples thus prepared was cut to 5 cm², and the cut sample was examined for absorption spectrum of visible light. Then, the sample was washed with water (20 ml) at 38° C. for 3 minutes. After drying, the sample was examined again for absorption spectrum. The dyeing power of the dye was evaluated according to the following formula.

$$\text{Dyeing power} = \frac{\text{Dmax of film after water washing}}{\text{Dmax of film before water washing}} \times 100$$

The decolorized ability was evaluated by measuring the absorption spectrum of the sample (5 cm²) which has been dipped in the following solution at 38° C. for 3 minutes, followed by water washing and drying.

| Composition of the processing solution: | |
|---|---|
| Water | 1000 ml |
| Metol | 2 g |
| Hydroquinone | 5 g |
| Sodium sulfite | 70 g |
| Calcium carbonate | 40 g |
| Potassium bromide | 2 g |

Decolorized ability =

$$\left(1 - \frac{\text{Dmax of film after decolorization}}{\text{Dmax of film before decolorization}}\right) \times 100$$

The results are shown in Table 10.

TABLE 10

| Sample | Compound No. | Dyeing power | Decolorized ability | Remarks |
|---|---|---|---|---|
| 100 | 2-7 | 100 | 100 | This invention |
| 101 | 2-9 | 100 | 98 | " |
| 102 | 2-10 | 98 | 97 | " |
| 103 | 2-12 | 100 | 99 | " |
| 104 | 2-14 | 98 | 97 | " |
| 105 | 2-18 | 100 | 98 | " |

TABLE 10-continued
| Sample | Compound No. | Dyeing power | Decolorized ability | Remarks |
|---|---|---|---|---|
| 106 | 2-20 | 100 | 96 | " |
| 107 | (A) | 98 | 91 | Comparative Example |
| 108 | (B) | 7 | 100 | " |
| 109 | (C) | 88 | 23 | " |
| 110 | (D) | 95 | 90 | " |
| 111 | 7 | 100 | 98 | This invention |
| 112 | 7 | 100 | 97 | " |
Comparative compound (A)
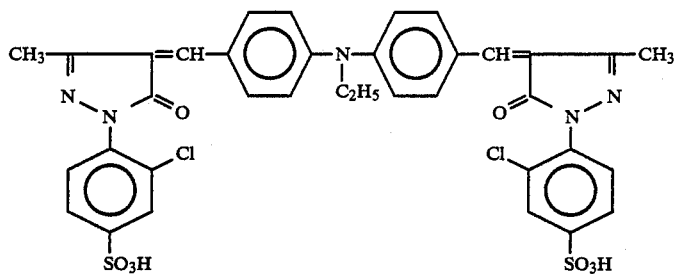
Comparative compound (B)
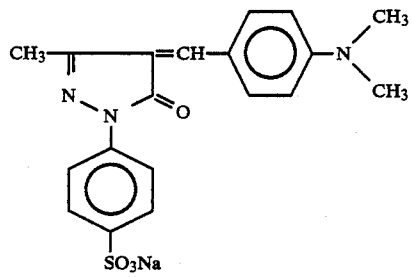
Comparative compound (C)
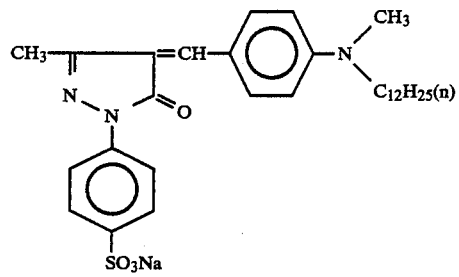
Comparative compound (D)

TABLE 10-continued

| Sample | Compound No. | Dyeing power | Decolorized ability | Remarks |
|---|---|---|---|---|

[Chemical structure: A bis-pyrazolone compound with two CH₃-substituted pyrazolone rings connected via N-phenyl groups to a biphenyl-2,2'-disulfonic acid (SO₃H) central unit, with =CH-C₆H₄-NHCOCH₃ substituents on each pyrazolone]

As is apparent from the results in Table 10, Samples of this invention are all stable to washing and exhibit sufficient dyeing power, and they are substantially completely decolorized after processing.

The results obtained with Samples 111 and 112 indicate that the dye of this invention also exhibits good dyeing power and decolorized ability even when it is used as an emulsion.

EXAMPLE 12

A multi-layer color light-sensitive material was prepared by forming the layers on a polyethylene terephthalate film base in the same manner as described for Sample 68 in Example 6. The resulting product was designated as Sample 120.

Sample 121 was prepared in the same manner as above except that the yellow colloid silver in the 8th layer was replaced by the emulsion of exemplified compound 2-7 prepared as in Example 8 (coating amount : 0.2 g/m² of exemplified compound). Sample 122 was prepared in the same manner as above except that Comparative Compound (C) was used. Sample 123 is the same as Sample 120 except that the yellow colloid silver in the 8th layer is excluded.

Samples 120, 121 and 122 thus obtained were exposed through an optical wedge according to usual manner and developed in the same manner as in Example 6.

Moreover, decolorized ability was evaluated by treating Samples 120 to 123 with a solution as used in Example 6 in which 4-(N-ethyl-N-$\beta$-hydroxyethylamino)-2-methylaniline sulfate was excluded from the color developing solution, followed by treatment of steps 2 to 6.

The yellow density of Samples 120 to 122 was compared with that of Sample 123, and the difference is designated as $\Delta D^B$ min. The results are shown in Table 11.

TABLE 11

| | | 8th layer | $\Delta D^B$ min | Green-sensitive emulsion layer Relative sensitivity | Fog |
|---|---|---|---|---|---|
| Sample 120 | Comparative Example | Yellow colloid silver | 0 | 100 | 0.08 |
| Sample 121 | This invention | Exemplified Compound 2-7 | 0 | 108 | 0.05 |
| Sample 122 | Comparative Example | Comparative Compound (C) | 0 | Extremely desensitized | |

In the case of Sample 121 of this invention, the value of $\Delta D^B$ min is 0 and the dye is completely decolorized after processing. The degree of fog is lower than in the case where yellow colloid silver is used. The decrease in sensitivity with time caused by yellow colloid silver is low. In the case of Comparative Sample 122, extreme desensitization takes place because the dye does not have sufficient dyeing power and diffuse to other layers.

EXAMPLE 13

A color reversal light-sensitive material, Sample 130, was prepared by coating the 1st to 12th layers on a cellulose triacetate film base in the same manner as described in Example 7.

Sample 131 was prepared in the same manner as above except that the yellow colloid silver in the 8th layer was replaced by the emulsion of exemplified compound 2-12 prepared as in Example 8 (coating amount: 0.2 g/m² of exemplified compound 2-12).

The samples thus obtained were exposed to white light through an optical wedge and subjected to development process consisting of nine steps from first development to stabilization.

In the case of Sample 131 of this invention, the dye was decolorized well by the processing, and it was comparable to Sample 130 with regard to stain in the highlight.

EXAMPLE 14

A silver halide emulsion including silver chlorobromide (silver bromide: 5 mol%, average particle diameter of silver bromide: 0.25 pm) containing $1 \times 10^{-5}$ mole of Rh per mole of silver was prepared.

This emulsion was divided into eight portions. Each portion was incorporated with 2-hydroxy-4,6-dichloro-1,3,5-triazine sodium as a hardening agent and potassium polystyrenesulfonate as a thickening agent. The emulsion was applied to polyethylene terephthalate film at a coating amount of 4 g/m in terms of silver. Each emulsion layer thus formed was coated with a gelatin solution so as to form a protective layer containing gelatin in an amount of 1 g/m². As a coating aid for the protective layer, sodium p-dodecylbenzenesulfonate was used, and the same thickening agent as used for the emulsion layer was used for the protective layer.

Each sample film thus obtained was exposed through an optical wedge by using a printer (Model P-607, made by DaiNippon Screen Mfg. Co., Ltd.) and the exposed film was developed with a developing solution (LD-835, made by Fuji Photo Film Co., Ltd.) The results are shown in Table 12.

$\gamma$ value greatly decreased although the safety to safelight was achieved. In contrast, Samples 2 to 6 according to this invention were comparable to or better than Samples 7 and 8 in the safety to safelight and residual color, and in Samples 2 to 6, the dye added to the protective layer did not diffuse to the emulsion layer and the decrease of $\gamma$ value was very low.

EXAMPLE 15

A silver halide emulsion including silver chlorobromide (silver bromide: 5 mol%, average particle diameter of silver bromide: 0.22 pm) containing $1.0 \times 10^{-5}$ mole of Rh per mole of silver was prepared.

This emulsion was divided into seven portions. Each portion was incorporated with the same hardening agent and thickening agent as used in Example 14. The emulsion was applied to polyethylene terephthalate film at a coating amount of 3.8 g/m² in terms of silver. Each emulsion layer thus formed was coated with a solution so as to a form a protective layer containing gelatin (in an amount of 1 g/m²), mordant (in an amount of 0.5 g/m²), and the dye as shown in Table 13. The same coating aid as used in Example 14 was used.

TABLE 12

| Sample | Dye (Exemplified Compound No.) | λ max (H₂O) | Coating amount (g/m²) In protective layer | Relative sensitivity[1] | $\gamma^{[2]}$ | Fog after exposure to safelight[3] | Residual color[4] |
|---|---|---|---|---|---|---|---|
| 1 | — | — | — | 100 | 6.2 | 1.97 | 0.00 |
| 2 (This invention) | 3-4 | 427 nm | 0.17 | 65 | 5.7 | 0.21 | 0.01 |
| 3 " | 3-15 | 428 nm | 0.18 | " | " | 0.22 | " |
| 4 " | 3-26 | 412 nm | 0.20 | 63 | 5.5 | 0.18 | " |
| 5 " | 3-29 | 417 nm | " | " | 5.6 | 0.19 | " |
| 6 " | 3-31 | 411 nm | " | " | 5.4 | 0.18 | " |
| 7 | Comparative Compound A | 430 nm | 0.18 | 68 | 4.2 | 0.20 | " |
| 8 | Compound B | 456 nm | 0.19 | 68 | 4.1 | 0.21 | " |

Note:
Test methods for (1), (2), (3), and (4) are as mentioned above. Comparative Compounds A and B have the following structures.
Comparative compound A

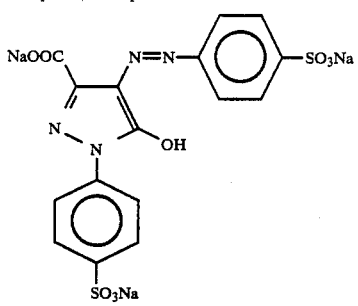

Comparative compound B

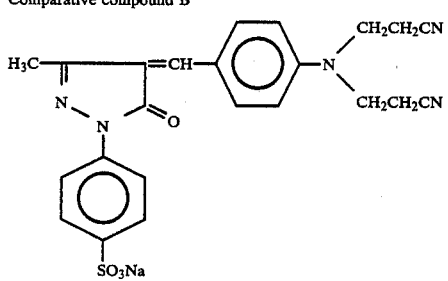

As is apparent from the results in Table 12, in Samples 7 and 8, the dye added to the protective layer diffused almost entirely to the emulsion layer and the Mordant

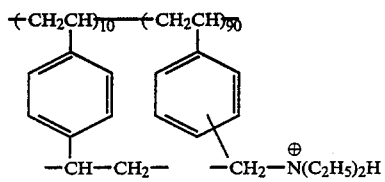

Each sample film thus obtained was treated in the same manner as in Example 14 and examined for relative sensitivity, γ, fog after exposure to safelight, and residual color in the same manner as in Example 14. The results are shown in Table 13.

the dye to the emulsion layers, prevents the γ value from lowering, and improves the safety to safelight.

EXAMPLE 16

To a 5% gelatin solution were added each of the dyes shown in Table 14 and the same hardening agent, thickening agent, and coating aid as used in Example 14. The resulting solution was applied to polyethylene terephthalate film at a coating amount of 3 g/m² for gelatin and 0.25 mmol/m² for dye.

The samples thus obtained were subjected to bathing with water at 40° C. for 5 minutes to evaluate the dyeing power of the dye. The samples were also developed in the same manner as in Example 14 to examine the dye

TABLE 13

| Sample | Dye Exemplified Compound No. | λmax ($H_2O$) | Dye coated amount | Mordant | (1) Relative sensitivity | (2) γ | (3) Fog after exposure to safelight | (4) Residual color |
|---|---|---|---|---|---|---|---|---|
| 9 | — | — | — | — | 100 | 6.1 | 1.96 | 0.00 |
| 10 (This invention) | 3-4 | 427 nm | 0.17 g/m² | — | 66 | 5.6 | 0.20 | 0.01 |
| 11 (This invention) | 3-25 | 422 nm | 0.21 g/m² | — | 65 | 5.4 | " | " |
| 12 (This invention) | 3-31 | 411 nm | 0.20 g/m² | — | 62 | 5.3 | 0.18 | " |
| 13 (This invention) | 3-4 | 427 nm | 0.17 g/m² | Containing | 66 | 5.8 | 0.20 | " |
| 14 (This invention) | 3-25 | 422 nm | 0.21 g/m² | Containing | 65 | 5.7 | " | " |
| 15 (This invention) | 3-31 | 411 nm | 0.20 g/m² | Containing | 62 | 5.6 | 0.18 | 0.01 |

Note:
Test methods for (1), (2), (3), and (4) are as mentioned above.

As is apparent from the results in Table 13, the combination of dye and the mordant reduces the diffusion of for residual color. The results are shown in Table 14.

TABLE 14

| Sample | Dye (Exemplified Compound No.) | λ max ($H_2O$) | (5) Dyeing power | (4) Residual color |
|---|---|---|---|---|
| 16 | 3-1 | 478 nm | 100 | 0.02 |
| 17 | 3-2 | 498 nm | 100 | 0.02 |
| 18 | 3-5 | 480 nm | 97 | 0.01 |
| 19 | 3-7 | 490 nm | 94 | 0.01 |
| 20 | 3-10 | 502 nm | 95 | 0.01 |
| 21 | 3-14 | 470 nm | 98 | 0.02 |
| 22 | 3-16 | 504 nm | 98 | 0.02 |
| 23 | 3-17 | 613 nm | 95 | 0.01 |
| 24 | 3-21 | 579 nm | 100 | 0.02 |
| 25 | 3-22 | 452 nm | 100 | 0.02 |
| 26 | 3-30 | 424 nm | 100 | 0.02 |
| 27 | Comparative Compound C | 450 nm | 0 | 0.00 |
| 28 | Comparative Compound D | 508 nm | 0 | 0.00 |
| 29 | Comparative Compound E | 436 nm | 0 | 0.00 |
| 30 | Comparative Compound F | 468 nm | 0 | 0.00 |
| 31 | Comparative Compound G | 424 nm | 0 | 0.00 |

Note: Test methods for (4) and (5) are as mentioned above.
Comparative Compounds C-F have the following structures.

Comparative compounds C~F

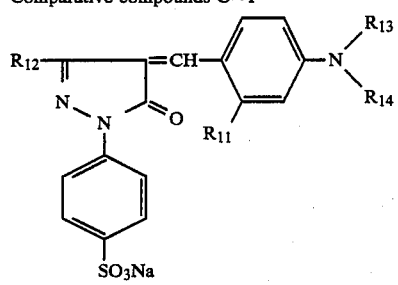

TABLE 14-continued

Comparative compound G

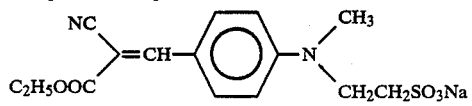

Substituents on C-F

| Comparative Compound | $R_{11}$ | $R_{12}$ | $R_{13}$ | $R_{14}$ |
|---|---|---|---|---|
| C | —$CH_3$ | —$OC_2H_5$ | —$CH_2CH_2CN$ | —$CH_2CH_2CN$ |
| D | —$CH_3$ | —$COOC_2H_5$ | —$CH_2CH_2CN$ | —$CH_2CH_2CN$ |
| E | —H | —$NHCONHCH_3$ | —$CH_2CN$ | —$CH_3$ |
| F | —$CH_3$ | —OH | —$CH_2CH_2CN$ | —$CH_2CH_2CN$ |

It is apparent from Table 14 that in Samples 16 to 26 there was almost no residual color after development and the dyeing power on gelatin is superior.

EXAMPLE 17

5 g of exemplified compound 3-1 was dispersed and dissolved in 100 ml of water, and the resulting solution was mixed with 250 g of 14% gelatin solution, followed by stirring with a colloid mill. The resulting composition was applied to a cellulose triacetate film base at a coating amount of 8 g/m². The resulting sample film was designated as Sample 100.

The same procedure as above was repeated except that in place of exemplified compound 3-1 exemplified compounds 3-3, 3-4, 3-5, 3-7, 3-15, and 3-21, to give Samples 101 to 106, respectively. Also, Samples 107 to 110 were prepared in the same manner as above from Comparative Compounds (H),(I),(J), and (K). Sample 111 was prepared from exemplified compounds 3-4 in such a manner that the mixing of the aqueous solution of the compound and gelatin solution was accomplished by adding tricresyl phosphate (dye/oil ratio =1), ethyl acetate, and sodium p-dodecylbenzenesulfonate as an emulsifier.

Sample 112 was prepared in the same manner as for Sample 111 except that in place of tricresyl phosphate polyethyl acrylate (dye/polymer ratio =1) was used.

Each of the samples thus prepared was cut to 5 cm², and the cut sample was examined for absorption spectrum of visible light. Then, the sample was washed with water (20 ml) at 38° C. for 3 minutes. After drying, the sample was examined again for absorption spectrum. The dyeing power of the dye was evaluated according to the following formula.

$$\text{Dyeing power} = \frac{\text{Dmax of film after water washing}}{\text{Dmax of film before water washing}} \times 100$$

The decolorized ability was evaulated by measuring the absorption spectrum of the sample (5 cm²) which had been dipped in the following solution at 38° C. for 3 minutes, followed by washing and drying.

| Water | 1000 ml |
|---|---|
| Metol | 2 g |
| Hydroquinone | 5 g |
| Sodium sulfite | 70 g |
| Calcium carbonate | 40 g |
| Potassium bromide | 2 g |

Ability to be decolorized =

$$\left(1 - \frac{\text{Dmax of film after decolorization}}{\text{Dmax of film before decolorization}}\right) \times 100$$

The results are shown in Table 15.

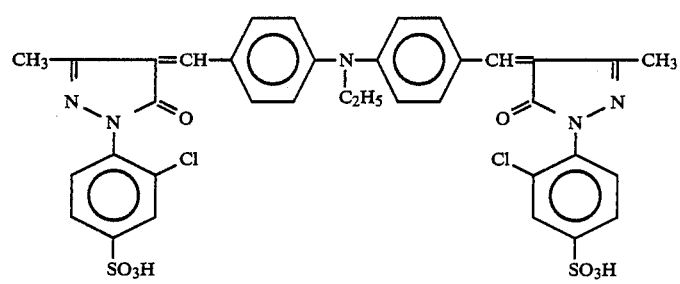

Comparative compound (H)

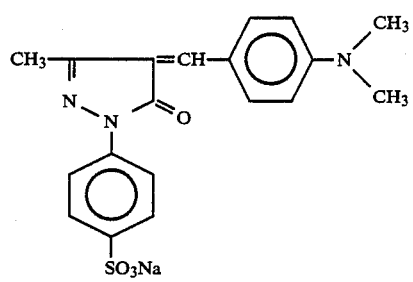

Comparative compound (I)

Comparative compound (J)

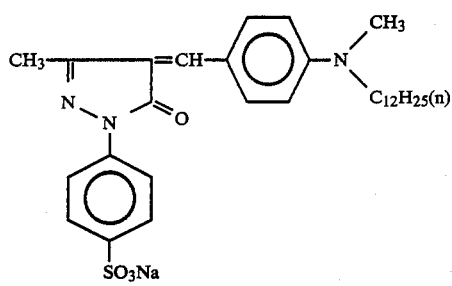

Comparative compound (K)

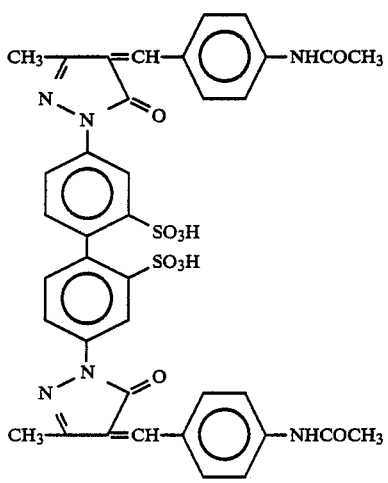

TABLE 15

| Sample | Dye (Compound No.) | Dyeing power | Decolorized ability | Remarks |
|---|---|---|---|---|
| 100 | 3-1 | 100 | 98 | This invention |
| 101 | 3-3 | 100 | 98 | This invention |
| 102 | 3-4 | 100 | 100 | This invention |
| 103 | 3-5 | 100 | 99 | This invention |
| 104 | 3-7 | 95 | 100 | This invention |
| 105 | 3-15 | 100 | 98 | This invention |
| 106 | 3-21 | 100 | 96 | This invention |
| 107 | (H) | 98 | 91 | Comparative Example |
| 108 | (I) | 7 | 100 | Comparative Example |
| 109 | (J) | 88 | 23 | Comparative Example |
| 110 | (K) | 95 | 90 | |
| 111 | 3-4 | 100 | 98 | This invention |
| 112 | 3-4 | 100 | 97 | This invention |

It is apparent from the results in Table 15 that samples of this invention are all stable to washing and have sufficient dyeing power, and they are substantially completely decolorized after treatment.

The results obtained with Samples 111 and 112 indicate that the dye of this invention exhibits good dyeing power and decolorized ability even when it is emulsified.

EXAMPLE 18

A multi-layer color light-sensitive material was prepared by forming the layers on a polyethylene terephthalate film base in the same manner as described for Sample 68 in Example 6. The resulting sample film was designated as Sample 120.

Sample 121 was prepared in the same manner as above except that in place of yellow colloid silver in the 8th layer, dispersion of exemplified compound 3-4 prepared as in Example 17 was used (coating amount: 0.2 g/m² of exemplified compound 2-7). Sample 122 was prepared in the same manner as above except that Comparative Compound J in Example 17 was used. Sample 123 is the same as Sample 120 except that the yellow colloid silver in the 8th layer is excluded.

Samples 120, 121, and 122 thus obtained were exposed through an optical wedge and developed in the same manner as in Example 6.

The decolorized ability of the dye was evaluated by treating Samples 120 to 123 with a developing solution in the same manner as described in Example 6 in which 4-(N-ethyl-N-B-hydroxyethylamino)- 2-methylaniline sulfate was excluded from the color developing solution followed by treatment of steps 2 to 6.

The yellow density of Samples 120 to 122 was compared with that of Sample 123, and the difference is designated as $\Delta D^B$ min. The results are shown in Table 16.

TABLE 16

| | | 8th layer | $\Delta D^B\text{min}$ | Green-sensitive emulsion layer Relative sensitivity | Fog |
|---|---|---|---|---|---|
| Sample 120 | Comparative Example | Yellow colloid silver | 0 | 100 | 0.08 |
| Sample 121 | This invention | Exemplified Compound 3-4 | 0 | 107 | 0.05 |
| Sample 122 | Comparative Example | Comparative Compound (J) | 0 | Extremely desensitized | |

In the case of Sample 121 of this invention, the value of $\Delta D^B\text{min}$ is 0 and the dye is completely decolorized after processing. The degree of fog is lower than in the case where yellow colloid silver is used. The decrease in sensitivity with time caused by yellow colloid silver is low. In the case of Comparative Sample 122, extreme desensitization takes place because the dye is insufficient in dyeing power and diffuses to other layers.

EXAMPLE 19

A color reversal light-sensitive material, Sample 130, was prepared by forming the 1st to 12th layers on a cellulose tricetate film base in the same manner as in Example 7.

Sample 131 was prepared in the same manner as above except that in place of the yellow colloid silver in the 8th layer the emulsion of exemplified compound 3-15 prepared as in Example 8 was used (coating amount: 0.2 g/m² of exemplified compound 3-15).

The samples thus obtained were exposed to white light through an optical wedge and subjected to development process consisting of nine steps from first development to stabilization.

In the case of Sample 131 of this invention, the dye was decolorized well by the processing, and it was comparable to Sample 130 with regard to stain in the highlight.

We claim:

1. A silver halide photographic light-sensitive element comprising a support, at least one silver halide photographic light-sensitive layer, and at least one gelatin containing non-photosenisitive layer, wherein at least one of said light-sensitive layer and gelatin containing non-photosensitive layer contains 0.001 to 1 /m² of at least one of the water-soluble compounds selected from the group consisting of general formulas (I) and (II):

General formula (I)

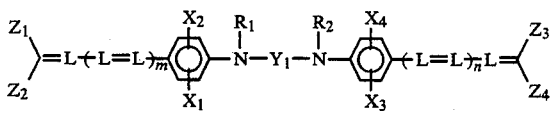

General formula (II)

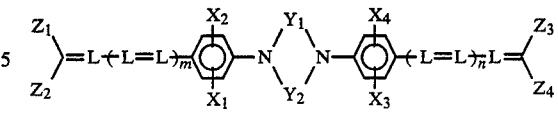

wherein:

$X_1$, $X_2$, $X_3$, and $X_4$ which may be the same or different, each represents a hydrogen atom, halogen atom, alkyl group, alkoxy group, hydroxl group, carboxyl group, substituted amino group, carbamoyl group, sulfamoyl group, or alkoxycarbonyl group;

$R_1$ and $R_2$ which may be the same or different, each represents a hydrogen atom, unsubstituted or substituted alkyl group, unsubstituted or substituted alkenyl group, unsubstituted or substituted aryl group, acyl group, and sulfonyl group;

$Z_1$, $Z_2$, $Z_3$, and $Z_4$ in the compound represented by general formula (I) represent rings selected from the group consisting of pyrazolone ring, pyrazolotriazole ring, pyrazoloimidazole ring, oxyindole ring, oxyimidazopyridine ring, isoxazolone ring, barbituric acid ring, dioxytetrahydropyridine ring, and indandione ring which are formed by connecting said $Z_1$ and $Z_2$ groups, or said $Z_3$ and $Z_4$ groups;

$Z_1$, $Z_2$, $Z_3$, and $Z_4$ in the compound represented by general formula (II), which may be the same or different, each represents an electron attracting group and $Z_1$ and $Z_2$, or $Z_3$ and $Z_4$ may connect to each other to form a ring;

$Y_1$ and $Y_2$ represent divalent linking groups:

L represents an unsubstituted or substituted methine group;

m and n are 0 or 1; and compounds represented by general formula (I) have 2 to 4 sulfo groups, carboxyl groups, or salts thereof in the molecule.

2. The silver halide photographic light-sensitive material as set forth in claim 2, wherein $Z_1$, $Z_2$, $Z_3$, and $Z_4$ in the compound represented by general formula (II), which may be the same or different, represent electron attracting groups selected from the group consisting of acyl group having 2 to 13 carbon atoms, carbamoyl group having 2 to 13 carbon atoms, carboxyl group, unsubstituted alkoxycarbonyl group having 2 to 10 carbon atoms, substituted alkoxycarbonyl group having 2 to 10 carbon atoms, unsubstituted aryloxycarbonyl group, substituted aryloxycarbonyl group, sulfonyl group having 1 to 12 carbon atoms, sulfamoyl group having to 12 carbon atoms, and cyano group; or rings selected from the group consisting of pyrazolone ring, pyrazolotriazole ring, pyrazoloimidazole ring, oxyindole ring, oxyimidazopyridine ring, isooxazolone ring, barbituric acid ring, dioxytetrahydropyridine ring, and indandione ring which are formed by connecting said $Z_1$ and $Z_2$ groups, or said $Z_3$ and $Z_4$ groups.

3. The silver halide photographic light-sensitive material as set forth in claim 1, wherein the compounds represented by general formula (II) have 2 to 4 sulfo groups, carboxyl groups, or salts thereof in the molecule.

4. The silver halide photographic light-sensitive material as set forth in claim 1, wherein $Z_1$ and $Z_2$, or $Z_3$ and $Z_4$ in the compound represented by general formula (I) or (II) connect to each other to form a pyrazolone ring.

5. The silver halide photographic light-sensitive material as set forth in claim 1, wherein $Z_1$ and $Z_2$, or $Z_3$ and $Z_4$ are the combination of a cyano group and a benzoyl group which may have a substituent group.

6. A photographic processing method which comprises subjecting the silver halide photographic light-sensitive material as set forth in claim 2 which contains a compound represented by general formula (1) or (11) having 2 to 4 sulfo groups or salts thereof, to development processing with a developing solution containing a sulfite salt.

7. The silver halide photographic light-sensitive material as set forth in claim 1, wherein in general formula (I) $X_2$ and $X_4$ represent hydrogen, $X_1$ and $X_3$ represent methyl, $R_1$ and $R_2$ represent cyanoethyl, $Z_1$ and $Z_2$, $Z_3$ and $Z_4$ represent a pyrazolone ring, Y! represents ethylene and m and n represent zero.

8. The silver halide photographic light-sensitive material as set forth in claim 1, wherein $X_1$, $X_2$, $X_3$ and $X_4$ each independently represents a hydrogen atom, and alkyl group having 1 to 6 carbon atoms, an alkoxy group having 1 to 6 carbon atoms, a substituted amino group selected from the group consisting of an amino group substituted by an acyl group derived from an aliphatic carboxylic acid having 1 to 6 carbon atoms, an amino group substituted by an acyl group derived from sulfonic acid, an alkylamino group having 1 to 6 carbon atoms, and dialkylamino group having 1 to 6 carbon atoms in total, a carbamoyl group having 2 to 7 carbon atoms, a sulfamoyl group having 1 to 6 carbon atoms, and an alkoxycarbonyl group having 2 to 6 carbon atoms.

9. The silver halide photographic light-sensitive material as set forth in claim 1, wherein $R_1$ and $R_2$, each independently represents an unsubstituted or substituted alkyl group having 1 to 8 carbon atoms in total wherein the substituent group is selected from the group consisting of a halogen atom, hydroxyl group, cyano group, alkoxy group, acyl group, acyloxy group, acylamino group, carbamoyl group, alkylamino group, dialkylamino group, carboxyl group, alkoxycarbonyl group, sulfonyl group, sulfonylamino group, sulfamoyl group, sulfo group, and aryl group, an alkenyl group having 2 to 6 carbon atoms, an unsubstituted or substituted aryl group wherein the substitutent group is selected from the group consisting of a halogen atom, cyano group, sulfo group, hydroxyl group, carboxyl group, alkoxy group, alkyl group and a nitro group, an acyl group having 2 to 7 carbon atoms, an alkylsulfonyl group having 1 to 6 carbon atoms, an unsubstituted or substituted arylsulfonyl group, wherein the substituent group is selected from the group consisting of a halogen atom, cyano group, sulfo group, hydroxyl group, alkoxy group and an alkyl group.

10. The silver halide photographic light-sensitive material as set forth in claim 1, wherein $Y_1$ and $Y_2$ represent divalent linking groups each represents an unsubstituted or substituted alkyene group having 1 to 10 carbon atoms, unsubstituted or substituted arylene group, carbonyl group, amino group, carbonyloxy group, carbonate group, carbonylamino group, ureido group, imide group, sulfonyl group, sulfonyloxy group, sulfonlamino group, and sulfonylaminocarbonyl group.

11. The silver halide photographic light-sensitive material as set forth in claim 1, wherein the layer containing said compound further contains a mordant.

12. The silver halide photographic light-sensitive material as set forth in claim 1, which comprises the compound of general formula (I).

13. The silver halide photographic light-sensitive material as set forth in claim I, which comprises the compound of general formula (II).

14. The silver halide photographic light-sensitive material as set forth in claim 1, wherein at least one of said compounds is contained in a protective layer disposed above at least one silver halide light sensitive layer.

15. The silver halide photosensitive light-sensitive material as set forth in claim 1, wherein at least one of said compounds is contained in a hydrophilic yellow filter colloid layer.

* * * * *